United States Patent
Kawai et al.

(10) Patent No.: US 6,512,600 B1
(45) Date of Patent: Jan. 28, 2003

(54) LIGHT GUIDE, ILLUMINATING DEVICE HAVING THE LIGHT GUIDE, AND IMAGE READING DEVICE AND INFORMATION PROCESSING APPARATUS HAVING THE ILLUMINATING DEVICE

(75) Inventors: Tatsundo Kawai, Hadano (JP); Osamu Hamamoto, Hiratsuka (JP); Shinichi Takeda, Hiratsuka (JP); Satoshi Itabashi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/948,661

(22) Filed: Oct. 10, 1997

Related U.S. Application Data

(62) Division of application No. 08/471,756, filed on Jun. 6, 1995, which is a division of application No. 08/183,367, filed on Jan. 19, 1994, now Pat. No. 5,499,112.

(30) Foreign Application Priority Data

Jan. 19, 1993 (JP) .................................................. 5-6925
Apr. 9, 1993 (JP) .............................................. 5-105983

(51) Int. Cl.[7] .............................................. H04N 1/04
(52) U.S. Cl. ....................................... 358/475; 358/484
(58) Field of Search ................................ 358/475, 471, 358/474, 484, 487, 509, 505, 506; 250/208.1; 362/31, 32, 800; 257/88; 347/3; 385/901, 116, 119, 128–130, 132, 31, 32, 97; 399/221

(56) References Cited

U.S. PATENT DOCUMENTS

| | | | |
|---|---|---|---|
| 3,464,133 A | 9/1969 | DePoray | 40/545 |
| 4,313,124 A | 1/1982 | Hara | 347/57 |
| 4,345,262 A | 8/1982 | Shirato et al. | 347/10 |
| 4,371,897 A | 2/1983 | Kramer | 358/474 |
| 4,459,600 A | 7/1984 | Sato et al. | 347/47 |
| 4,463,359 A | 7/1984 | Ayata et al. | 347/56 |
| 4,558,333 A | 12/1985 | Sugitani et al. | 347/65 |
| 4,714,983 A | 12/1987 | Lang | 362/27 |
| 4,723,129 A | 2/1988 | Endo et al. | 347/56 |
| 4,733,332 A | 3/1988 | Yamashita et al. | 362/32 |
| 4,733,335 A | 3/1988 | Serizawa et al. | 362/800 |
| 4,740,796 A | 4/1988 | Endo et al. | 347/56 |
| 4,929,866 A | 5/1990 | Murata et al. | 362/800 |
| 4,937,709 A | 6/1990 | Yanagi et al. | 362/31 |

(List continued on next page.)

FOREIGN PATENT DOCUMENTS

| | | |
|---|---|---|
| DE | 1472474 | 10/1969 |
| JP | 56-58364 | 5/1981 |
| JP | 57-128383 | 8/1982 |
| JP | 59-123670 | 7/1984 |
| JP | 59-138461 | 8/1984 |
| JP | 62-29003 | 2/1987 |
| JP | 4-308893 | 10/1992 |

*Primary Examiner*—Cheukfan Lee
(74) *Attorney, Agent, or Firm*—Fitzpatrick, Cella, Harper & Scinto

(57) ABSTRACT

There is disclosed an illumination device in which a light guide is adapted to emit the light from a face thereof and is provided with an area, on a face opposite to the light emitting face, for diffusing and/or reflecting the light introduced into the light guide from an end face thereof or is provided with uneven light emitting characteristics along the longitudinal direction of the light guide, and the center of the light source positioned at the end of the light guide is placed at a position aberrated from the normal line to the area, whereby attained are compactness, a low cost, a low electric power consumption, a high efficiency of utilization of the light emitted by the light source, and excellent and uniform illumination characteristics. There are also disclosed an image reading device and an information processing apparatus, equipped with the above-mentioned illumination device.

444 Claims, 47 Drawing Sheets

U.S. PATENT DOCUMENTS

| | | | |
|---|---|---|---|
| 4,974,122 A | 11/1990 | Shaw | 362/31 |
| 5,005,108 A | 4/1991 | Pristash et al. | 362/31 |
| 5,040,098 A | 8/1991 | Tanaka et al. | 362/31 |
| 5,046,805 A | 9/1991 | Simon | 385/31 |
| 5,050,946 A | 9/1991 | Hathaway et al. | 385/33 |
| 5,055,861 A | 10/1991 | Murayama et al. | 347/29 |
| 5,070,431 A | 12/1991 | Kitazawa et al. | 362/31 |
| 5,079,675 A | 1/1992 | Nakayama | 362/31 |
| 5,099,343 A | 3/1992 | Margerum et al. | 349/63 |
| 5,166,811 A * | 11/1992 | Nagano | 358/483 |
| 5,202,950 A | 4/1993 | Arego et al. | 385/146 |
| 5,237,641 A | 8/1993 | Jacobson et al. | 385/146 |
| 5,257,340 A | 10/1993 | Kaplan | 385/128 |
| 5,276,504 A | 1/1994 | Zwirner et al. | 356/384 |
| 5,289,351 A | 2/1994 | Kashima et al. | 362/31 |
| 5,295,047 A | 3/1994 | Windross | 362/26 |
| 5,295,048 A | 3/1994 | Park et al. | 362/26 |
| 5,309,544 A * | 5/1994 | Saxe | 385/146 |
| 5,357,405 A | 10/1994 | Park | 362/31 |
| 5,359,691 A | 10/1994 | Tai et al. | 385/146 |
| 5,363,294 A | 11/1994 | Yamamoto et al. | 362/31 |
| 5,408,387 A | 4/1995 | Murase et al. | 362/31 |
| 5,418,384 A * | 5/1995 | Yamada et al. | 257/88 |
| 5,420,761 A | 5/1995 | DuNah et al. | 362/31 |
| 5,438,484 A | 8/1995 | Kanda et al. | 362/31 |
| 5,461,547 A | 10/1995 | Ciupke et al. | 362/31 |
| 5,485,354 A | 1/1996 | Ciupke et al. | 362/31 |
| 5,499,112 A | 3/1996 | Kawai et al. | 358/475 |
| 5,521,797 A * | 5/1996 | Kashima et al. | 362/31 |
| 5,590,945 A * | 1/1997 | Simms | 362/31 |
| 5,594,830 A * | 1/1997 | Winston et al. | 385/146 |
| 5,664,873 A * | 9/1997 | Kanda et al. | 362/97 |
| 5,703,667 A * | 12/1997 | Ochiai | 362/31 |
| 5,709,447 A * | 1/1998 | Murakami et al. | 362/31 |
| 5,735,590 A * | 4/1998 | Kashima et al. | 362/31 |
| 5,737,096 A * | 4/1998 | Takeuchi et al. | 358/475 |
| 5,959,740 A * | 9/1999 | Takeda et al. | 358/296 |

\* cited by examiner

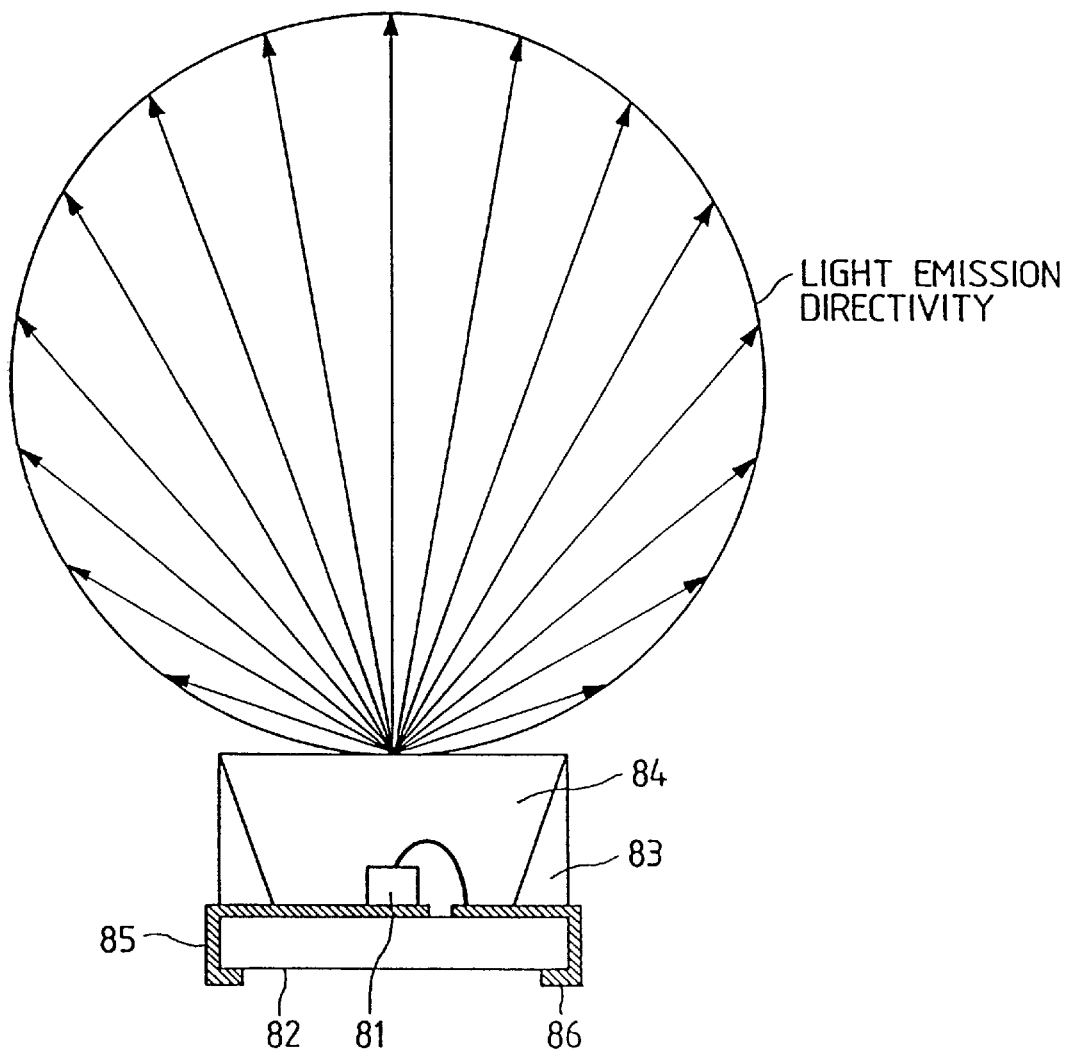

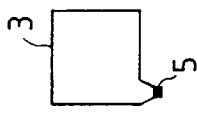
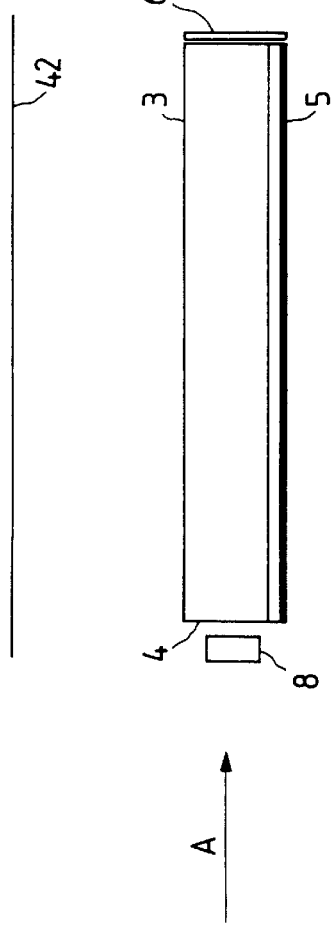
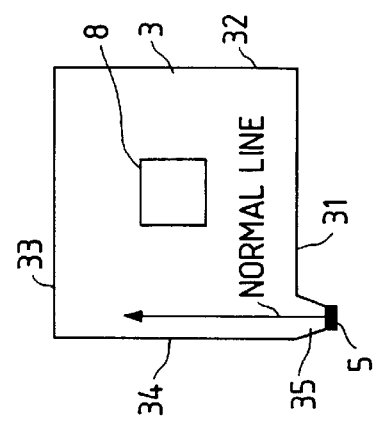

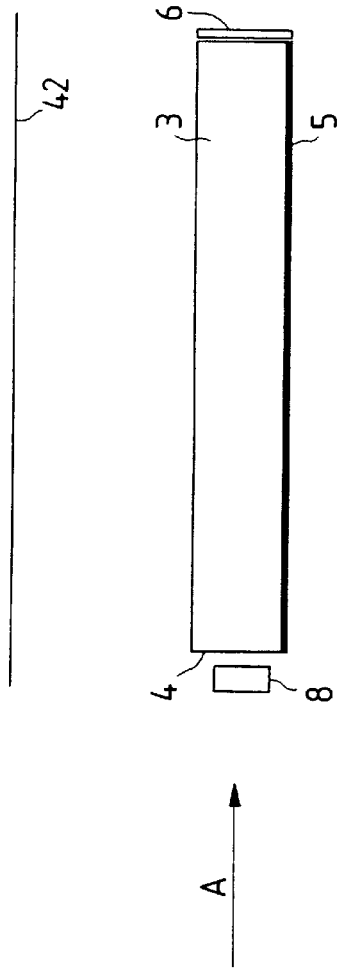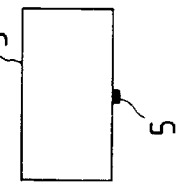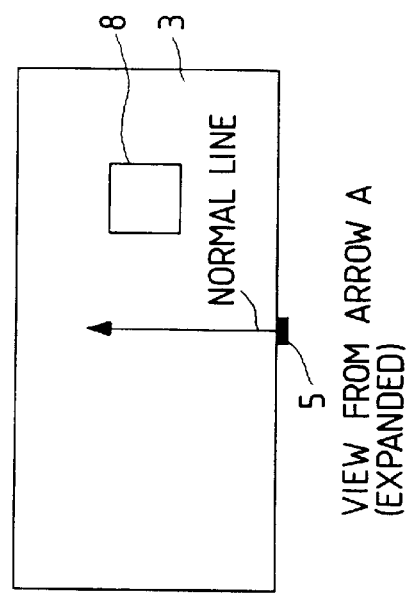

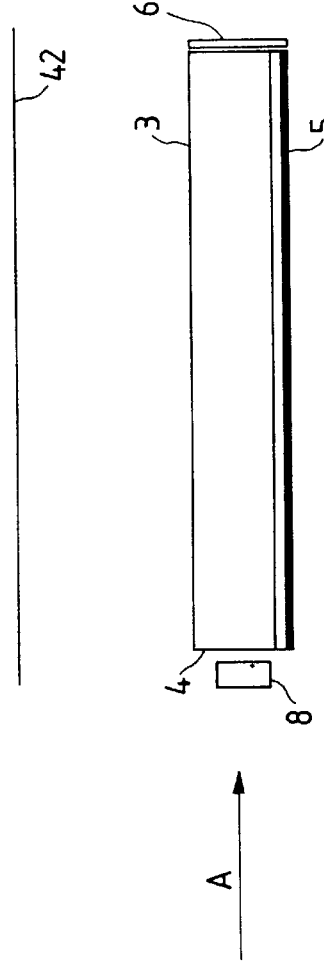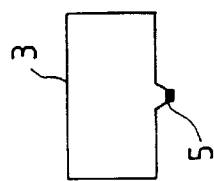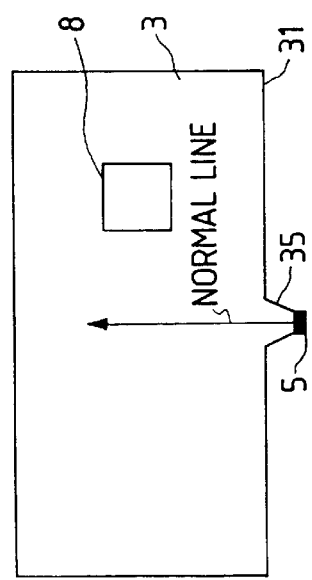

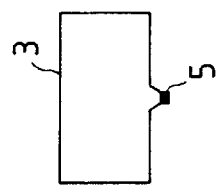
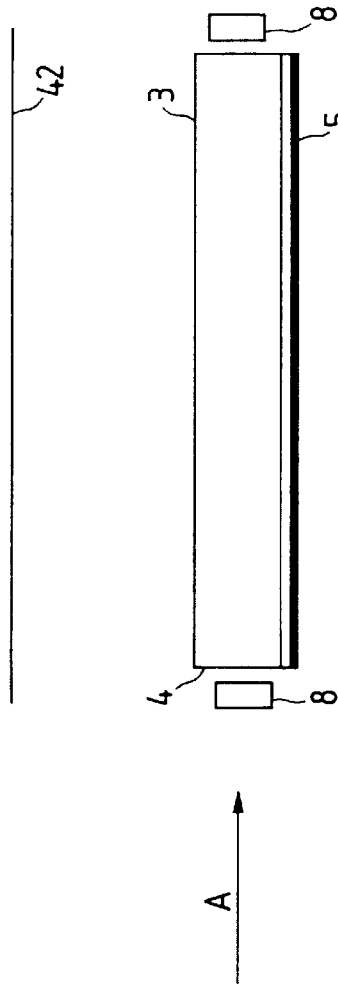
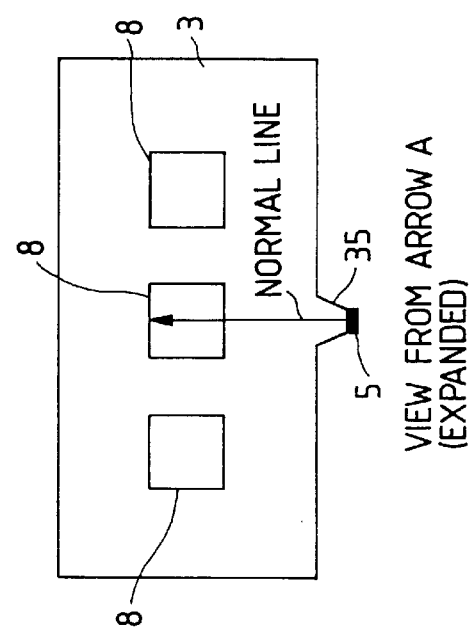

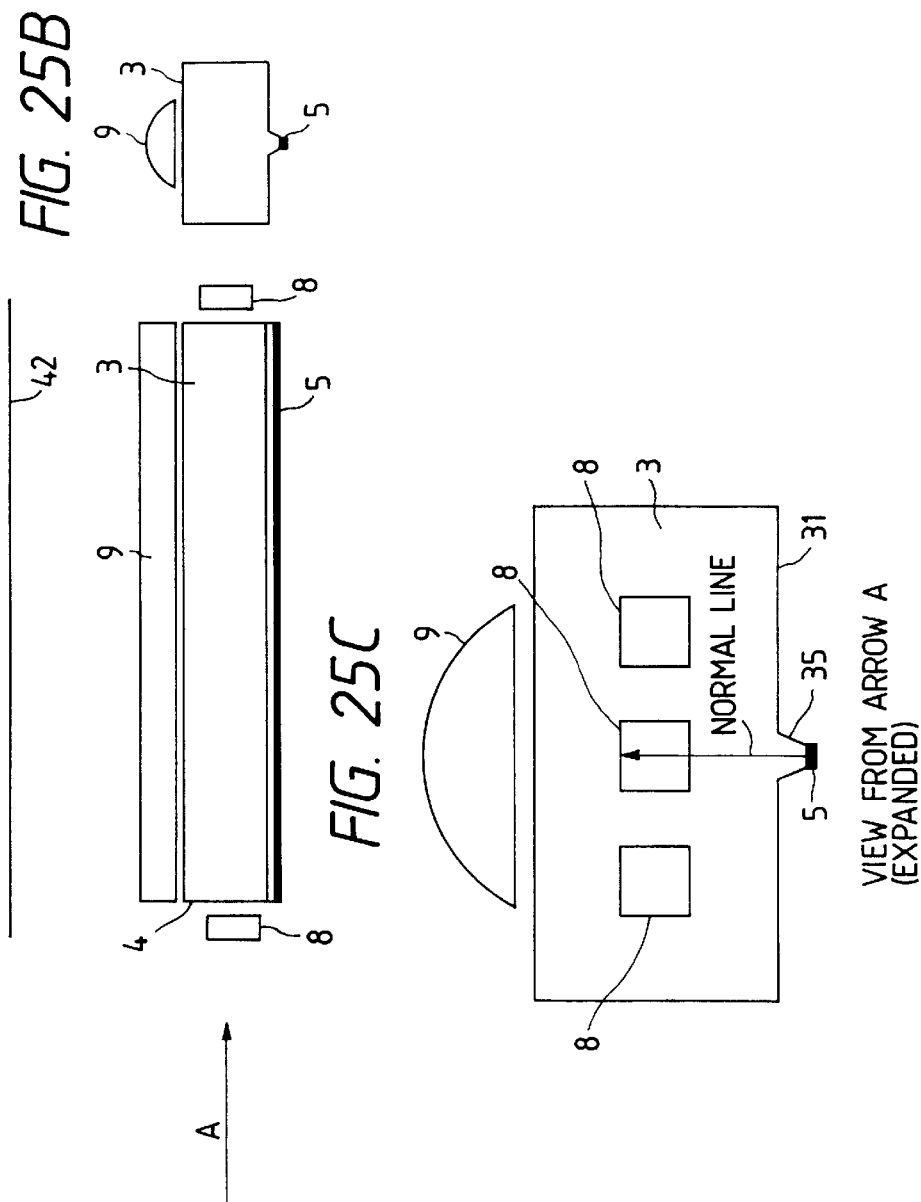

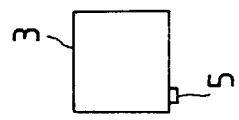
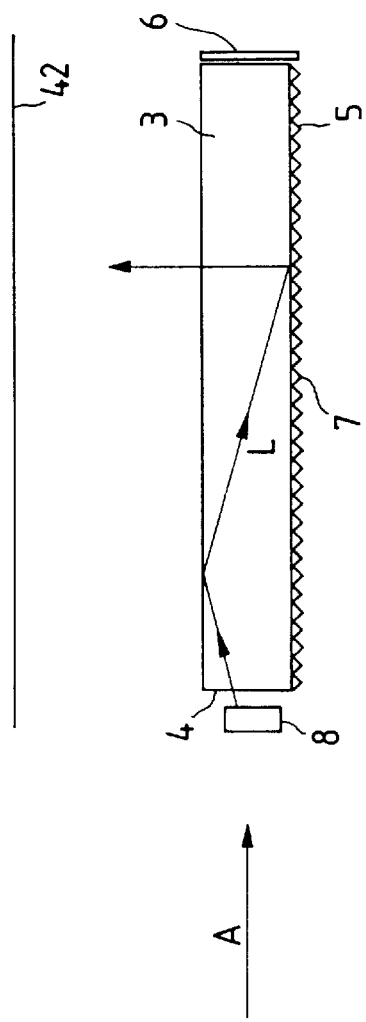
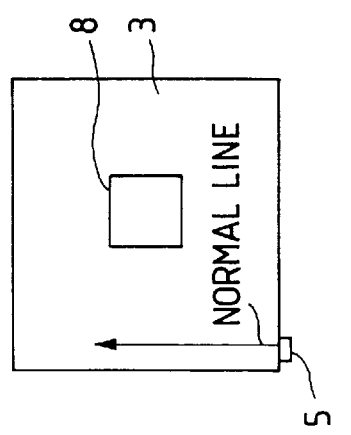

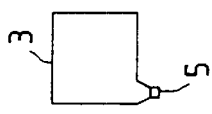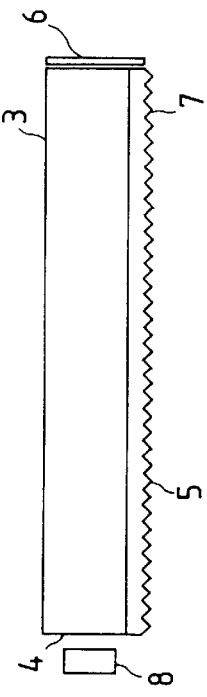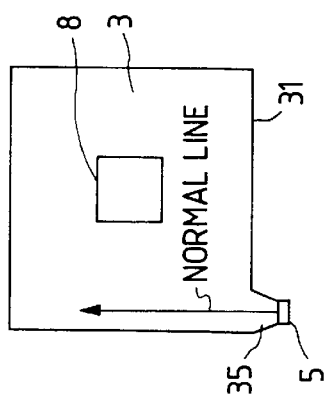

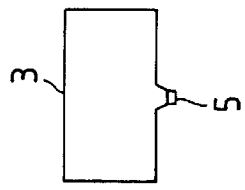
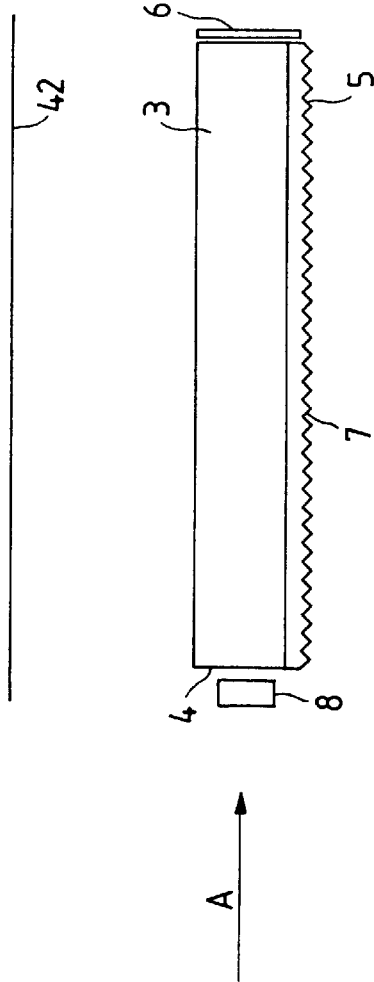
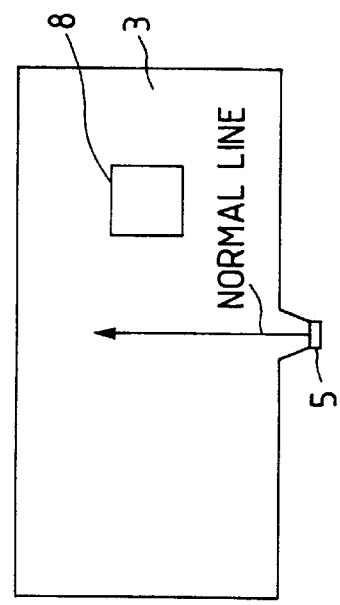

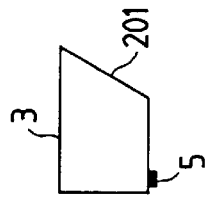
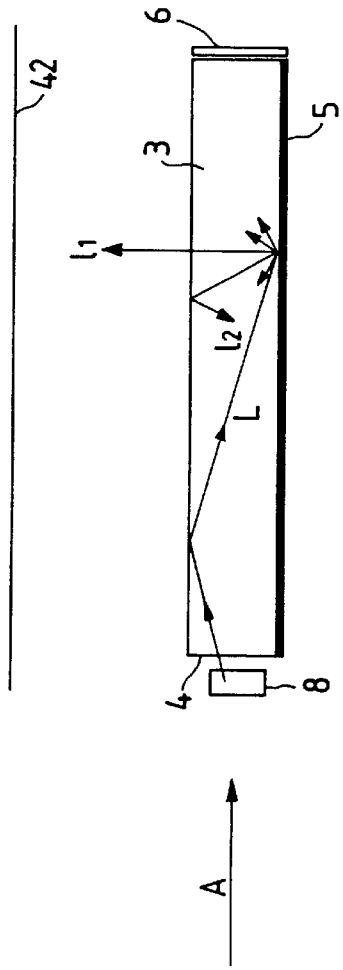
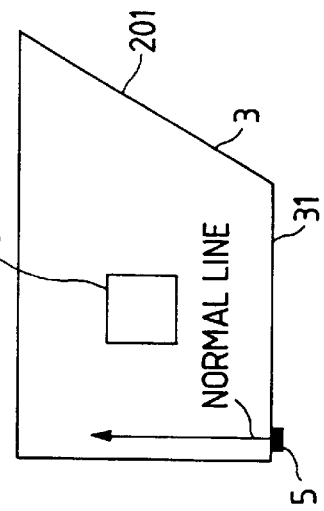

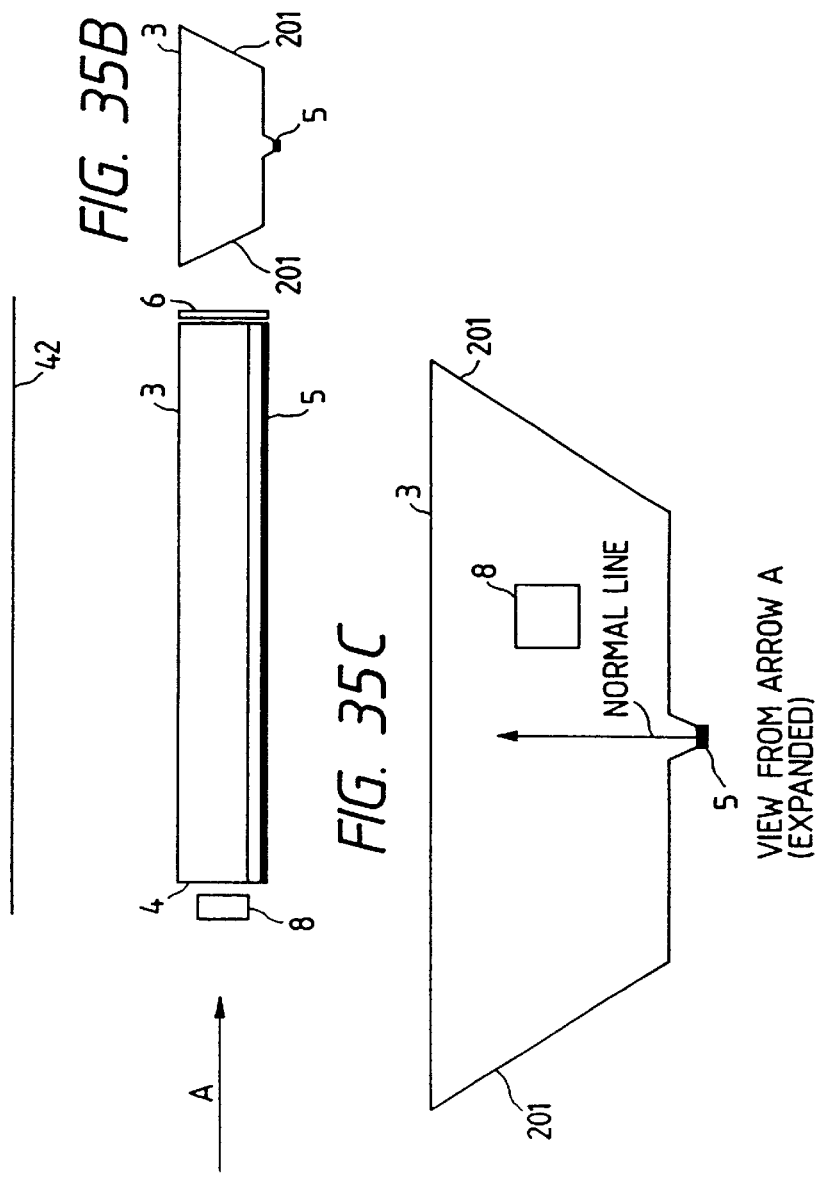

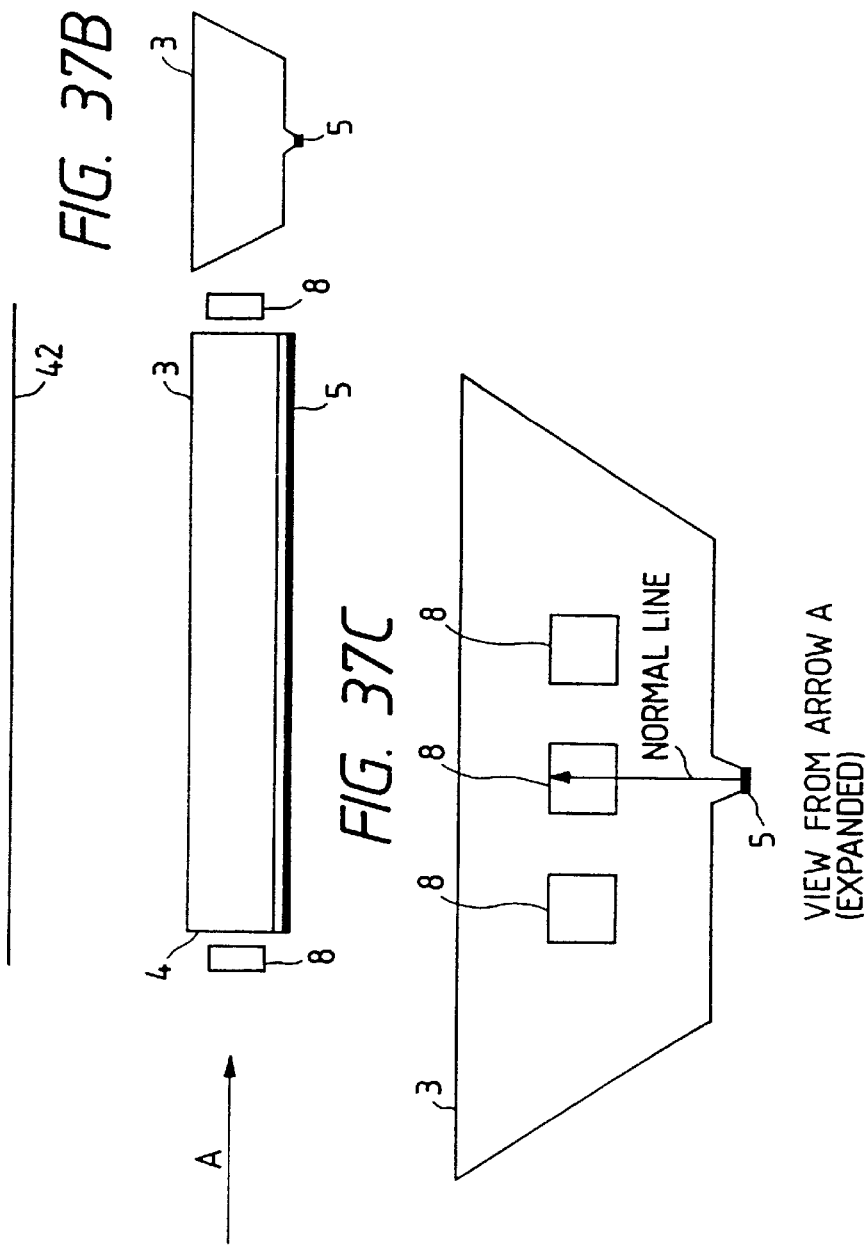

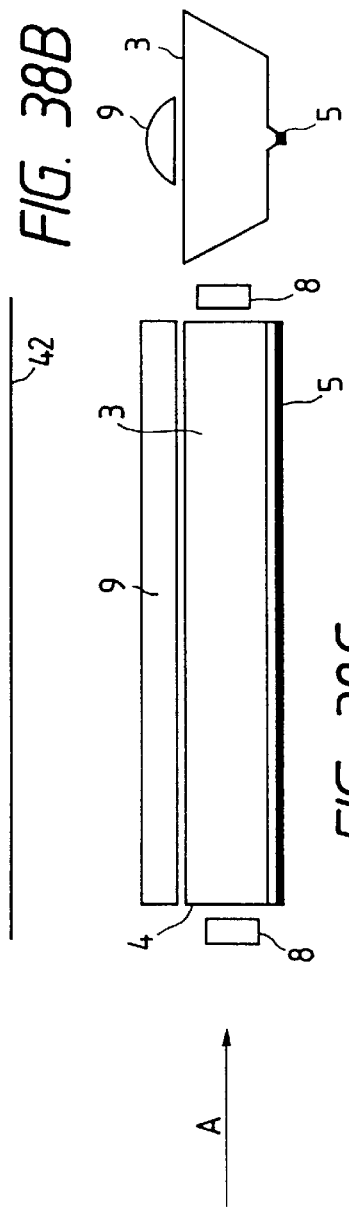
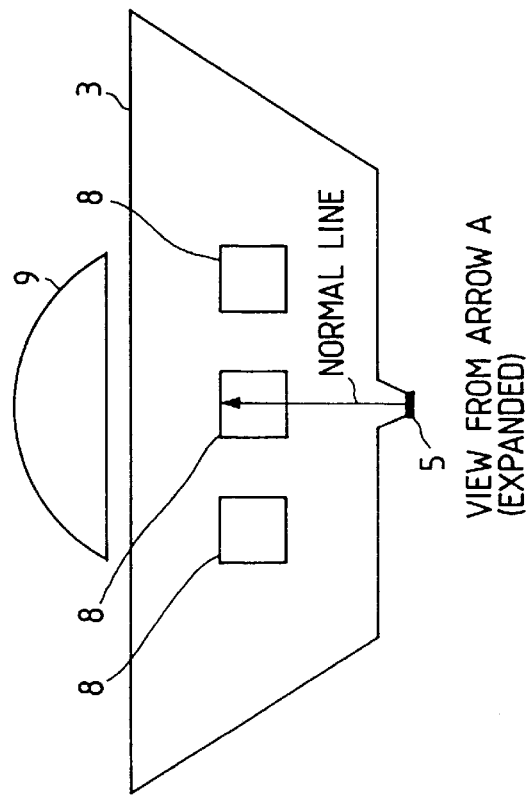
FIG. 38A
FIG. 38B
FIG. 38C
VIEW FROM ARROW A (EXPANDED)
NORMAL LINE

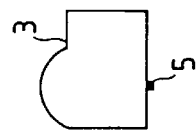
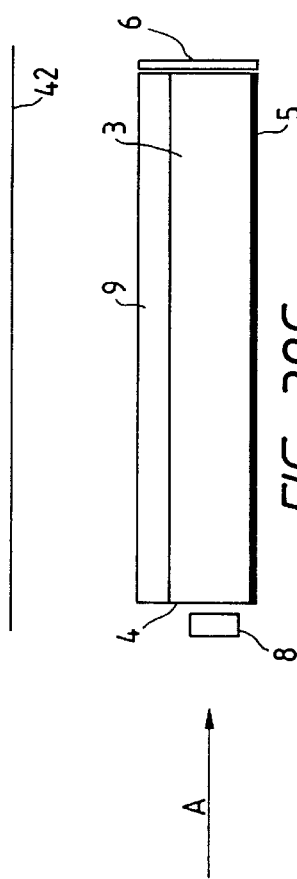
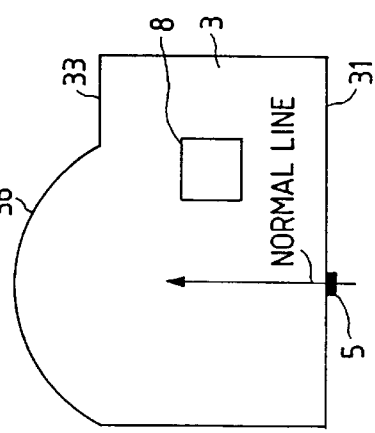

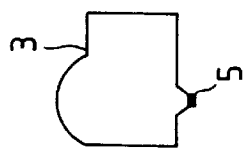
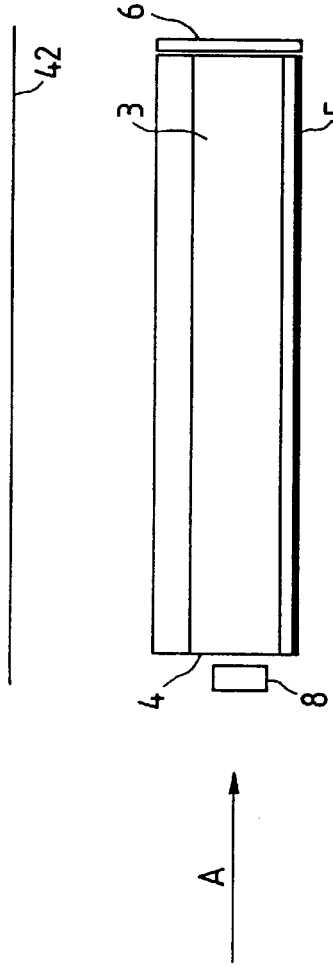
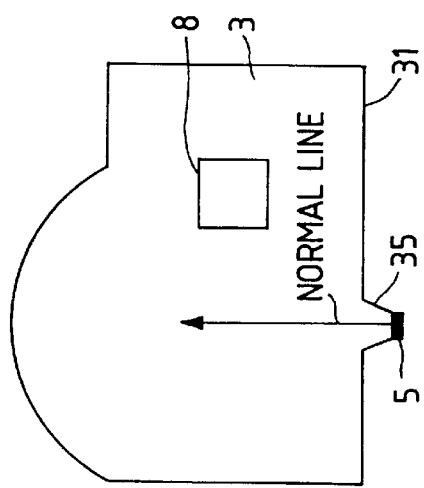

VIEW FROM ARROW A
(EXPANDED)

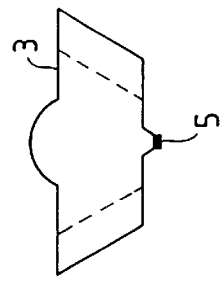
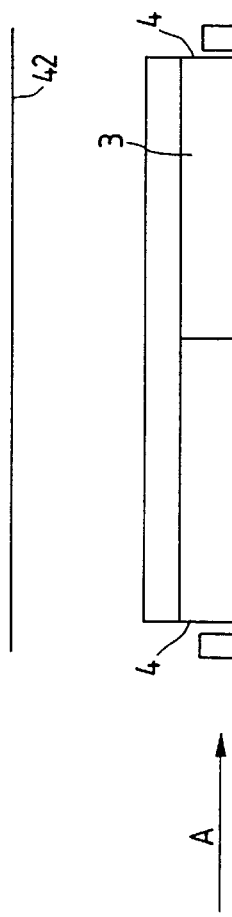
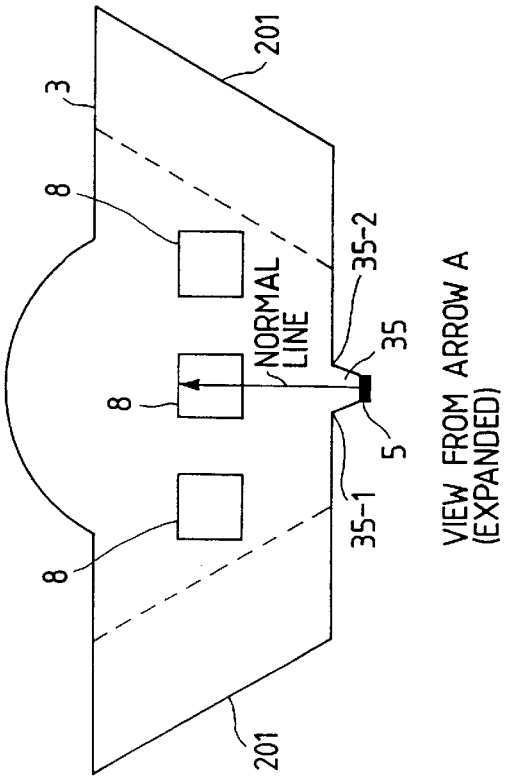

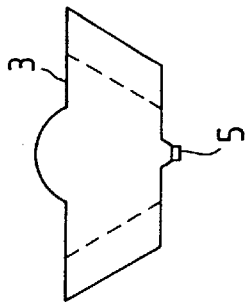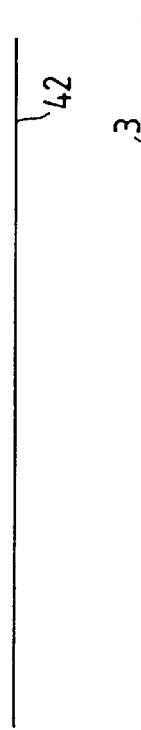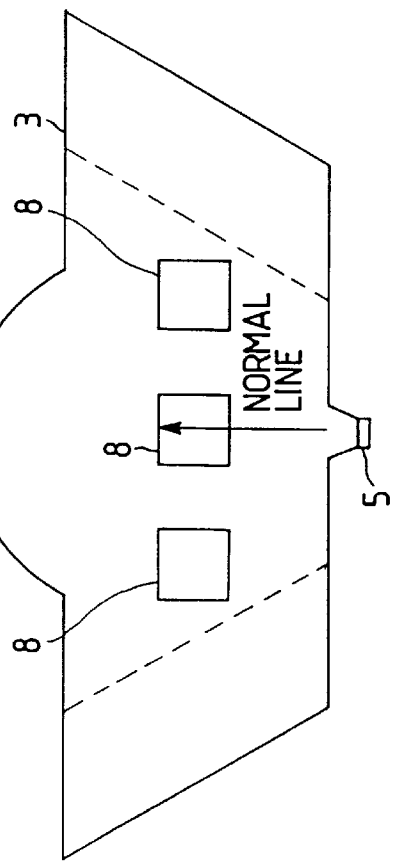
FIG. 50A
FIG. 50B
FIG. 50C
VIEW FROM ARROW A (EXPANDED)

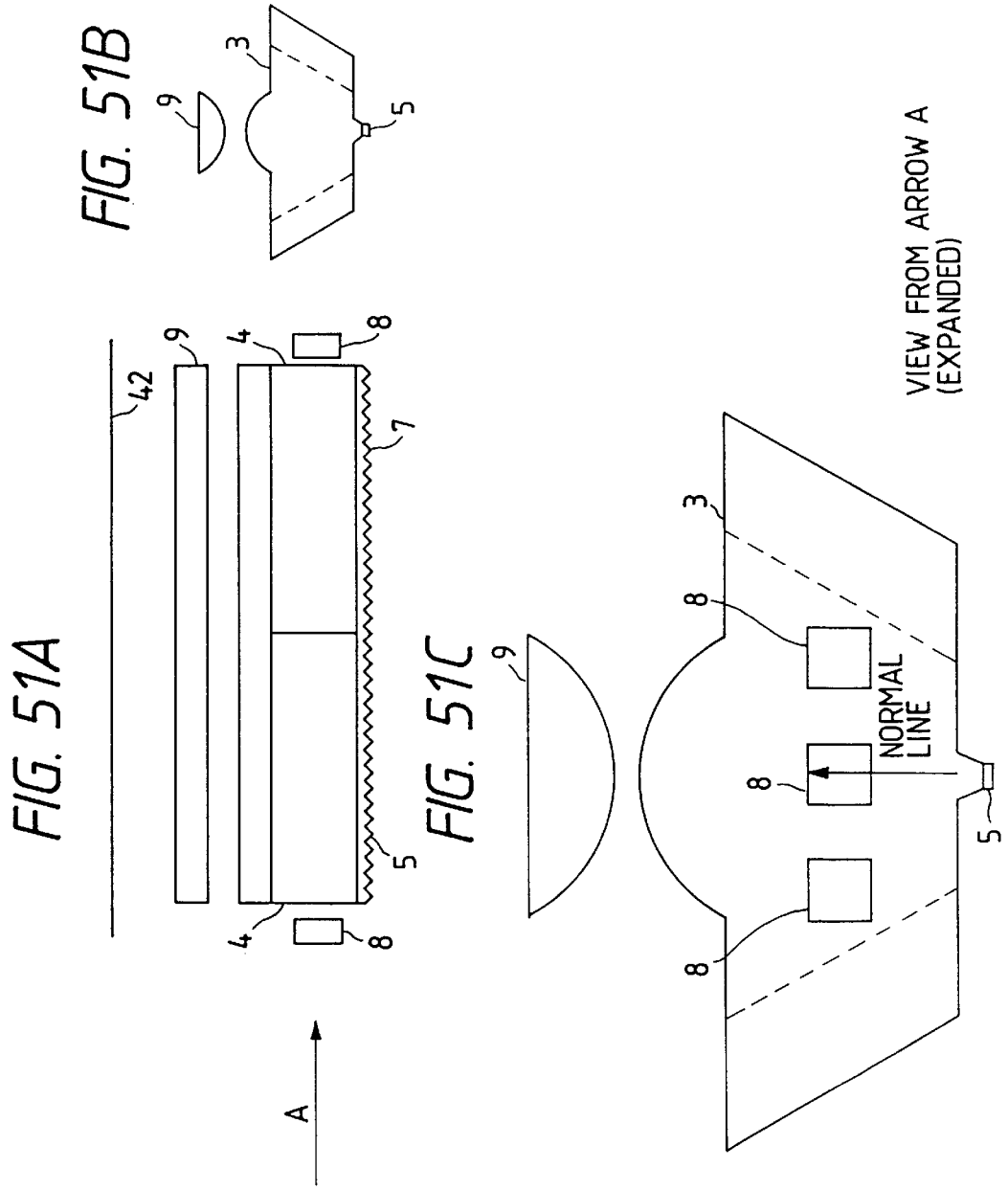

LIGHT GUIDE, ILLUMINATING DEVICE HAVING THE LIGHT GUIDE, AND IMAGE READING DEVICE AND INFORMATION PROCESSING APPARATUS HAVING THE ILLUMINATING DEVICE

This application is a divisional application of Application Ser. No. 08/471,756, filed Jun. 6, 1995, which is a divisional of Application Ser. No. 08/183,367, filed Jan. 10, 1994.

BACKGROUND OF THE INVENTION

1. Field of the Invention

The present invention relates to a light guide, an illuminating device having the light guide, and an image reading device and an information processing apparatus having the illuminating device, and more particularly an information processing apparatus (such as a copying machine, a facsimile apparatus, a scanner or an electronic blackboard), an image reading device adapted for use in such an information processing apparatus, an illumination device adapted for use in such an image reading device, and a light guide adapted for use in such an illumination device.

2. Description of the Related Art

For illuminating the image reading device of the information processing apparatus such as the facsimile apparatus, electronic copying machine or the like, there has conventionally been employed a discharge tube such as a flourescent lamp or an LED array consisting of an array of a plurality of LED's. Particularly in recent years, the LED arrays are being used more widely, because compact and inexpensive products are requested for home-use equipment such as the facsimile apparatus.

An example of the illumination device utilizing such LED array will be explained with reference to FIGS. 1A and 1B, wherein shown are an LED array 41, a plane 42 to be illuminated, such as the surface of an original document, and LED chips 43. FIG. 1A shows the schematic structure of the illumination device employing an LED array, together with the original to be illuminated, while FIG. 1B shows an example of the illumination intensity distribution of the surface of the original when it is illuminated with the illumination device shown in FIG. 1A. As shown in FIG. 1B, a substantially uniform and high illumination intensity can be obtained by increasing the number of the LED chips, namely by densely arranging the LED chips. However, because of the increased number of the LED chips, it is difficult to achieve a sufficiently low cost, and to reduce the power consumption beyond a certain limit even though the power required for an individual LED is quite low.

A reduced number of the LED chips, or a less dense arrangement of the LED chips, for the purpose of cost reduction, will result in an uneven illumination intensity distribution on the illuminated surface, due to the increased gap between the LED chips, as will be explained in the following with reference to FIGS. 2A and 2B, wherein the same components as those in FIGS. 1A and 1B are represented by the same numbers.

FIG. 2A shows the schematic structure of the illumination device utilizing an LED array, together with the illuminated original, as in FIG. 1A, while FIG. 2B shows an example of the illumination intensity distribution when the original is illuminated with the illumination device shown in FIG. 2A. If the number of LED's in the array is decreased, there results, as shown in FIG. 2B, an extremely uneven illumination state in which the illumination intensity on the original surface is high in positions corresponding to the LED chips but is low in positions corresponding to the gaps between the LED chips. The precise original reading becomes difficult under such an illumination intensity distribution, and a circuit is required to compensate for the unevenness in the illumination intensity distribution, eventually leading to a higher cost.

FIG. 3 is a schematic perspective view showing the details of a linear light source similar to that explained above.

As shown in FIG. 3, such a linear light source is composed of LED chips 43, individually constituting a point light source, mounted linearly on a substrate 45 bearing electric wirings 49, and a voltage is applied between input terminals 48 of the wirings 49 to cause light emission from the LED chips 43, thereby constituting a linear light source.

FIG. 4 shows an elevation view of the light source, seen from a direction C shown in FIG. 3, and the light amount distribution on an illuminated surface (not shown), schematically illustrating the variation of the light amount corresponding to the positions of the LED chips 43. A curve 44 indicating the distribution of the light amount becomes higher in positions directly above the LED chips 43 but lower in positions corresponding to the gaps between the LED chips 43, because of the linear arrangement thereof. As a result, there is formed unevenness in the light amount corresponding to the arrangement of the LED chips 43. In reading image information with such a linear light source, the reflected light from the illuminated surface also involves unevenness in the light amount similar to that shown in FIG. 4, so that a large burden is required in the post-process such as image processing for improving the tonal rendition.

On the other hand, there is conceived a linear light source of the configuration as shown in FIG. 5, in which a light bulb, such as a tungsten lamp or a halogen lamp, is employed as the light source and the light emitted from the light source is developed into a linear form. In FIG. 5 there are shown an electric light bulb 1, such as a halogen lamp; a mirror 2 of a light condensing form, such as spherical or elliptical form; a translucent member 3 with a circular cross section, such as a quartz rod; an entrance face 4 where the light beam emitted from the light bulb 1 enters the translucent member 3; an area 5 for taking out the light beam, propagating in the translucent member 3, from the member by reflection or scattering, the area 5 being formed on a part of the translucent member 3 by forming a coarse surface or coating the surface thereof with light diffusing/reflecting paint; and a reflective face 6 provided at an end of the translucent member 3 opposite to the bulb 1 and formed either by evaporating a metal such as aluminum or applying light diffusing/reflecting paint on the end face of the translucent member 3 itself, or as a separate member. The translucent member 3 may also have a square or rectangular cross section.

The light beam L, emitted from the light bulb I and entering the translucent member 3 through the entrance face 4 thereof propagates in the member 3 by repeated reflections on the internal walls thereof, then is reflected by the end face opposite to the entrance face 4, and propagates again in the interior of the translucent member 3. In the course of repeated reflections, upon entering the above-mentioned area 5, the light beam is scattered therein and a part $1_1$ of the light beam is released to the exterior through an exit face opposite to the area 5. The remaining part $1_2$ of the diffused light beam, entering the exit face diagonally, is totally reflected thereon and propagates in the translucent member. The light reaching the entrance face 4 after repeated propagations is released therethrough to the exterior.

When the light bulb 1 is used as the light source, as the amount of light emission can be increased by the use of a larger electric power, there can be obtained a considerably high illumination intensity despite the light loss by the light emission to the exterior through the entrance face 4.

However, the use of the light bulb is associated with the drawbacks of a large electric power consumption in return for a high illumination intensity, difficulty in compactization of the device because of the large heat generation, and lack of maintenance-free character as in the case of LED's, since the electric light bulb has a service life considerably shorter than even that of the fluorescent lamp and has to be replaced when the light amount becomes low or when the filament is broken.

Consequently, the illumination device to be employed as the image reading light source for an information processing apparatus, such as a facsimile apparatus, preferably employs LED's as the light source and is adapted to emit the light beam from the LED's in a linear form. As another example of the illumination device employing the LED chips as the light source, there has been conceived a configuration shown in FIGS. 6A and 6B, which respectively are a schematic view of the illumination device together with an original to be illuminated, and a chart showing an example of the illumination intensity distribution on the illuminated surface 42 when the original is illuminated with the device shown in FIG. 6A. More specifically, the illumination device shown in FIG. 6A is similar to that shown in FIG. 5 except that the light source is replaced by an LED light source 71. In FIG. 6A, the components equivalent to those in FIG. 5 are represented by the same numbers.

The LED light source is available in various types, among which there is known so-called surface mounting LED chips convenient for compactization and actual mounting. FIG. 7 illustrates such a surface mounting LED light source, wherein shown are an LED chip 81; a substrate 82; a reflecting frame 83; translucent resin 84; and electrodes 85, 86 formed on the substrate 82. Such an LED light source is already available in a compact form, with the size of the light source itself of 2–3 mm and the height of 2 mm or less. As the electrodes 85, 86 are extended to the rear side of the substrate 82 through the lateral faces thereof, the light source can be efficiently mounted on the mounting substrate, merely by placing on the mounting substrate printed with cream solder and heating in a reflow oven. Consequently, the use of such an LED light source is more desirable for constructing a linear light source.

However, since such an LED light source has a directionality in the light emission as shown in FIG. 7, in illuminating the original in combination with the translucent member 3 as shown in FIG. 6A, an unevenness will result in the illumination intensity distribution, which is higher at the side of the LED light source 71 and is lower in the remaining part, as shown in FIG. 6B.

This is because the lights diagonally emitted from the LED light source 71 directly enter the area 5 of the translucent member 3, are scattered in the area 5 and released from the translucent member 3.

FIG. 8 is a schematic perspective view of another example of the conventional linear light source, in which light sources are provided on both ends of an oblong translucent member constituting a light guide 3. In FIG. 8, the light is emitted in a direction $l_1$. The oblong translucent member 3 has a constant cross section, and the faces thereof are formed as mirrors except for the light-emitting face. The light is introduced from LED chips 71 provided on substrates 45 into the oblong translucent member 3 through the end faces thereof, and is released to the exterior either directly or after reflection by the mirror faces of the translucent member 3. FIG. 9 shows an elevation view, seen from a direction D shown in FIG. 8, and the illumination intensity distribution on the illuminated surface (not shown). As shown in FIG. 9, there is obtained a uniform light amount within an area a-c, but the level of light amount is low and is considerably different from that in the vicinity of the light source. 10a, 10b and 10c are cross sections at the positions a, b and c of the oblong translucent member 3, and 44a, 44b and 44c indicate the illumination intensity distributions at the corresponding positions. Also hatched portions represent mirror faces (except for the light emitting face and light entering faces of the oblong translucent member 3).

SUMMARY OF THE INVENTION

An object of the present invention is to resolve the drawbacks associated with the conventional illumination means utilizing the linear array of LED chips and with the information processing apparatus employing such an illumination means, such as the difficulty in achieving a sufficiently low cost due to the large number of LED chips to be used, the limit in reducing the electric power consumption even though the electric power consumption in an individual LED chip is relatively low, the uneven illumination state where the illumination intensity on the illuminated original is high in positions corresponding to the LED chips but is low in positions corresponding to the gaps between the LED chips, encountered when the number of the LED chips is reduced in the array, the uneven illumination intensity on the illuminated original encountered when the LED chips are positioned at the end faces of the translucent member, and the cost increase resulting from the necessity for a circuit to compensate for the unevenness in the illumination intensity.

Another object of the present invention is to resolve the drawbacks associated with the conventional illumination means utilizing the electric light bulb and with the information processing apparatus employing such an illumination means, such as the large electric power consumption, the difficulty in compactization of the device because of the large heat generation, and the difficulty in attaining a maintenance-free configuration.

Still another object of the present invention is to provide an illumination device with high uniformity in the illumination intensity, a low electric power consumption and easy compactization, a light guide adapted for use in the illumination device, and an information processing apparatus utilizing the illumination device.

Still another object of the present invention is to resolve the drawbacks of the unevenness in the illumination intensity and of the significant difference in the illumination intensity between a side close to the LED light source and the opposite side, when the LED is employed as the light source for a linear illumination device.

Still another object of the present invention is to provide a light guide having a light entrance face at an end thereof and a light exit face for emitting the introduced light, along the longitudinal direction, different from the end face, comprising an area provided along the longitudinal direction in a part of the side opposite to the light exit face and adapted to reflect and/or diffuse the light beam introduced into the translucent member.

Still another object of the present invention is to provide an illumination device provided with a translucent member having a light entrance face at an end thereof and a light exit face for emitting the introduced light on a face, along the longitudinal direction, different from the end face, and a light source for emitting the light beam to be introduced through the light entrance face, wherein the translucent member comprises an area provided along the longitudinal direction on a part of the side opposite to the light exit face and adapted to reflect and/or diffuse the light introduced into the translucent member, and the center of the light source is aberrated from the direction of a normal line to the area.

Still another object of the present invention is to provide an information processing apparatus provided with:

(a) a photoelectric converting device having a plurality of photoelectric converting elements positioned opposite to the image of an original sheet to be read;

(b) an illumination device for illuminating the original sheet;

(c) transport means for transporting the original sheet;

(d) an output unit for recording an image on a sheet by electrical signals corresponding to image information; and (e) a controller for controlling the photoelectric converting device, the light source, the transport means and the output unit;

wherein the illumination means includes an illumination device provided with a translucent member having a light entrance face at an end thereof and a light exit face for emitting the introduced light, along the longitudinal direction, different from the end face, and a light source for emitting the light beam to be introduced through the light entrance face, wherein the translucent member comprises an area provided along the longitudinal direction on a part of the side opposite to the light exit. face and adapted to reflect and/or diffuse the light introduced into the translucent member, and the center of the light source is aberrated from the direction of a normal line to the area.

Still another object of the present invention is to provide an image reading device including an illumination device provided with a translucent member having a light entrance face at an end thereof and a light exit face for emitting the introduced light, along the longitudinal direction, different from the end face, and a light source for emitting the light beam to be introduced through the light entrance face, and also including a photoelectric converting device for receiving the light emitting from the light exit face and reflected by an illuminated area, wherein the translucent member comprises an area provided along the longitudinal direction on a part of the side opposite to the light exit face and adapted to reflect and/or diffuse the light introduced into the translucent member, and the center of the light source is aberrated from the direction of a normal line to the area.

Still another object of the present invention is to provide a light guide for use in an illumination device, composed of a translucent member adapted to receive the light from a light source through a face of the translucent member and to emit the light through a lateral face thereof, wherein the translucent member has uneven light emission characteristics in the longitudinal direction thereof.

Still another object of the present invention is to provide an illumination device including a light source positioned on a face of a translucent member and adapted to emit the light from a lateral face of the translucent member, wherein the translucent member has uneven light emission characteristics along the longitudinal direction thereof.

Still another object of the present invention is to provide an image reading device provided with an illumination device including a light source positioned on a face of a translucent member and adapted to emit the light from a lateral face of the translucent member, and a photoelectric converting device adapted to receive the light emitted by the illumination device and reflected by an illuminated area, wherein the translucent member has uneven light emission characteristics along the longitudinal direction thereof.

Still another object of the present invention is to provide an information processing apparatus provided with:

(a) a photoelectric converting device including a plurality of photoelectric converting elements positioned opposite to the image of an original sheet to be read;

(b) an illumination device for illuminating the original sheet, the device including a light source positioned on a face of a translucent member and adapted to emit the light from a lateral face thereof;

(c) transport means for transporting the original sheet;

(d) an output unit for recording an image on a sheet by electrical signals corresponding to the image information; and (e) a controller for controlling the photoelectric converting device, the light source, the transport means and the output unit;

wherein the translucent member of the illumination means has uneven light emission characteristics along the longitudinal direction thereof.

BRIEF DESCRIPTION OF THE DRAWINGS

FIG. 7 is a schematic cross-sectional view showing an example of the LED light source;

FIGS. 20A to 20C are views showing preferred embodiments of the light guide and the illumination device of the present invention;

FIGS. 21A to 21C are views showing preferred embodiments of the light guide and the illumination device of the present invention;

FIGS. 22A to 22C are views showing preferred embodiments of the light guide and the illumination device of the present invention;

FIGS. 24A to 24C are views showing preferred embodiments of the light guide and the illumination device of the present invention;

FIGS. 25A to 25C are views showing preferred embodiments of the light guide and the illumination device of the present invention;

FIGS. 26A to 26C are views showing preferred embodiments of the light guide and the illumination device of the present invention;

FIGS. 29A to 29C are views showing preferred embodiments of the light guide and the illumination device of the present invention;

FIGS. 30A to 30C are views showing preferred embodiments of the light guide and the illumination device of the present invention;

FIGS. 31 A to 31C are views showing preferred embodiments of the light guide and the illumination device of the present invention;

FIGS. 35A to 35C are views showing preferred embodiments of the light guide and the illumination device of the present invention;

FIGS. 37A to 37C are views showing preferred embodiments of the light guide and the illumination device of the present invention;

FIGS. 38A to 38C are views showing preferred embodiments of the light guide and the illumination device of the present invention;

FIGS. 39A to 39C are views showing preferred embodiments of the light guide and the illumination device of the present invention;

FIGS. 42A to 42C are views showing preferred embodiments of the light guide and the illumination device of the present invention;

FIGS. 46A to 46C are views showing preferred embodiments of the light guide and the illumination device of the present invention;

FIGS. 50A to 50C are views showing preferred embodiments of the light guide and the illumination device of the present invention;

FIGS. 51A to 51C are views showing preferred embodiments of the light guide and the illumination device of the present invention;

DETAILED DESCRIPTION OF THE PREFERRED EMBODIMENTS

In the illumination device consisting of the aforementioned linear light source, the total light amount is low and the light intensity distribution is uneven as explained before. This is because the light from the light source consisting of the LED chip is not emitted, in a uniform and sufficient manner, from the oblong translucent member (light guide) 3 to the exterior.

According to the present invention, the oblong translucent member (light guide) is given uneven light emission characteristics along the longitudinal direction thereof, thereby attaining almost uniform light emission characteristics along the longitudinal direction over the entire linear light source. Thus the difference in the light amount between an area close to the light source and an area far from the light source can be reduced, and there can thus be realized a linear light source showing reduced unevenness in the light amount on the illuminated surface.

Also there can be realized an illumination device with reduced unevenness in the light amount, by providing the translucent member with an area for reflecting and/or diffusing the light introduced into the member and specifying the position of the area.

Now the present invention will be clarified in detail by preferred embodiments thereof, shown in the attached drawings.

[Embodiment 1]

Figure 1A:
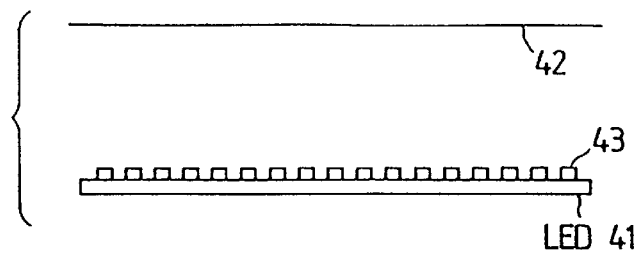
FIGS. 1A, 1B, 2A, 2B, 3 and 4 are views showing examples of the illumination device utilizing an LED array.
Figure 1B:
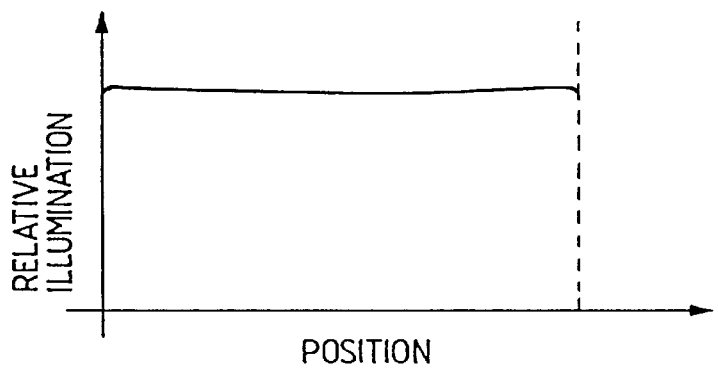
Figure 2A:
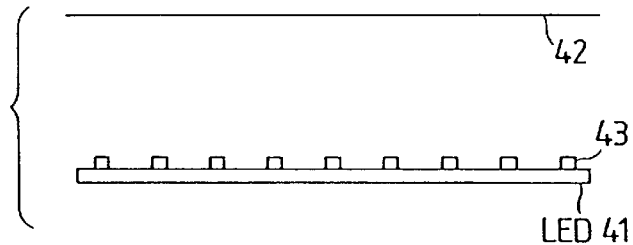
Figure 2B:
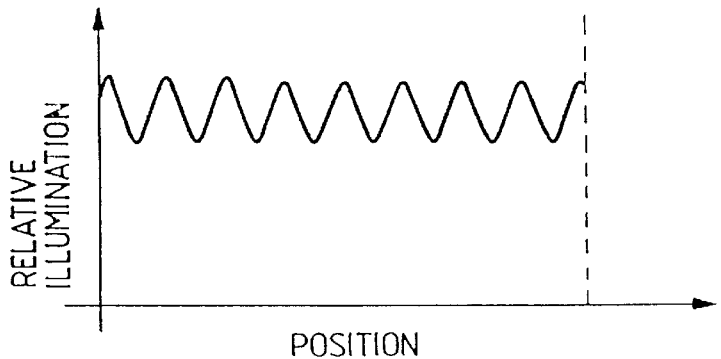
Figure 3:
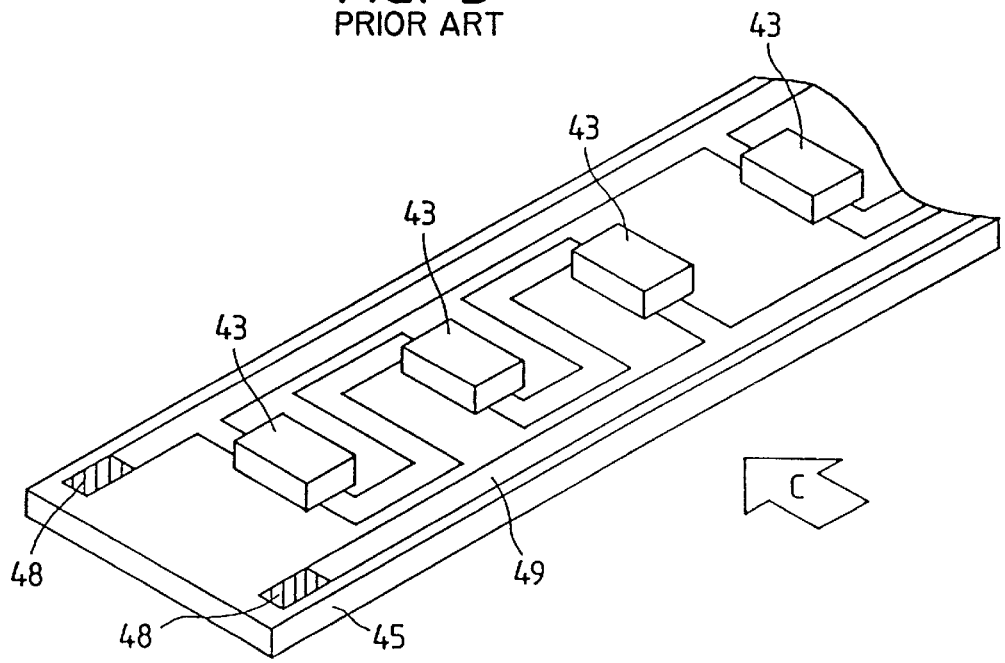
Figure 4:
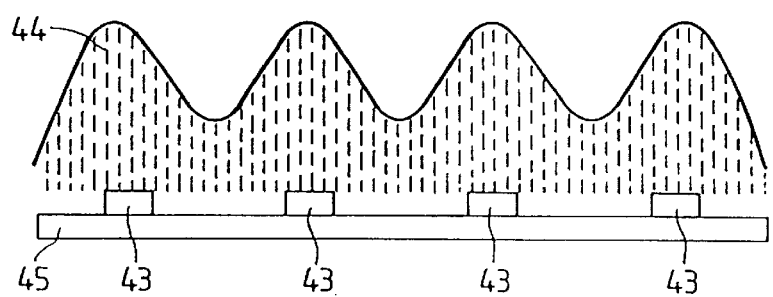
Figure 5:
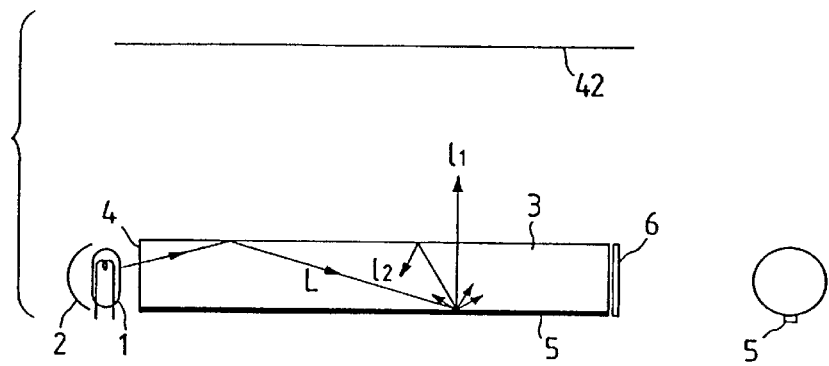
FIGS. 5, 6A and 6B are views showing examples of the illumination device utilizing a translucent member.
Figure 6A:
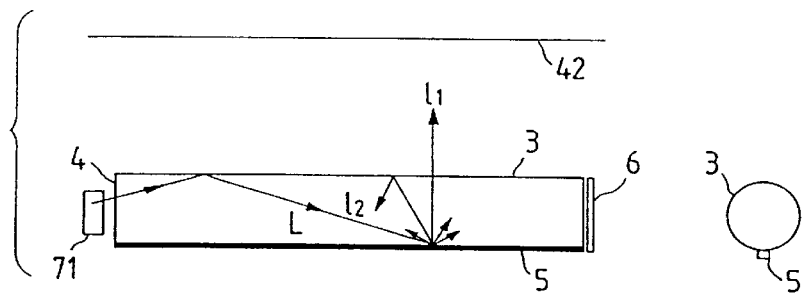
Figure 6B:
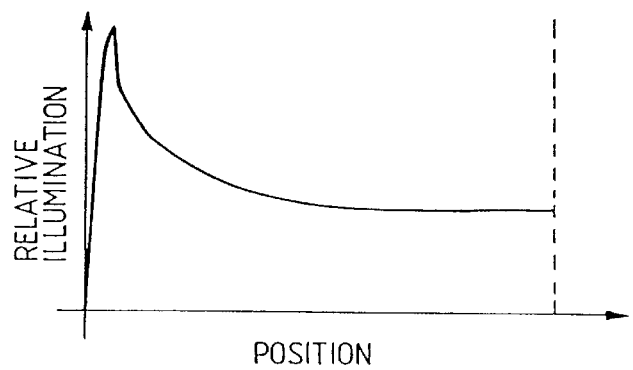
Figure 8:
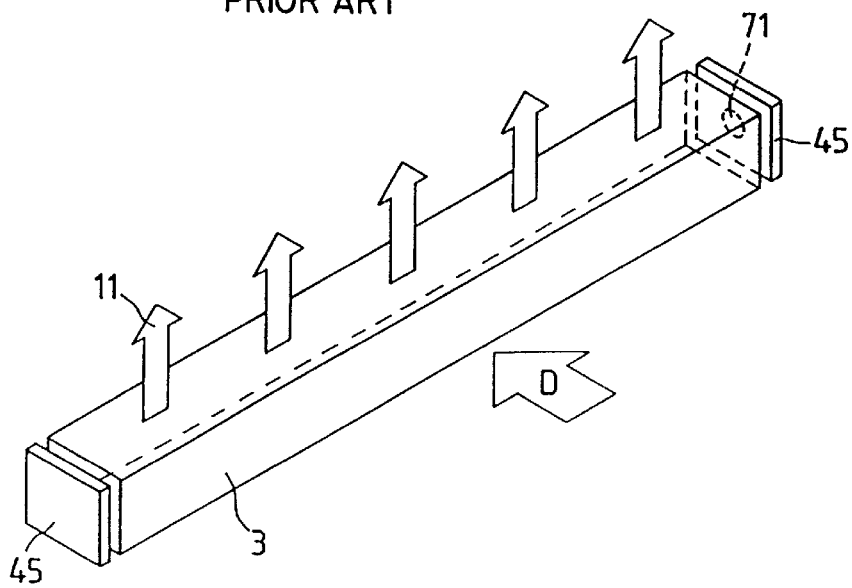
FIG. 8 is a view showing preferred embodiments of the light guide and the illumination device of the present invention.
Figure 9:
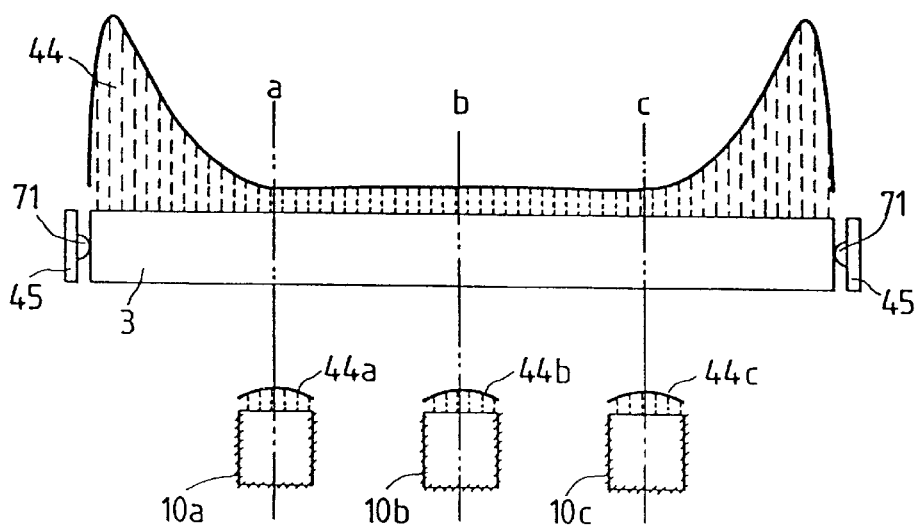
FIG. 9 is a view showing preferred embodiments of the light guide and the illumination device of the present invention.
Figure 10:
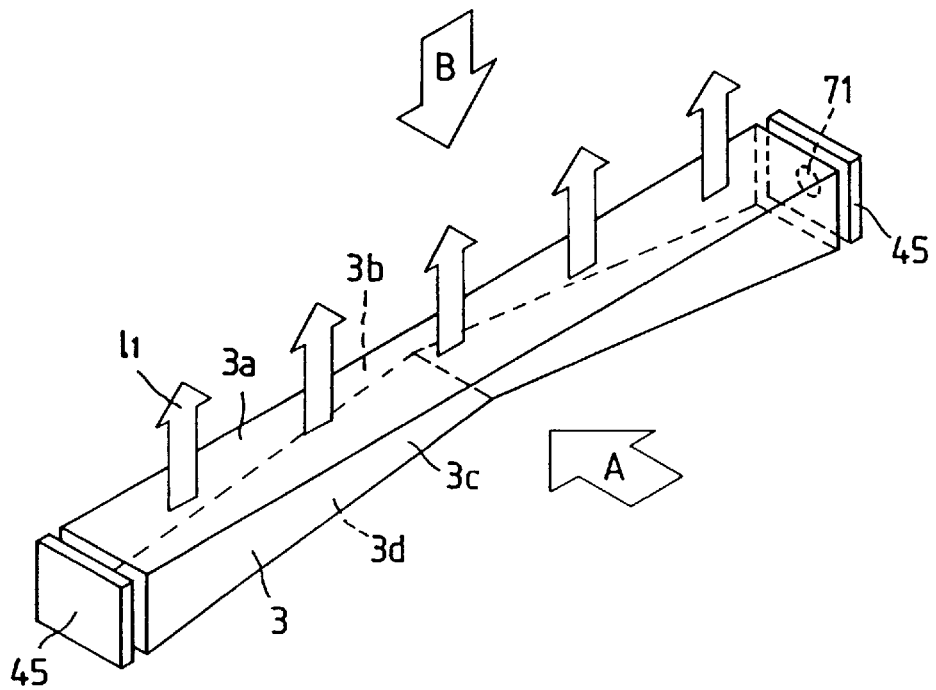
FIG. 10 is a view showing preferred embodiments of the light guide and the illumination device of the present invention.

FIG. 10 is a perspective view showing an embodiment 1 of the linear light source of the present invention, wherein shown are an oblong transparent (translucent) member 3, substrates 45; LED chips 71 mounted on the substrates 45, and a light emitting direction $1_1$. A lateral face 3a of the transparent member 3 constitutes the light emitting face, while other lateral faces 3b, 3c and 3d are formed as mirror faces to constitute light reflecting faces.

The oblong transparent member 3 is provided at both ends thereof with the LED chips 71 constituting: the light sources, and the light therefrom enters the transparent member 3 from the end faces thereof and is emitted from the lateral face 3a in the direction $1_1$ either directly or after reflection on the lateral faces 3b, 3c, 3d. In this embodiment, the lateral face 3d is tapered so that the transparent member 3 has a smaller cross section at the center, whereby the light can be efficiently reflected in the direction $1_1$. In this embodiment, the lateral face 3d is inclined by a constant angle, but such a constant angle is not essential.

Figure 11:
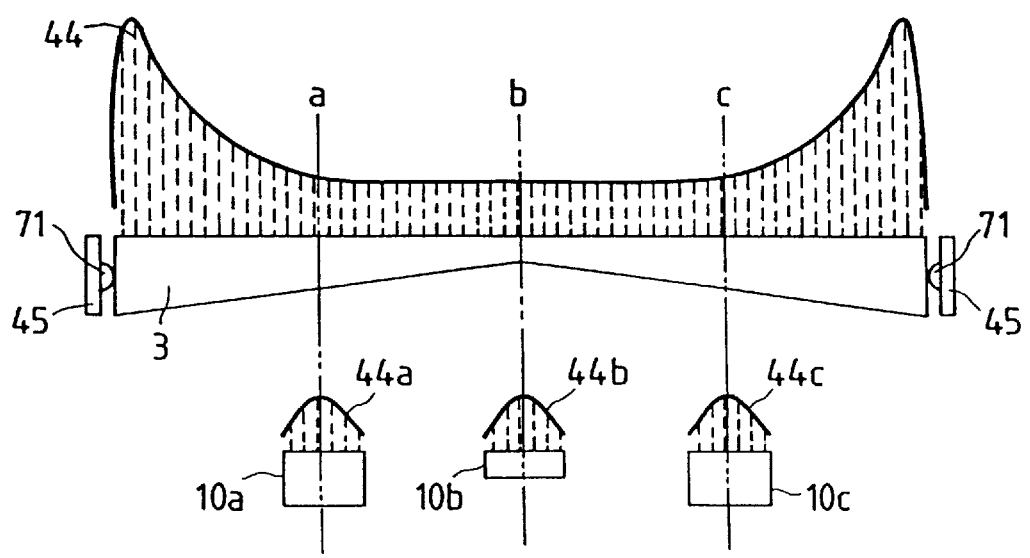
FIG. 11 is a view showing preferred embodiments of the light guide and the illumination device of the present invention.

FIG. 11 shows the elevation view of the light source seen from a direction A in FIG. 10 and the light intensity distribution on an illuminated surface (not shown), wherein a curve 44 shows the illumination intensity distribution, while 10a, 10b, 10c show the cross sections of the transparent member 3 at positions a, b, c, and 44a, 44b, 44c indicate the illumination intensity distributions at the positions. The present embodiment can provide a uniform light amount distribution with an increased amount of light in the area a-c.

[Embodiment 2]

Figure 12:
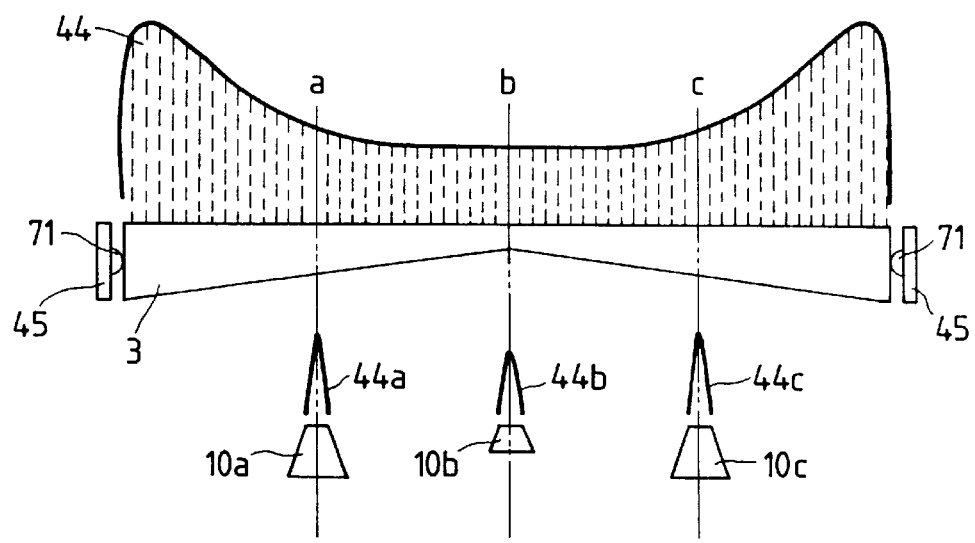
FIG. 12 is a view showing preferred embodiments of the light guide and the illumination device of the present invention.

FIG. 12 shows the elevation view of an embodiment 2 of the linear light source of the present invention, seen from the direction A shown in FIG. 10, and the light amount distribution on an illuminated surface (not shown). Components that are the same as those shown in FIGS. 10 and 11 are represented by the same numbers and will not be explained further.

Figure 13:
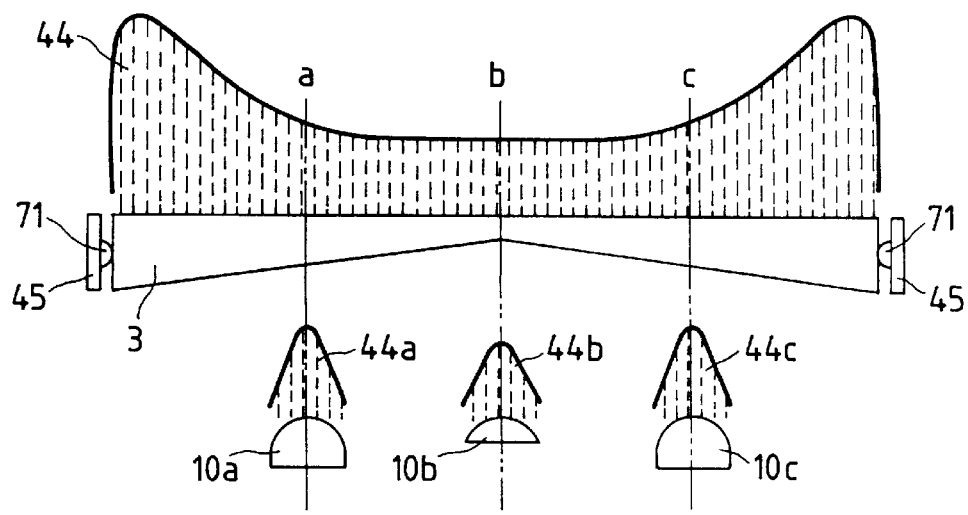
FIG. 13 is a view showing preferred embodiments of the light guide and the illumination device of the present invention.

In the present embodiment, the lateral face 3d of the oblong transparent member 3 is tapered so as to reduce the cross section thereof at the center as in Embodiment 1, and the transparent member 3 is formed so as to have a trapezoidal cross section having the shorter side at the light emitting face and the longer side at the opposite face. Such a trapezoidal cross section, as shown in FIG. 12, allows the light to be emitted in the transparent member 3, in a more condensed state, into the direction $1_1$, thereby increasing the illumination intensity on the illuminated surface, in comparison with Embodiment 1, within the area a-c. The cross section of the oblong transparent member 3 is not limited to the trapezoidal form but may also be formed as a partially cut-off circle, as shown in FIG. 13.

[Embodiment 3]

Figure 14:
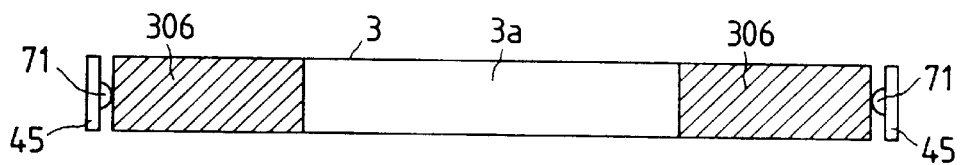
FIG. 14 is a view showing preferred embodiments of the light guide and the illumination device of the present invention.
Figure 16:
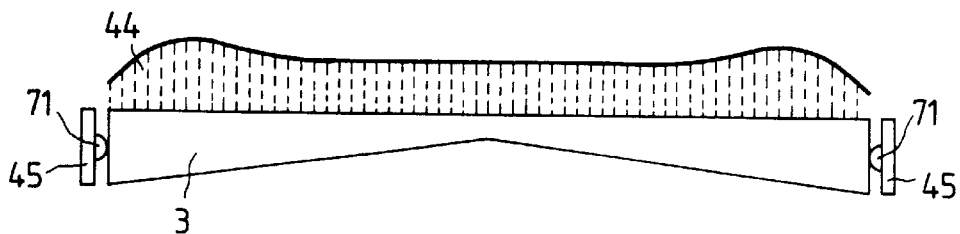
FIG. 16 is a view showing preferred embodiment of the light guide and the illumination device of the present invention.

FIG. 14 is a plan view of an embodiment 3 of the linear light source of the present invention, seen from a direction B shown in FIG. 10, and FIG. 16 shows the elevation view of the embodiment seen from a direction B shown in FIG. 10 and the light amount distribution. Components that are the same as those shown in FIGS. 10 and 11 are represented by the same numbers and will not be explained further.

As shown in FIG. 14, the oblong transparent member 3 of this embodiment is provided, in the vicinities of the light sources on the light emitting lateral face 3a, with light attenuating films 306, which attenuate the light emitted from the vicinity of the light sources, thereby providing a light amount distribution, as shown in FIG. 16, on the illuminated surface.

Figure 15:
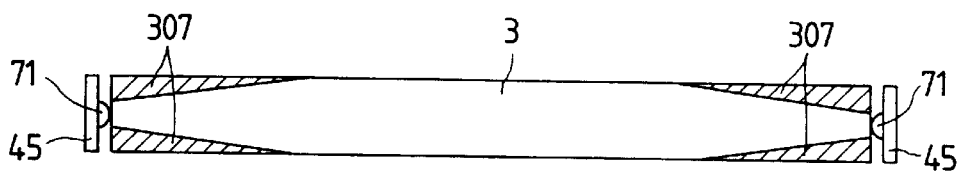
FIG. 15 is a view showing preferred embodiments of the light guide and the illumination device of the present invention.

The attenuating films 306 may be replaced by light shielding films 307 for reducing the light amount in the vicinity of the light source. FIG. 15 is a plan view showing an example in which the light shielding films are provided in the vicinities of the light sources, on the light emitting lateral face 3a of the oblong transparent member 3. The light amount distribution, as shown in FIG. 16, may also be obtained on the illuminated surface by intercepting the light in the vicinity of the light source by means of the light shielding films 307 as shown in FIG. 15.

[Embodiment 4]

Figure 17B:
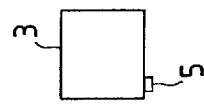
FIGS. 17A to 17C are views showing preferred embodiments of the light guide and the illumination device of the present invention.
Figure 17A:
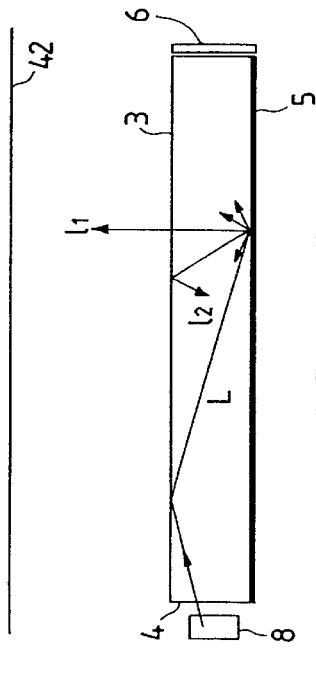
Figure 17C:
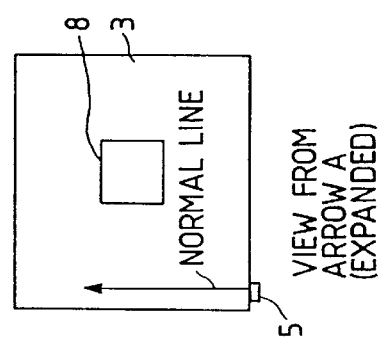

FIGS. 17A to 17C are schematic views of an embodiment 4 of the illumination device of the present invention, wherein FIG. 17A is a schematic lateral view of the device, illustrated together with an original constituting the illuminated surface, FIG. 17B is a schematic cross-sectional view of the translucent member 3 and an area 5, cut in a plane perpendicular to the plane of FIG. 17A, and FIG. 17C is a schematic lateral view of the device, seen from a direction A shown in FIG. 17A. As shown in these drawings, the illumination device of this embodiment is provided with an LED light source 8 at an end face in the longitudinal direction of a translucent member 3 of a rectangular cross section, and with an area 5 for reflecting (or diffusing) the light beam, provided in a part of the translucent member 3 on a face opposed to the light emitting area thereof and formed by a coarse surface or by a coating with light diffusing-reflecting paint. On the end face opposite to the LED light source 8, there is formed a reflecting portion 6 adapted to reflect the light propagating in the translucent member 3 and formed by evaporation of a metal such as aluminum or by coating of light diffusing-reflecting paint on the end face itself of the translucent member 3 or by forming such means as a separate member.

In this embodiment, as shown in FIG. 17C, the center of the LED light source is aberrated (with an offset) from the normal line passing through the center of the shorter width of the area 5.

The light beam emitted from the LED light source 8 normally propagates inside the translucent member by repeated reflections therein, and returns toward the LED light source 8 after reaching the reflecting portion 6. Also, the light entering the area 5 in the course of propagation is diffused or reflected therein and emitted through the exit portion toward the original constituting the illuminated surface ($1_1$) or propagates again within the translucent member by reflections therein ($1_2$).

In this embodiment, since the LED light source 8 is aberrated from the normal line passing through the center of the width of the area 5, the light directly entering the area 5 from the LED light source 8 is reduced, so that there can be sufficiently resolved the unevenness that the illumination intensity is higher only at the side of the LED light source 8 in the longitudinal direction of the translucent member 3. Also since the light entering the area 5 is principally the indirect light reflected inside the translucent member 3 after being emitted from the LED light source 8, the light beam emitted from the exit portion is made uniform over the longitudinal direction of the translucent member 3.

These situations will be explained further in the following, with reference to the attached drawings.

Figure 18:
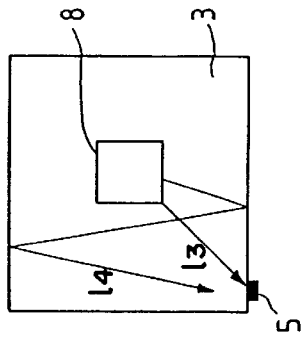
FIG. 18 is a view showing preferred embodiments of the light guide and the illumination device of the present invention.

FIG. 18 shows a lateral face that is the same as that shown in FIG. 17C, wherein a part of the light emitted from the LED light source 8 is indicated by arrows $1_3$, $1_4$, which respectively indicate direct and indirect lights from the light source 8.

In the present embodiment, since the LED light source 8 is aberrated from the normal line passing through the center of the area 5, the proportion of the direct light $1_3$ decreases while that of the indirect light $1_4$ increases, so that the light beam emitted from the exit portion can be made uniform over the entire translucent member 3.

The amount of the aberration of the LED light source 8 is defined as at least out of the normal line passing through the center of the area 5, but it should be suitably determined in practice, because in case of an excessively large amount of aberration, the light coming from the LED light source 8 is mostly composed of the indirect light and there will also result in a loss of the light beam in the translucent member 3. In particular, an extremely large aberration should he avoided since the illumination intensity becomes lower at the side of the LED light source 8.

Figure 19A:
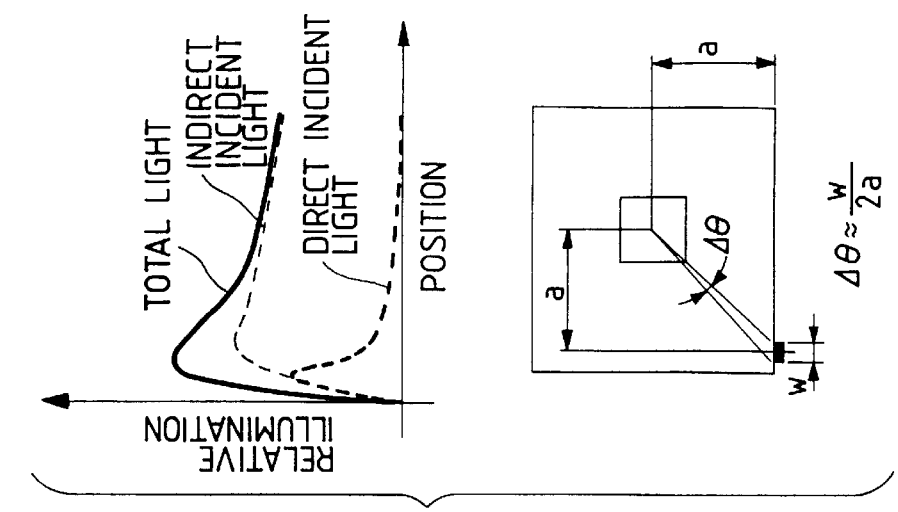
FIGS. 19A to 19C are views showing preferred embodiments of the light guide and the illumination device of the present invention.
Figure 19B:
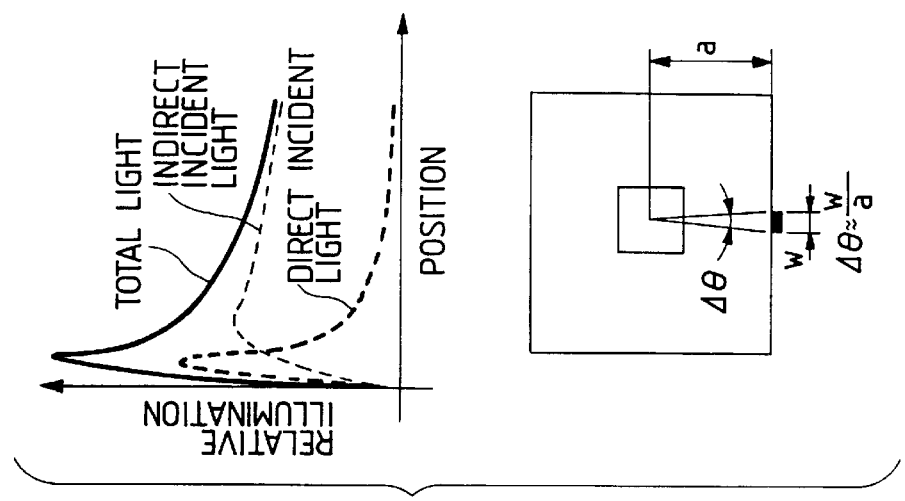
Figure 19C:
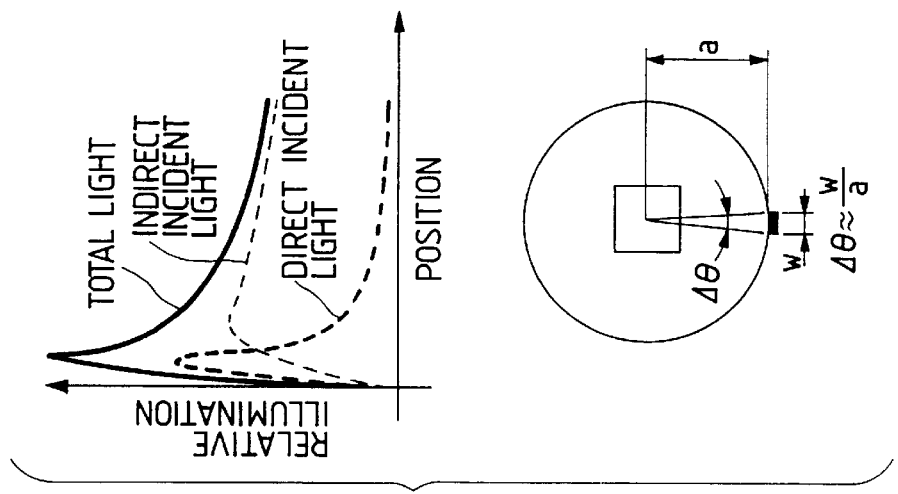

FIGS. 19A to 19C are given for explaining the difference between the illumination device of the present embodiment and other illumination devices, In these drawings there are shown schematic lateral views of the translucent member and the LED light source, seen from a direction similar to the direction A in FIG. 17A and corresponding illumination intensity distributions along the longitudinal direction of the translucent member. FIGS. 19A and 19B illustrate a reference example to be compared with the device of the present embodiment, while FIG. 19C illustrates the device of the present embodiment.

FIG. 19A shows an example employing a translucent member of circular cross section, which is positioned so that the center thereof coincides with the center of the LED light source and the center lies on the normal line passing through the center of the area 5. Also FIG. 19B shows an example employing a translucent member of rectangular cross section, which is positioned so that the crossing point of the diagonals of the rectangular cross section coincides with the center of the LED light source and the center lies on the normal line passing through the center of the area 5.

On the other hand FIG. 19C shows an example of the illumination device of the present embodiment, employing a translucent member of rectangular cross section, wherein the center of the LED light source 8 is aberrated by a distance "a" from the normal line passing through the center of the width of the area 5.

In all the cases, the center of the light source is separated by a same distance "a" from a face of the translucent member on which the area 5 is formed.

The light emitted from the LED light source 8 and introduced into the translucent member can be divided into direct incident light entering the area 5 directly without any reflection on the internal walls of the translucent member, and indirect incident light entering the area 5 after at least a reflection on the internal walls of the translucent member.

The amount of the direct incident light depends on the angle $\Delta\theta$ of the area 5 seen from the LED light source 8, and increases with an increase in the angle. In the arrangements shown in FIGS. 19A and 19B, where the LED light source is positioned directly above the area 5, the angle can be represented as $\Delta\theta = \{2\tan^{-1}(w/2)/2\} \cong w/a$, wherein "w" is the width of the area 5 and "a" is the distance along the normal line from the LED light source to the light exit face.

On the other hand, in the present embodiment shown in FIG. 19C, wherein the LED light source is not positioned directly above the area 6 but is aberrated laterally by a distance "a", the angle can be represented as $\Delta\theta = 2\tan^{-1}\{(w/2 \times 2^{1/2})2^{1/2} \times a\} \cong w/2a$ and is therefore about a half of the angle that is depicted in the arrangements shown in FIGS. 19A and 19B.

For this reason, the amount of the direct incident light becomes lower in the present embodiment than in the conventional configurations. On the other hand, the amount of indirect incident light increases correspondingly. As a result, the entire illumination intensity distribution is improved, because of the relaxation of the peak in the vicinity of the LED light source.

These situations will be readily understood from the curves of the relative illumination intensity as a function of the distance from the light source. In the case of FIGS. 19A and 19B, the direct incident light has a peak and shows a high light amount at the side of the light source, so that the total light amount, consisting of the direct and indirect incident lights, is uneven, having a peak at the side of the light source. On the other hand, the present embodiment shown in FIG. 19C provides a uniform light amount over the entire device, though the light amount at the light source side is lowered. Consequently, the illumination device of the present embodiment is more convenient for use.

[Embodiment 5]

FIGS. 20A to 20C show a variation of the illumination device of the present invention shown in FIGS. 17A to 17C. The variation is different from the latter in that the translucent member 3 is provided with a protruding portion 35, and the area 5 is formed on an end face of the protruding portion 35, in order to further reduce the direct incident light from the LED light source.

As the area 5 is formed on the lower face of the protruding portion 35, extended from a face 31 of the translucent member 3, as shown in FIGS. 19A to 19C, the amount of direct incident light from the LED light source to the area 5 becomes smaller in comparison with the case shown in FIGS. 17A to 17C. Stated differently, most of the light emitted from the LED light source does not enter the area 5 directly but after at least a reflection within the translucent member 3.

Thus, in the illumination device shown in FIGS. 20A to 20C, the amount of direct incident light decreases and the proportion of the indirect incident light becomes even higher. In comparison with the case shown in FIG. 19C, the illumination intensity at. the light source side is lower due to the decreased proportion of the direct incident light, and the illumination intensity of the indirect incident light increases, though slightly, due to the increased proportion of the indirect incident light.

Consequently, in the configuration shown in FIGS. 20A to 20C, providing the translucent member 3 with a protruding portion and forming the area 5 on the end face thereof allows obtaining a higher illumination intensity with improved uniformity.

[Embodiment 6]

FIGS. 21A to 21C show another variation of the device shown in FIGS. 17A to 17C. In this variation, the translucent member 3 is extended to a side opposite to the LED light source, with respect to the area 5.

Such a configuration achieves more uniform illumination intensity for the indirect incident light, so that, though the illumination intensity is higher at the light source side, the illumination intensity becomes more uniform in the remaining portion excluding a part at the light source side.

[Embodiment 7]

FIGS. 22A to 22C show an illumination device in which the configurations shown in FIGS. 20A to 20C and FIGS. 21A to 21C are combined. More specifically, the translucent member is provided, on a face opposite to the light exit face, with a protruding portion 35, and the area 5 is formed on the end face of the protruding portion 35, and the translucent member 3 is extended to a side opposite to the light source 8 with respect to the area 5.

In such a combined structure, the area 5 principally receives the indirect incident light more reflected within the translucent member 3, so that the illumination intensity distribution becomes more uniform for the indirect incident light. The situation for the direct incident light is similar to the configuration shown in FIGS. 20A to 20C.

Consequently, the total illumination intensity becomes more uniform in comparison with the case shown in FIGS. 20A to 20C, since the contribution of the indirect incident light is made more uniform.

[Embodiment 8]

The light amount of the LED light source is less than that of the incandescent electric bulb. For increasing the light amount, the number of the LED chips can be increased.

For positioning a larger number of the LED light sources while satisfying the principle of the present invention, the end face of the translucent member, where the LED light sources are to be positioned, can be made larger.

Figure 23A:
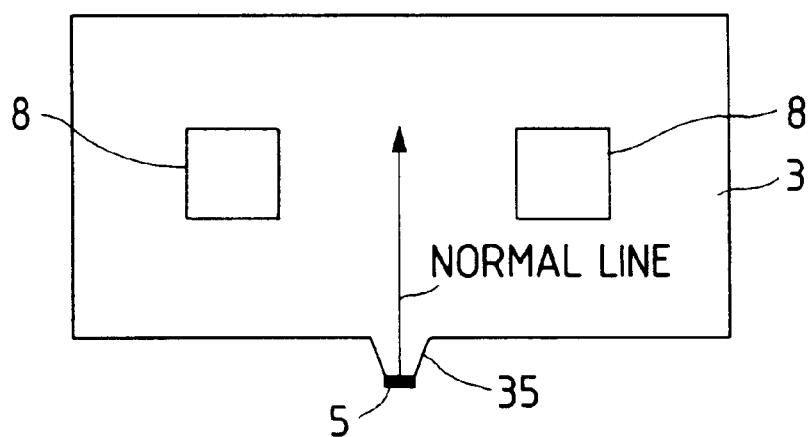
FIGS. 23A and 23B are views showing preferred embodiments of the light guide and the illumination device of the present invention.

For example, as shown in FIG. 23A, an increase in the light amount can be achieved by positioning an LED light source 8 also on the extended side of the translucent member 3. In such a case, both the direct and indirect incident lights to the area 5 increase, but the illumination intensity can be made more uniform over the entire area, without local increase at the side of the LED light source 8, by suitably balancing the amounts of the direct and indirect incident lights from the LED light source 8 to the area 5 (for example, by suitably separating the position of the LED light source 8 from the protruding portion 35 (area 5)).

Figure 23B:
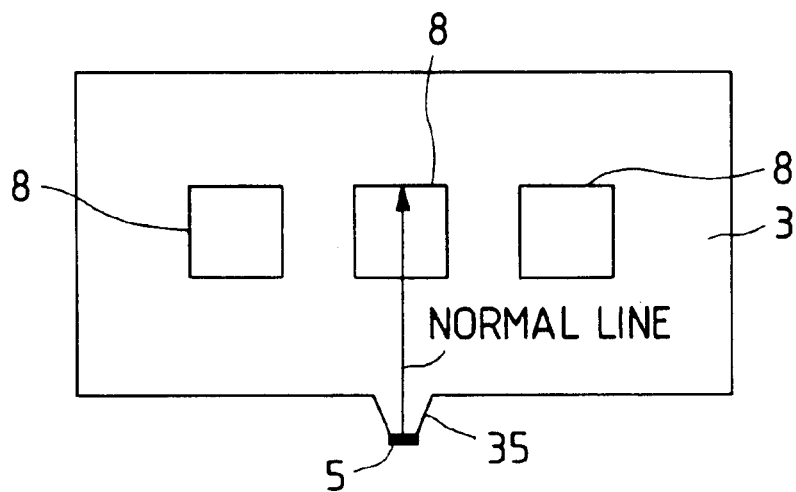

On the other hand, if the LED light sources 8 on both sides of the area 5 (protruding portion 35) are separated from the area 5, the illumination intensity may decrease at the side of the LED light sources 8 due to the decrease of the direct incident light into the area 5 and may increase at the side far from the LED light sources 8 due to the increased proportion of the indirect incident light into the area 5. In such a case, there may be provided an additional LED light source 8, as shown in FIG. 23B, in a position corresponding to the area 5 (protruding portion 35) of the translucent member. Such an arrangement increases the illumination intensity both at the side of the LED light sources 8 and at the side far therefrom. Naturally, such an arrangement of the LED light sources 8 is to be designed in consideration of the balance of the direct and indirect incident lights into the area 5.

Since the illumination intensity of the illumination device is approximately proportional to the number of the LED chips, the configuration as shown in FIG. 23A or 23B enables an additional increase in the illumination intensity.

The arrangement of the LED light sources as shown in FIG. 23A or 23B, which has little effect on the size of the illumination device in comparison with those shown in FIGS. 21A to 21C and 22A to 22C, is desirable in case a higher illumination intensity is required.

[Embodiment 9]

For achieving a more uniform and higher illumination intensity, it is desirable, instead of providing the LED light source 8 only at an end face of the translucent member 3 as in the foregoing embodiments, to provide the LED light sources 8 on both end faces of the translucent member 3.

An example of such an arrangement is shown in FIGS. 24A to 24C, wherein FIG. 24A is a schematic lateral view of the illumination device of the present embodiment, illustrated together with an original constituting the illuminated surface, while FIG. 24B is a schematic cross-sectional view of the translucent member 3 and the area 5 along a plane perpendicular to the plane of FIG. 24A, and FIG. 24C is a schematic lateral view of the illumination device seen from a direction A shown in FIG. 24A.

As shown in these drawings, the illumination device of the present embodiment is provided with the LED light sources 8 on both end faces of the translucent member 3, so that the illumination intensity can be increased further and the distribution of the illumination intensity can be made symmetrical along the longitudinal direction of the translucent member 3. Also in the foregoing embodiments 4 to 8, there may naturally be provided the LED light sources 8 on both end faces of the translucent member 3. Such LED light sources 8 are preferably provided in the same number and arranged in a similar manner on both end faces, but such conditions are not essential.

[Embodiment 10]

Figure 41:
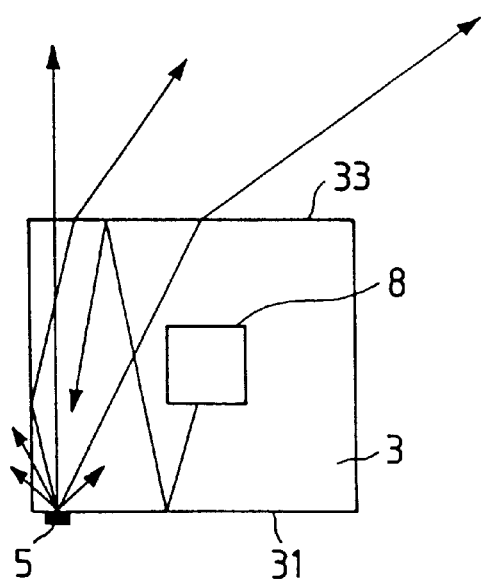
FIG. 41 is a view showing preferred embodiments of the light guide and the illumination device of the present invention.
Figure 43B:
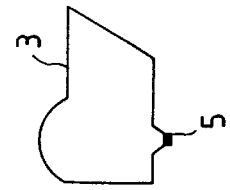
FIGS. 43A to 43C are views showing preferred embodiments of the light guide and the illumination device of the present invention.
Figure 43A:
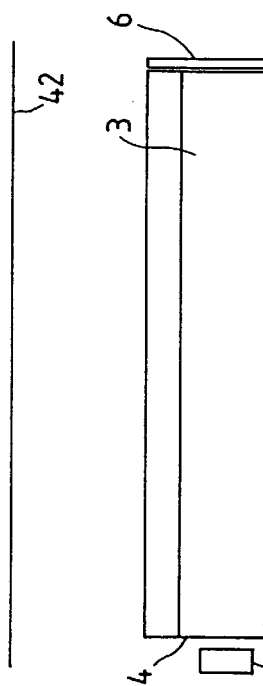
Figure 43C:
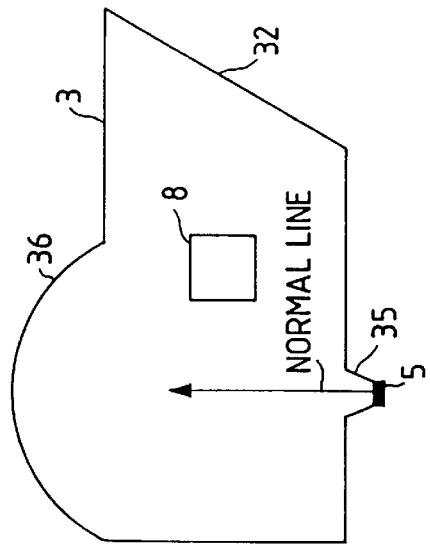
Figure 44A:
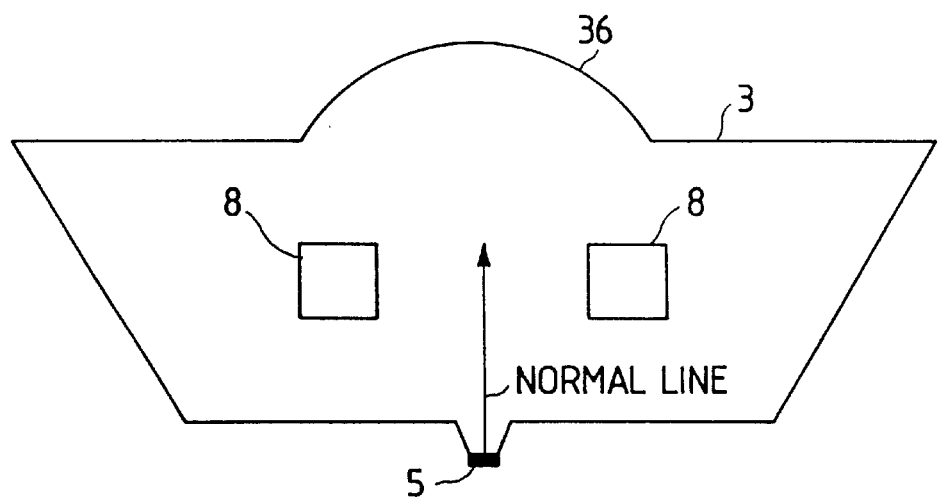
FIGS. 44A and 44B are views showing preferred embodiments of the light guide and the illumination device of the present invention.
Figure 44B:
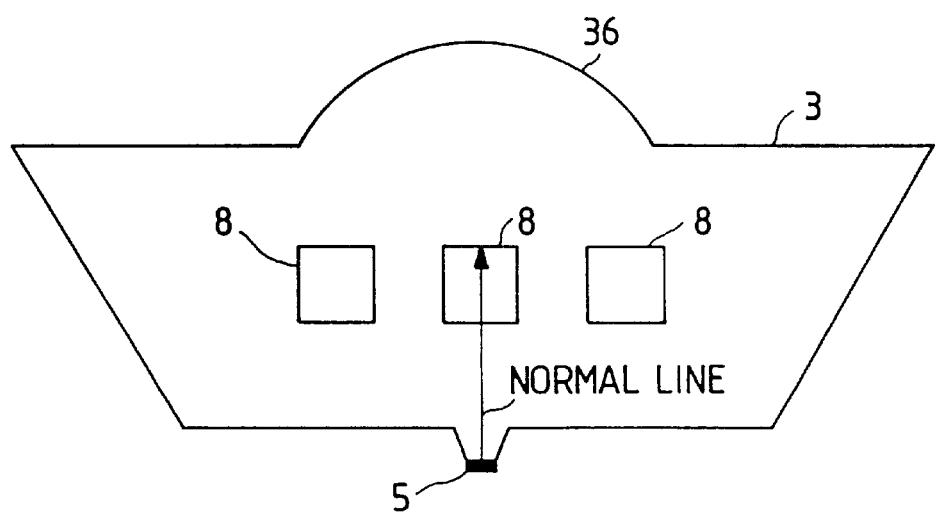
Figure 45B:
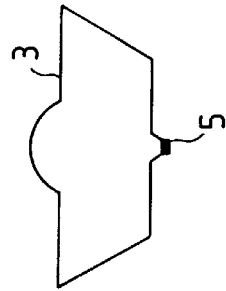
FIGS. 45A to 45C are views showing preferred embodiments of the light guide and the illumination device of the present invention.
Figure 45A:
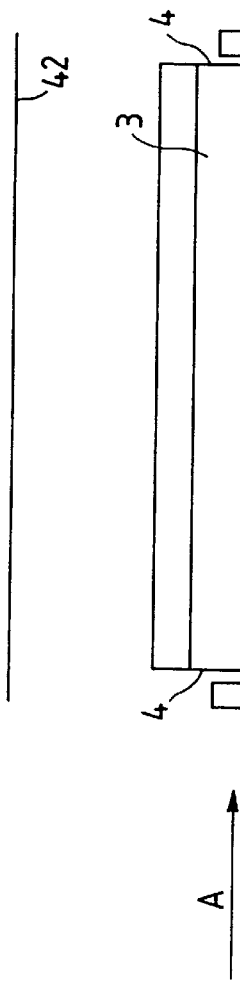
Figure 45C:
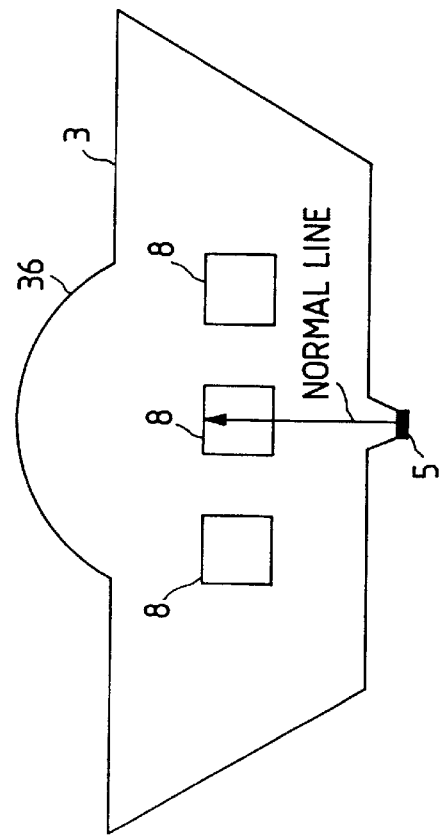

In an information processing apparatus, such as a facsimile apparatus, the area read by the line sensor in a scanning period, in a direction perpendicular to the scanning direction, namely in the direction of relative movement between the original and the sensor, is not so large. Also, among the light scattered and/or reflected in the area 5, only a portion emitted from the exit portion opposite to the illuminated surface contributes to the illumination thereof, as illustrated in FIG. 41, and, since the admitted light is diffuse, the illumination intensity on the illuminated surface declines rapidly with an increase in distance from the light exit portion of the translucent member 3 to the illuminated surface.

Therefore, if a higher illumination intensity is desired, it is effective to condense the light, emitted from the translucent member 3, by means of a lens.

FIGS. 25A to 25C show an example of such an arrangement, in which a cylindrical lens 9 is provided, facing the illuminated surface and along the translucent member 3 of the illumination device shown in FIGS. 24A to 24C. As shown in FIGS. 25A to 25C, the cylindrical lens 9 is effectively positioned so that the center thereof corresponds to the area 5, but such positioning is not essential as long as the necessary illumination intensity can be obtained.

Such a lens arrangement, being capable of illumination of the illuminated surface by condensation of the light emitted from the translucent member 3, allows increasing the average illumination intensity, though the distribution thereof is substantially not affected.

Such an arrangement enables the use of a sensor of a lower sensitivity, or image reading with higher speed if the sensitivity of the sensor is not changed. It can also resolve the loss in the light amount resulting from the color filters used in color image reading, while maintaining a sufficiently high image reading speed.

[Embodiment 11]

The above-explained area 5, formed by a coarse surface or by coating with the light diffusing paint can uniformly diffuse the incident light, but it is not satisfactory in terms of the efficiency of utilization of the light emitted from the LED light source 8, since a proportion of the light returns to the end face of the translucent member 3. To further increase the average illumination intensity, therefore, the above-mentioned area 5 may be replaced by a reflecting face of sawtooth shape.

FIGS. 26A to 26C show an embodiment in which the area 5 of the illumination device, shown in FIGS. 17A to 17C, is formed as a reflecting face of sawtooth shape. The sawtooth-shaped reflecting face of the area 5 can be formed, in a part of the lateral face of the translucent member 3, by integral molding with the translucent member 3, or by cutting work thereon, or by adhesion of a separate sawtooth-shaped member onto the lateral face of the translucent member 3 with adhesive material or by ultrasonic adhesion. Among these, the integral molding with the translucent member 3 is preferable in consideration of the cost and the decrease of the manufacturing steps. The surface of the area 5 constituting the sawtooth-shaped reflecting face is preferably subjected to the evaporation of a bright metal such as aluminum or silver.

As shown in FIG. 26A, a part of the light emitted from the LED light-source 8 enters the area 5, is reflected by the reflecting face of the area 5 and illuminates the illuminated surface. Since the area 5 in this case is not composed of a coarse surface or a coating of the light diff-using paint, the light entering the area 5 is substantially not subjected to diffuse reflection. Consequently, the incident light is efficiently reflected toward the illuminated surface.

Figure 27:
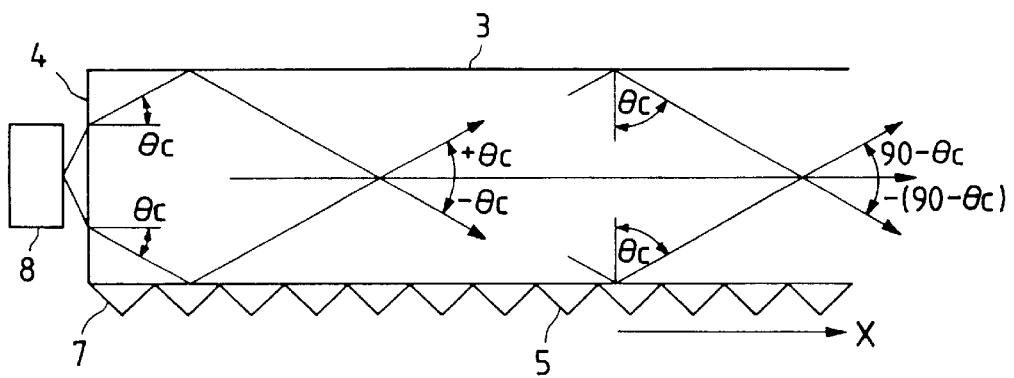
FIG. 27 is a view showing preferred embodiments of the light guide and the illumination device of the present invention.
Figure 28:
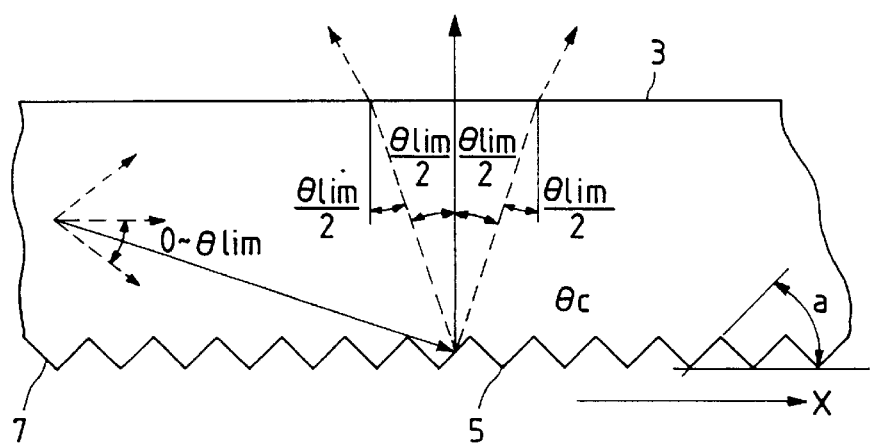
FIG. 28 is a view showing preferred embodiments of the light guide and the illumination device of the present invention.

Now reference is made to FIGS. 27 and 28 for further explaining the sawtooth-shaped reflecting face constituting the area 5.

FIG. 27 is a schematic cross-sectional view of the translucent member 3, and FIG. 28 is a partial magnified view of FIG. 27. The light L emitted from the LED light source 8 enters the translucent member 3 through the entrance end face 4, and propagates in the translucent member 3, repeating reflections therein. A part of the light L reaches the sawtooth-shaped reflecting face 7 of the area 5 after being reflected in the translucent member 3, then is reflected in the area 5 and emerges from the translucent member 3.

In this manner, the light from the LED light source 8 enters the reflecting faces 7, arranged along the X-direction, of the area 5, then is reflected by the reflecting faces and is taken out to the exterior.

The angle θ of the incident light from the LED light source 8 to the X-axis in the translucent member satisfies a relation $-\theta_c<\theta<\theta_c$, wherein $\theta_c$ is the critical angle determined by the refractive indexes of the translucent member and of the external medium (normally air).

Also, when the light propagates by repeating total reflections on the lateral face of the translucent member, the angle θ of such propagating light satisfies a condition $-(90-\theta_c)<\theta<(90-\theta_c)$, because the light has to have an angle exceeding the critical angle $\theta_c$ with respect to the normal line to the lateral face.

Consequently, in order that the light beam emitted from the LED light source 8 and entering the translucent member through the end face thereof can propagate in the member by repeated reflections, the angle θ of the light beam with respect to the X-axis has to satisfy the narrower one of the above-mentioned two conditions.

If $\theta_{lim}$ is taken as the smaller one of $\theta_c$ and $(90-\theta_c)$, there should be satisfied a condition $-\theta_{lim}<\theta<\theta_{lim}$.

In order that the light beam can enter and be reflected by the sawtooth-shaped reflecting faces 7, the angle θ of the light beam has to be in the negative range, or a range from 0 to $-\theta_{lim}$, as shown in FIG. 28. If the angle α of each reflecting face 7, with respect to the X-axis, is selected as $\alpha=\{90+(-\theta_{lim}/2)\}/2$, the light beam is reflected within an angular range of $90°\pm(\theta_{lim}/2)$ with respect to the X-axis and is released to the exterior through an exit area positioned opposite to the area 5. If the exit area and the X-axis are substantially parallel, the incident angle of the light beam to the exit area does not exceed $(\theta_{lim}/2)$. Since $\theta_{lim}$ is defined as the smaller one of $\theta_c$ and $(90-\theta_c)$, there stands a relation $\theta_{lim} \leq \theta_c$, indicating that the incident angle to the exit area is smaller than the critical angle.

Consequently, there is reduced the proportion of the light which is totally reflected on the exit area, then proceeds inversely in the translucent member and is released from the entrance end face thereof, and there is obtained an illumination device of a higher illumination intensity, with a higher efficiency of utilization of the light.

Even if the above-mentioned angle cc does not completely coincide with the foregoing definition $\{90+(-\theta_{lim}/2)\}/2$, a similar effect can be obtained as long as a condition: $(90-\theta_c)<\alpha<(90+\theta_c-\theta_{lim})$ is satisfied, because the incident angle of the light beam reflected by the sawtooth-shaped reflecting faces 7 and entering the exit area exceeds the critical angle $\theta_c$.

For example, if the translucent member 3 is composed of acrylic resin, there is obtained a condition $\theta_{lim}=\theta_c\cong42°$. Thus, by selecting the angle α as $\{90+(-42/2)\}/2=34.5\cong35°$, it is possible to efficiently take out the light beam, entering from the LED light source 8, from the translucent member 3. In terms of the angle α mentioned above, this corresponds to a condition $24°<\alpha<47°$.

If the diameter of the translucent member 3 is sufficiently smaller than the length thereof, the light propagating therein is almost uniformly distributed within a range from $+\theta_{lim}$ to $-\theta_{lim}$. It is therefore preferable to select the angle a as close as possible to $90+(-\theta_{lim}/2)$ because the principal ray of the emerging light beam becomes perpendicular to the exit area.

FIGS. 29A to 29C and 30A to 30C respectively show variations of the illumination devices shown in FIGS. 20A to 20C and 21A to 21C, wherein the area 5 is modified to the sawtooth-shaped reflecting faces 7.

Such sawtooth-shaped reflecting faces formed on the end face of the protruding portion 35 allow not only to reduce the unevenness in the illumination intensity but also to increase the average illumination intensity.

[Embodiment 12]

Figure 33:
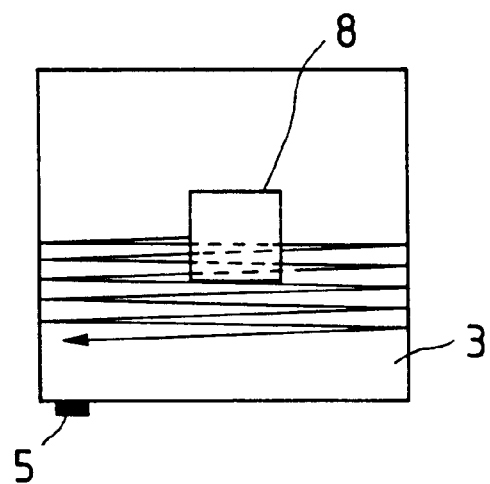
FIG. 33 is a view showing preferred embodiments of the light guide and the illumination device of the present invention.

As explained in the foregoing, the light entering the translucent member 3 may be released to the exterior upon reaching the end face thereof, and such phenomenon results in a lowered efficiency of light utilization. Such loss is mostly represented by a proportion of the light that has never entered the area 5 during repeated reflections within the translucent member 3. Also, among the light emitted from the LED light source 8, an angular component perpendicular to the lateral faces of the translucent member 3 or close thereto repeats the reflections between the lateral faces, as shown in FIG. 33, and does not easily enter the area 5. It is therefore possible to further improve the illumination efficiency by causing a reflection so as to facilitate the entry of the light into the area 5 in the course of propagation within the translucent member 3, as will be explained in the following.

FIGS. 31A to 31C schematically show another embodiment of the illumination device of the present invention, wherein FIG. 31A is a schematic lateral view of the illumination device, illustrated together with an original constituting the illuminated surface, while FIG. 31B is a schematic cross-sectional view of the translucent member 3 and the area 5, along a plane perpendicular to that of FIG. 31A, and FIG. 31C is a schematic lateral view of the device, seen from a direction A shown in FIG. 31A. The basic configuration of the illumination device of the present embodiment is the same as that shown in FIGS. 17A to 17C, except that a lateral face of the translucent member 3, positioned opposite to the area 5, is made non-parallel to another lateral face at the side of the area 5, and that the transversal length of a face, bearing the area 5 thereon, of the translucent member 3 is made shorter than that of the opposite face at the illuminated surface side. Stated differently, a lateral face of the translucent member 3, positioned farther from the area 5, is formed as an inclined face 201, spread toward the illuminated surface.

Figure 32:
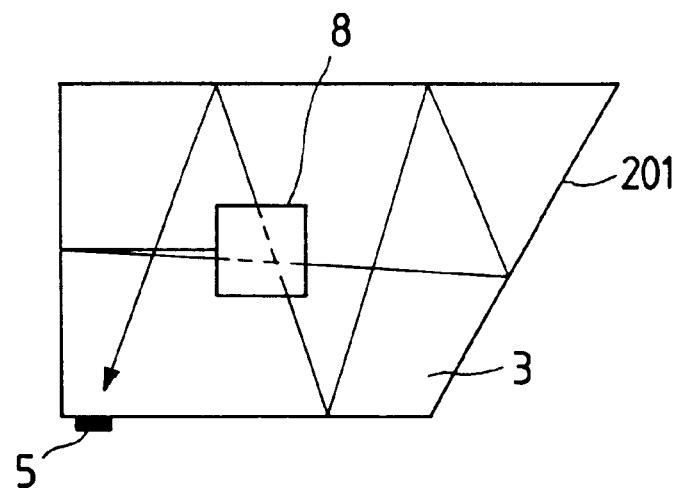
FIG. 32 is a view showing preferred embodiments of the light guide and the illumination device of the present invention.

A part of the light emitted from the LED light source 8 repeats reflections within the translucent member 3 as mentioned above and as illustrated in FIG. 32, but, in this embodiment, the inclined lateral face modifies the angle of reflection, thereby increasing the probability of entry into the area 5. As a result, the efficiency of utilization of the light emitted from the LED light source is improved, whereby the illumination intensity can be increased.

Figure 34B:
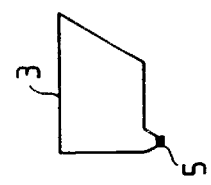
FIGS. 34A to 34C are views showing preferred embodiments of the light guide and the illumination device of the present invention.
Figure 34A:
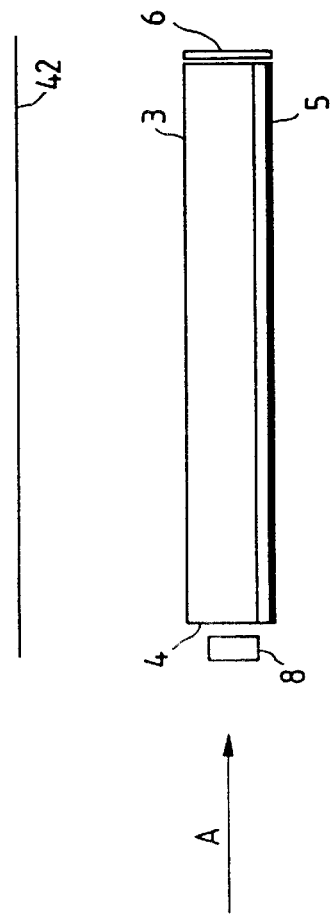
Figure 34C:
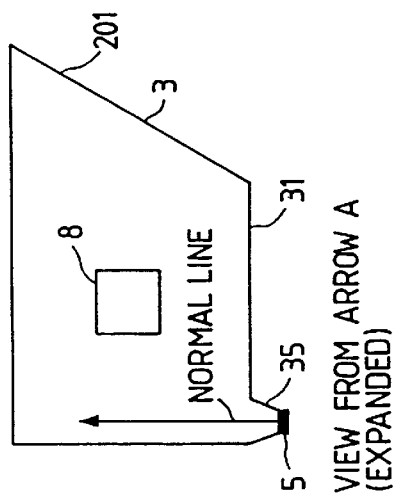
Figure 36A:
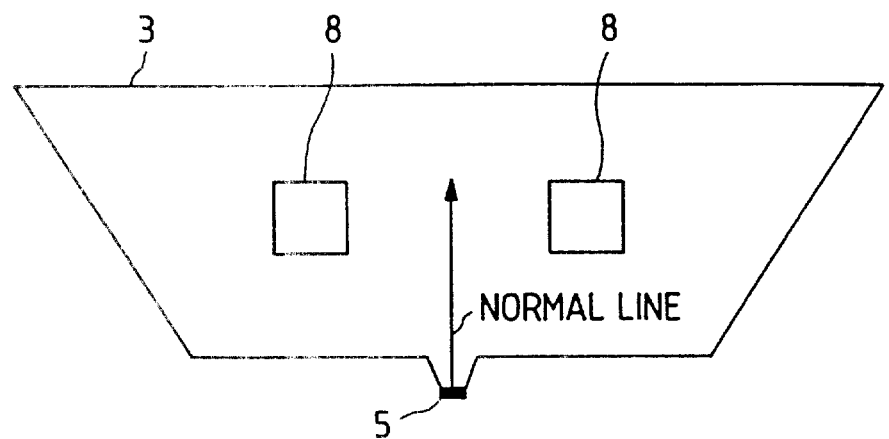
FIGS. 36A and 36B are views showing preferred embodiments of the light guide and the illumination device of the present invention.
Figure 36B:
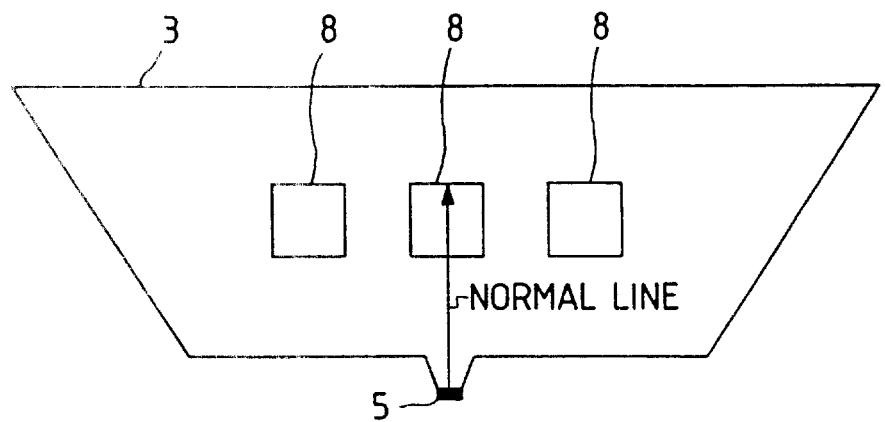

Such an inclined lateral wall is also applicable to the foregoing translucent members of other shapes. In any case, the presence of such an inclined lateral face increases the probability of light entry, thereby attaining a further increase in the illumination intensity. As examples, FIGS. 34A to 34C show a variation, having such an inclined lateral face 201 in the translucent member 3, in the illumination device shown in FIGS. 20A to 20C, and FIGS. 35A to 38C show variations, having similar inclined lateral faces 201 on both lateral faces of the translucent member 3, in the embodiments shown in FIGS. 22A to 25C. In the translucent member including the extended portion, as shown in FIGS. 35A to 38C, the inclined face may be formed on at least either of the lateral faces. Also, the area 5 in these cases may naturally be either of the diffusing type and the reflecting type explained before.

[Embodiment 13]

For further increasing the illumination intensity, as explained in the foregoing, it is effective to condense the light beam, emerging from the translucent member, with a lens. However, if such lens is incorporated as a separate component into the illumination device, there will result an increase in the cost, because of the high precision required for alignment of the lens, and of an increased number of assembling steps. Also, since the lens is formed as a separate component, there will result a loss of the light, at the entry of the emerging light into the lens, by reflection on the lens surface. Although such a loss by reflection is about 4% at maximum, such a loss should naturally be prevented in order to increase the illumination intensity.

Such a reflection loss can be substantially avoided by applying an antireflective treatment to the lens surface. However, such a treatment raises the cost, because of the steps required for such an antireflective treatment. Also, the antireflective treatment can resolve the problem of reflection on the lens surface, but is unable to resolve the above-mentioned problems associated with the precision of assembling or the number of steps required therefor.

It is therefore desirable, in the formation of the translucent member with a plastic material such as acrylic resin or with glass, to integrally form the lens at the same time. With either material, the translucent member and the lens can be integrally formed, for example, by molding.

FIGS. 39A to 39C schematically show another embodiment of the illumination device of the present invention, wherein FIG. 39A is a schematic lateral view of the device, illustrated together with an original constituting the illuminated surface, FIG. 39B is a schematic cross-sectional view of the translucent member 3 and the area 5 along a plane perpendicular to that of FIG. 39A, and FIG. 39C is a schematic lateral view of the device, seen from a direction A shown in FIG. 39A. The basic structure of this embodiment is the same as that shown in FIGS. 17A to 17C, except that a face of the translucent member 3, opposite to the face bearing the area 5 thereon, is formed as a convex lens 36.

With such a configuration, the light beam diffused and reflected in the area 5 is condensed by the function of the lens portion 36. In the device shown in FIGS. 39A to 39C, the light diffused and reflected in the area 5 emerges from the lens portion 36 of the translucent member 3 in a state of a substantially parallel light beam, as will be explained in the following with reference to FIG. 40.

Figure 40:
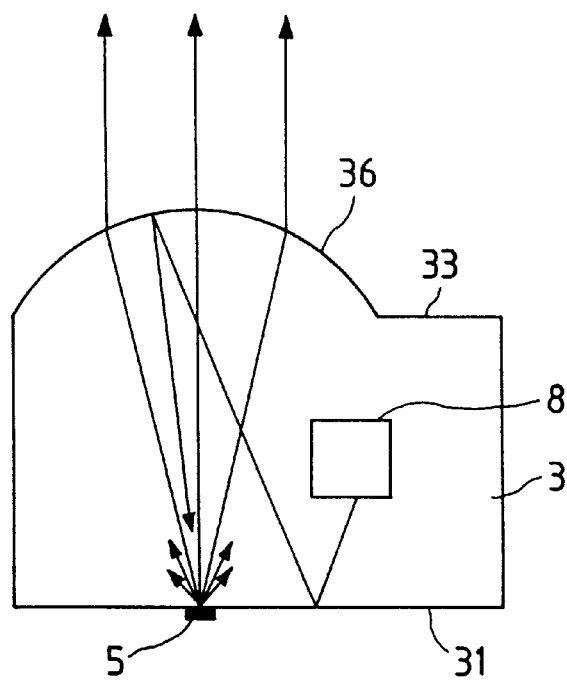
FIG. 40 is a view showing preferred embodiments of the light guide and the illumination device of the present invention.

As shown in FIG. 40, a part of the light emitted from the LED light source 8 enters the area 5 after at least a reflection in the translucent member 3. The incident light to the area 5 is diffuse reflected therein, and a part of the light is reflected again in the translucent member 3, while the remaining part proceeds toward the lens portion 36, and, upon emerging therefrom, it is condensed by the lens effect thereof and is emitted, in a state of a substantially parallel light beam, toward the illuminated surface.

Therefore, since the illuminated surface can be illuminated with a sufficiently high illumination intensity even when the illumination device is distanced from the surface, there can be achieved extremely efficient illumination. Also, for the same reason, the information processing apparatus employing the illumination device has a larger freedom in designing.

Furthermore, the structure shown in FIGS. 39A to 39C can achieve more uniform illumination, in comparison with the structure shown in FIGS. 17A to 17C, because the translucent member 3 is extended laterally by the lens portion 36.

In the present invention, the lens is not required to completely condense (or focus) the light, which is diffused or reflected in the area 5, onto the illuminated surface.

The above-explained translucent member 3 with lens function can not only achieve compactization and cost reduction, but can also provide an illumination device with more uniform illumination intensity. Such translucent member 3 with lens function is not limited to the embodiment shown in FIGS. 39A to 39C, but, as illustrated in FIGS. 42A to 46C, the lens function may naturally be given to the translucent members 3 of the illumination devices shown in FIGS. 20A to 20C, 31A to 31C, 36A to 36C and 37A to 37C.

[Embodiment 14]

Figure 48A:
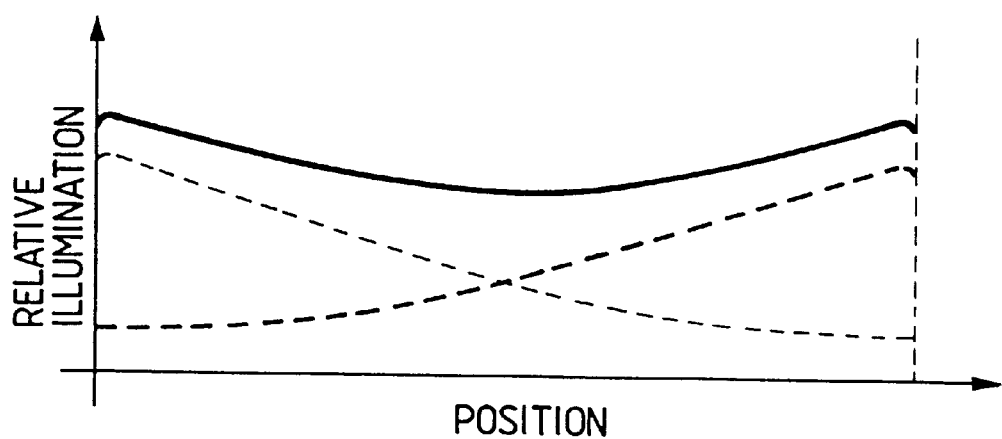
FIGS. 48A and 48B are views showing preferred embodiments of the light guide and the illumination device of the present invention.

The intensity of the indirect incident light emitted from the LED light source and entering the area 5 decreases as the light propagates inside the translucent member 3 (or as the distance from the LED light source increases). Also, the intensity of the direct incident light entering the area 5 decreases as the distance from the LED light source increases. Consequently, the illumination intensity at the center of the translucent member tends to become lower if it is extended longitudinally, even when it is provided with the LED light sources at both ends. FIG. 48A shows the relative illumination intensity along the longitudinal direction of the translucent member 3, in the illumination device shown in FIGS. 45A to 45C. As will be apparent from these charts, the distribution of the illumination intensity is significantly uniform in comparison with that in the conventional devices. Nevertheless, the relative illumination intensity is lower in the central portion in the longitudinal direction, and it is desirable to rectify such unevenness, as will be explained in the following.

FIGS. 46A to 46C schematically illustrate another embodiment of the illumination device of the present invention, wherein FIG. 46A is a schematic lateral view of the device, illustrated together with an original constituting the illuminated surface, FIG. 46B is a schematic cross-sectional view of the translucent member 3 and the area 5 along a plane perpendicular to that of FIG. 46A, and FIG. 46C is a schematic lateral view of the device, seen from a direction A shown in FIG. 46A.

As shown in these drawings, the illumination device of the present embodiment is provided with the LED light sources 8 on both end faces of the translucent member 3 having a lens portion (light condensing portion). The translucent member 3 is further provided, in a position opposite to the lens portion, with a protruding portion.35, and the area 5 is formed on the end face of the protruding portion 35. The cross section of the translucent member 3 is trapezoidal, with the shorter side closer to the area 5, bearing a convex lens portion thereon. On each end face, there are provided three LED light sources 8, one being at a position corresponding to the area 5 and the remaining two being positioned on both sides thereof Also, in the illustrated device, the translucent member 3 is made thinner in the central portion in the longitudinal direction, than in the end portions thereof.

Figure 47A:
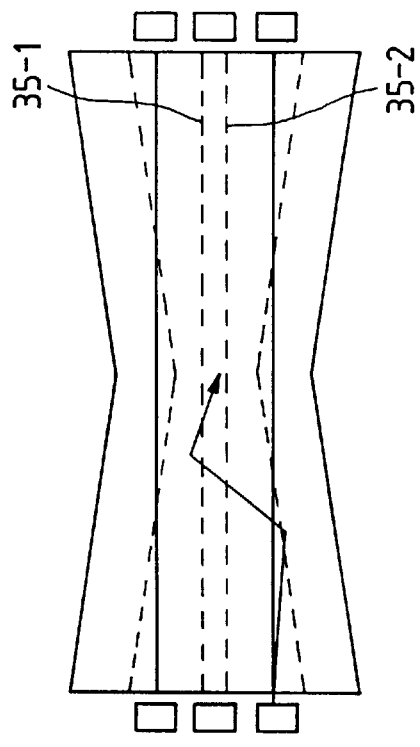
FIGS. 47A to 47C are views showing preferred embodiments of the light guide and the illumination device of the present invention.
Figure 47B:
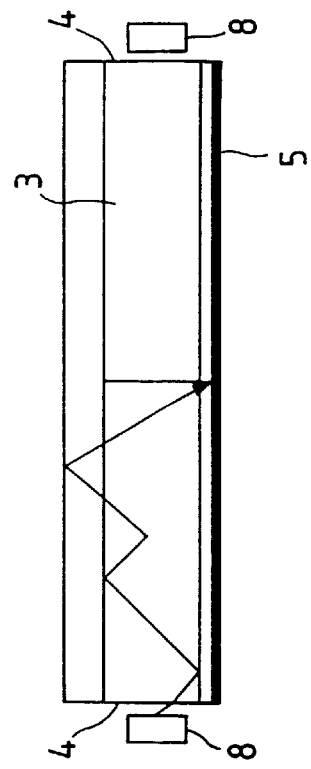
Figure 47C:
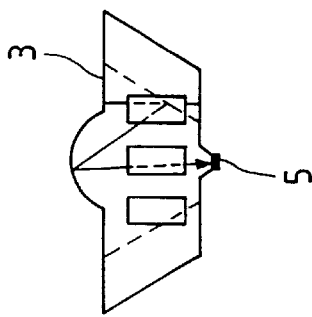

FIGS. 47A and 47B are respectively a schematic plan view and a schematic lateral view of the device of the present embodiment, and FIGS. 47B and 47C respectively correspond to FIGS. 46A and 46C. In the present embodiment, as shown in these drawings, the outstretched portions of the translucent member decrease toward the center in the longitudinal direction, so that the cross sectional area of the member decreases from both ends thereof toward the center.

Figure 48B:
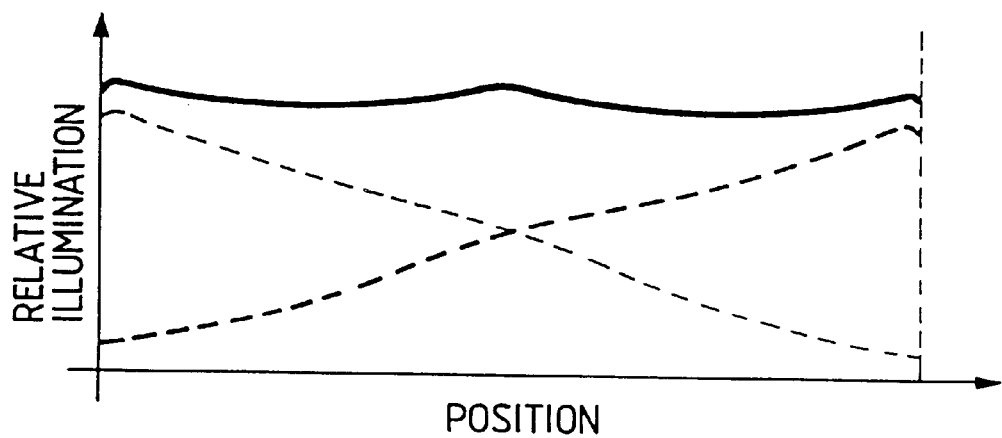

FIG. 48B shows the illumination intensity distribution of the above-explained illumination device, along the longitudinal direction of the translucent member 3. When the translucent member 3 is constricted in shape at the central portion as in the present embodiment, the illumination intensity in the central portion increases because the light emitted by the LED light source 8 at an end has a higher probability of entering the area 5 (namely becoming the indirect incident light) before reaching the other end. More specifically, the light proceeding from an end to the other by repeated reflections is eventually reflected by the inclined face 201 to constitute the indirect incident light, due to the decrease of the out-stretched portions. Consequently, in comparison with the case without such constriction, the amount of the incident light to the area 5 increases, whereby the illumination intensity over the entire area, particularly that in an area distant from the LED light source, can be increased.

The amount of the constriction is preferably determined in consideration of the length, thickness and cross sectional area of the translucent member, the width of the area 5, arrangement of the LED light source, etc.

When the translucent member has the lens portion, it is desirable that the constriction does not affect the characteristic, for example the shape, of the lens portion, and it is also desirable to maintain a constant distance between the area 5 and the lens face.

Also, the shape of the constriction may be linear as shown in the foregoing drawings, or may be curved or a combination of these shapes.

Figure 49:
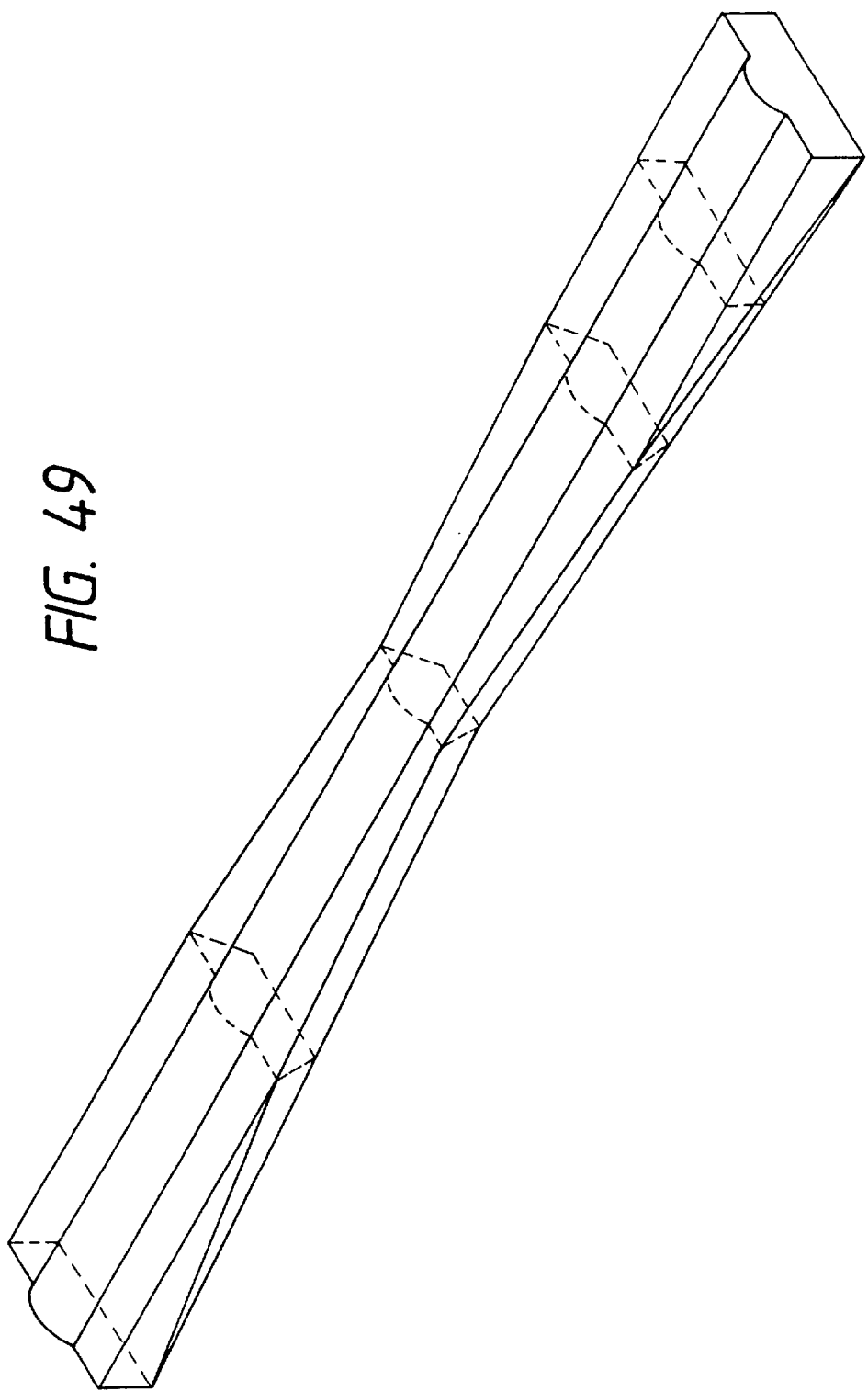
FIG. 49 is a view showing preferred embodiments of the light guide and the illumination device of the present invention.

Furthermore, the translucent member 3 may be formed as shown in FIG. 49. The translucent member 3, excluding the lens portion, has a rectangular entrance end face for the light from the LED light source, and a trapezoidal cross section with the shorter side at the bottom, at the central portion in the longitudinal direction. In a position closer to the center from the entrance end face, the cross section is rectangular with cut-off lower corners, and the cut-off areas are progressively enlarged to develop into the inclined lateral faces of the trapezoidal cross section.

Such illustrated form can provide an illumination device having more uniform illumination intensity characteristics in the longitudinal direction.

FIGS. 50A to 50C show a variation in which the area 5 of the illumination device shown in FIGS. 46A. to 46C is changed from the diffusing surface to the sawtooth-shaped reflecting faces explained before. If the angle of the light condensing part, seen from the area 5, is sufficiently large (for example 60° or larger, though it depends on the depth and shape of the protruding portion), the incident angle to the area 5 becomes close to the perpendicular entry, but the sawtooth-shaped reflecting faces employed in the present embodiment reflect the incident light principally to the light condensing part, whereby the light emerges therefrom in a parallel or substantially parallel light beam. Consequently, the configuration of the present embodiment provides an illumination device with a higher illumination intensity which is more uniform in the longitudinal direction.

FIGS. 51A to 51C show a variation in which a cylindrical lens 9 as the light condensing part is added to the illumination device shown in FIGS. 50A to 50C. Such a configuration, being capable of further condensing the emerging parallel light beam, can illuminate the object surface with a further increased intensity.

[Embodiment 15]

In the following there will be explained the method of mounting the LED light source. In the foregoing embodiments there have been explained the arrangements of the LED light sources, but the specific mounting method therefor has not been explained. In the following there will be given a detailed explanation of such a mounting method. Such a mounting method is applicable to any of the aforementioned illumination devices, or to any variation or combination thereof.

In the mounting of the LED light source, there are required the mounting precisely at the designed position, a simple mounting process including the maintenance of precision, and the possibility of introduction of the light from the LED light source into the translucent member with minimum loss. The mounting method for the LED light source has no particular limitation, as long as these requirements are met.

A simplest example of the mounting method is to adhere the LED chip onto the end face of the translucent member. However, such an adhesion method does not allow easy replacement of the LED light source, and may lead to certain drawbacks, such as peeling of adhesive or breakage of the LED due to the expansion and contraction resulting from variations in temperature and humidity, particularly when the translucent member is composed of a resinous material such as acrylic resin.

Also, if the LED light source is positioned separate from the translucent member, there may result a light loss due to a variation in the distance between the LED light source and the end face of the translucent member, resulting from expansion and contraction thereof.

Figure 52:
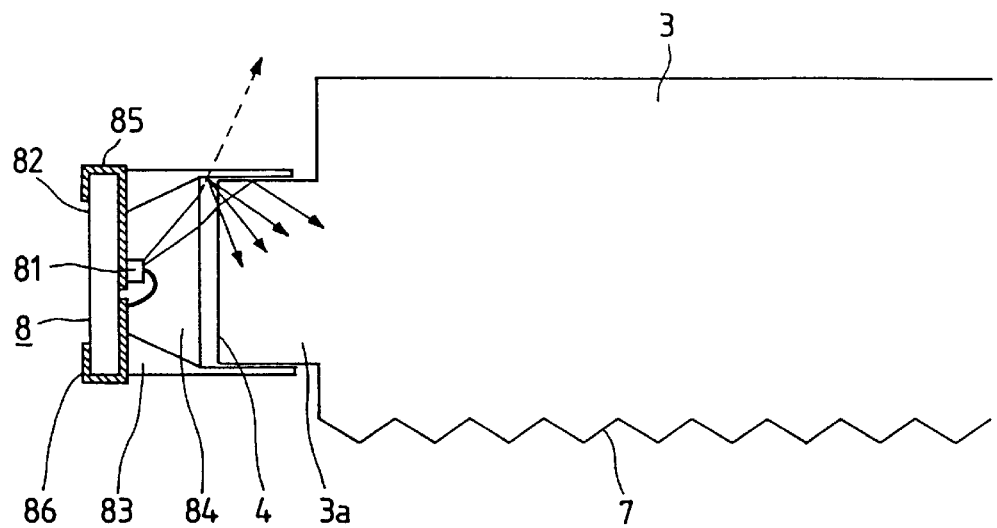
FIGS. 52 and 53 are schematic cross-sectional views showing preferred mounting methods of the light source.

FIG. 52 shows a mounting method capable of avoiding these drawbacks.

In this embodiment, as shown in FIG. 52, the translucent member 3 has a protruding portion 3a on the end face thereof, and the LED light source 8 is provided with a reflecting frame 83 extended so as to fit on the protruding portion 3a.

Such a structure. can avoid the light leakage to the exterior due to the presence of the reflecting frame 83, despite the eventual presence of a gap between the external surface of transparent sealing resin 84 and the entrance end face 4 of the translucent member 3. Also, since a part of the light reflected by the reflecting frame 83 enters the translucent member 3 through the entrance end face 4, the efficiency of utilizing the light, emitted from the LED chip 81, can be improved. The reflecting frame 83 may be adhered to the protruding portion 3a of the translucent member 3, but it is preferably fitted merely on the protruding portion, in order to relax the stress resulting from the expansion or contraction of the translucent member 3 and the reflecting frame 83.

Also, the precision of positioning of the LED light source 8 can be improved by fitting the light source 8 onto the protruding portion 3a formed on the translucent member 3, and the mounting process can be simplified if the mount is conducted by mere fitting only.

Figure 53:
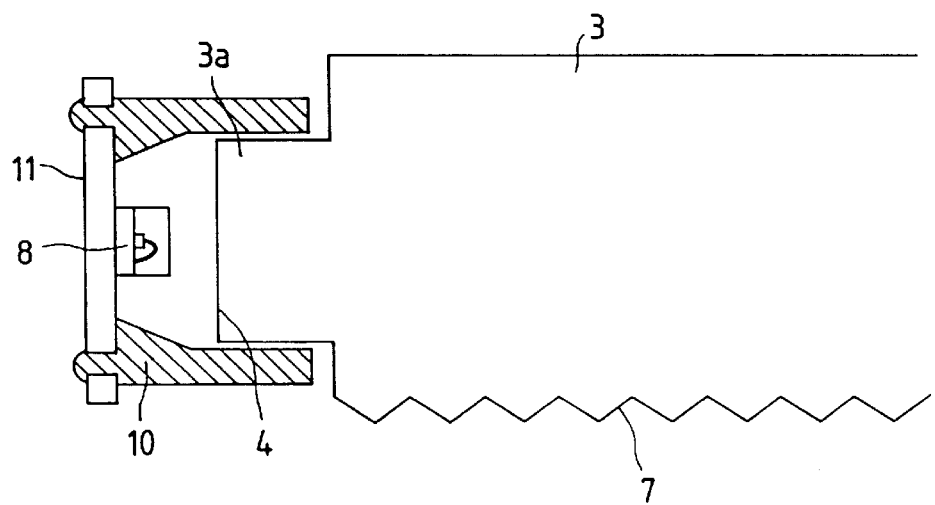

FIG. 53 shows a variation of the mounting method for the LED light source shown in FIG. 52. In this variation, the LED chip is surface mounted on a mounting board 11, and is surrounded by a reflecting frame 10, which is made of white resin or a metal integrated with the board 11 and is fitted on the protruding portion 3a.

Such a configuration allows one to obtain illuminating characteristics matching the requested performance in an easier manner, since the protruding portion 3a can be formed with a desired shape and size and the LED light source can be mounted on such a protruding portion.

An additional reflecting portion may be formed in at least a part of the area, other than the mounting area for the LED light source. The presence of such reflecting portion causes the light, returning from the other end face of the translucent member, to continue the internal reflections without being released from the entrance end face, thereby improving the efficiency of light utilization.

The presence of the above-mentioned protruding portion 3a is not essential, but is preferable in consideration of the aforementioned improvement in the positioning accuracy. The protruding portion 3a can be molded simultaneously with the formation of the translucent member 3, but it may also be formed, if necessary, by cutting and/or grinding.

The LED light source may also be mounted by fitting into a recess formed on the entrance end face of the translucent member. Such a mounting method causes a loss in a part of the light emitted from the LED chip, but is effective in the positioning precision and in a smaller protruding distance in the mounting portion.

Figure 54:
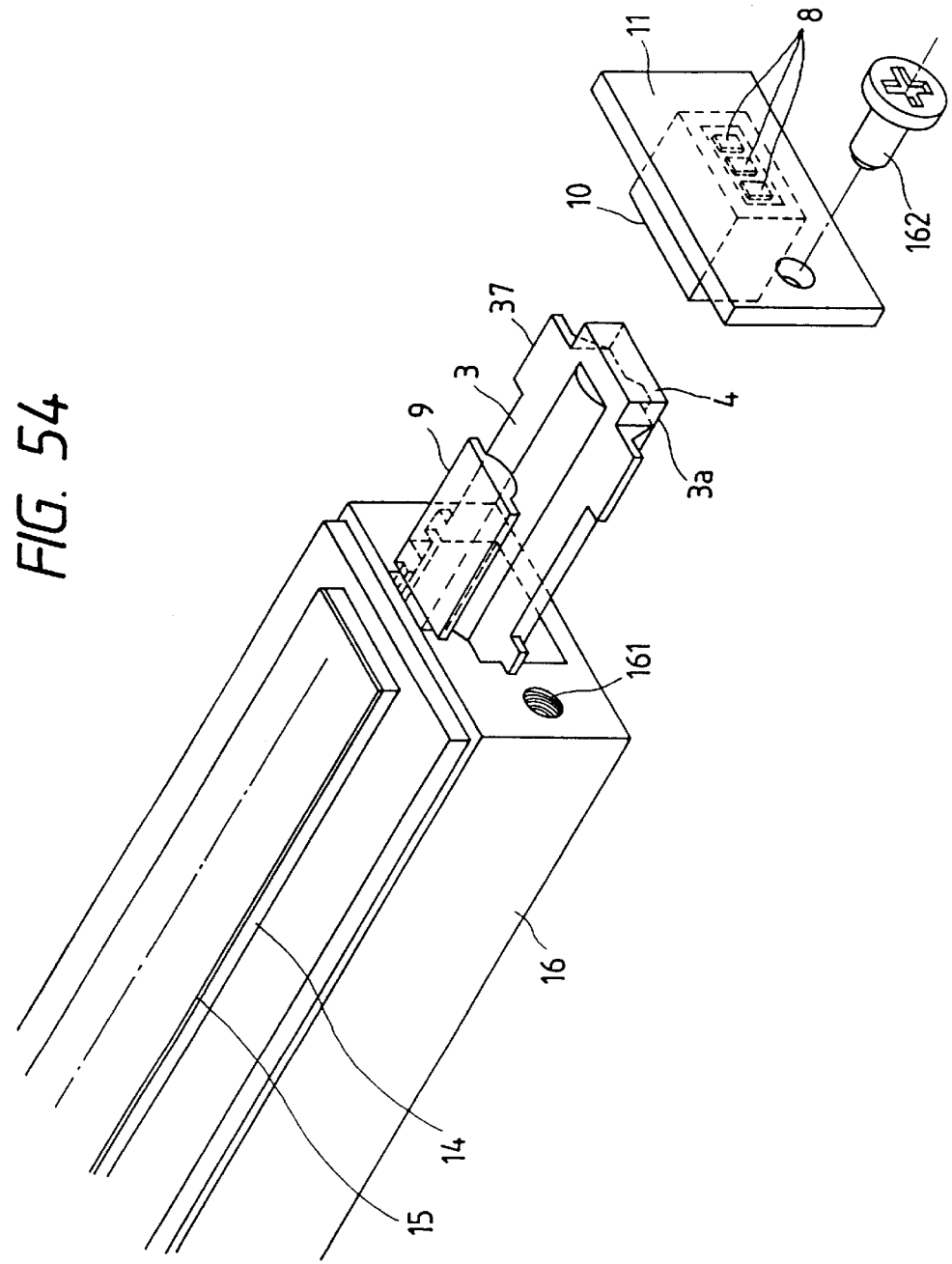
FIG. 54 is a view showing preferred embodiments of the light guide and the illumination device of the present invention.

FIG. 54 is a schematic perspective view of an example of the photoelectric converting device, utilizing the illumination device of the present invention shown in FIG. 53 and constituting an image reading device. There are shown a sensor substrate 14, a protecting glass 15, and a casing 16 of the photoelectric converting device. On the sensor substrate 14, there is provided a one-dimensional array (or plural arrays) of a plurality of photoelectric converting elements, which are formed utilizing a thin semiconductor layer for example of amorphous silicon or polysilicon. The protective glass 15 is provided on the plural photoelectric converting elements (not illustrated), for protecting the elements from eventual breakage caused by the contact with the moving original. The casing 16 is provided therein with a space for fitting with the illumination device and the cylindrical lens 9, which are set in a predetermined position by insertion from an end face of the casing 16. The LED light sources 8 are mounted on a mounting board 11 and mounted on the protruding portion 3a of the translucent member 3 by fitting the reflecting frame 10 thereon, and the mounting board 11 is fixed by a screw 162 fitted into a threaded hole 161 formed on the casing.

The translucent member 3 is provided with mounting portions 37, engaging with the casing 16. Naturally, the mounting portions 37 are not essential, nor are they limited to the illustrated shape. Such mounting portions 37 may naturally be provided also in the translucent members 3 in the foregoing embodiments 1 to 14

[Embodiment 16]

In the following, there will be explained application of the illumination device of the present invention to an information processing apparatus.

Figure 55:
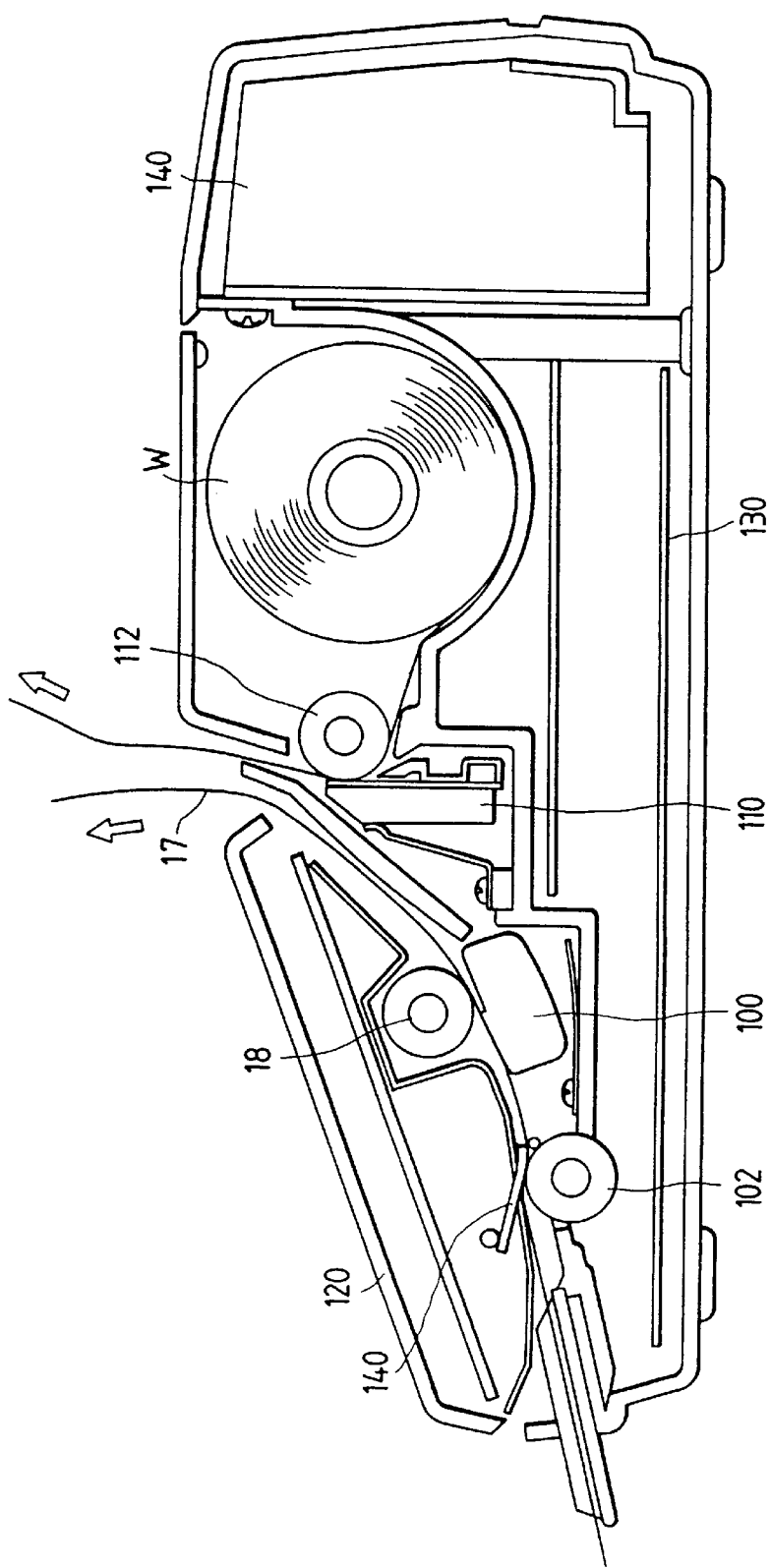
FIG. 55 is a schematic cross-sectional view of an information processing apparatus in which the illumination device of the present invention is applicable.

FIG. 55 illustrates an example of the information processing apparatus (for example, a facsimile apparatus) utilizing the photoelectric converting device of the present invention.

There are shown a feed roller 102 for feeding an original 17 to a reading position; a separating member 104 for securely separating the originals P one by one; and a transport roller 18 provided at the image reading position of a photoelectric converting device 100, for defining the image reading plane of the original 17 and also serving to transport the original 17.

A recording medium W, in the form of rolled paper, is subjected to formation of an image read by the photoelectric converting device 100, or, in the case of a facsimile, an image transmitted from the outside. A recording head 110, for the image formation, can be of various types such as a thermal head or an ink jet recording head. Also, the recording head can be of serial type or of line type. A platen roller 112 is provided for transporting the recording medium W to the recording position by the recording head 110 and for defining the recording plane of the recording medium.

An operation panel 120 is provided with switches for entering commands for operations, and with a display unit for displaying messages and a status of the apparatus.

There are further provided a system control board 130, provided thereon with a control unit for controlling various units of the apparatus, a driving circuit for the photoelectric converting elements, a processing unit for the image information, a transmission-reception unit, etc., and a power source 140 for the apparatus.

Figure 56:
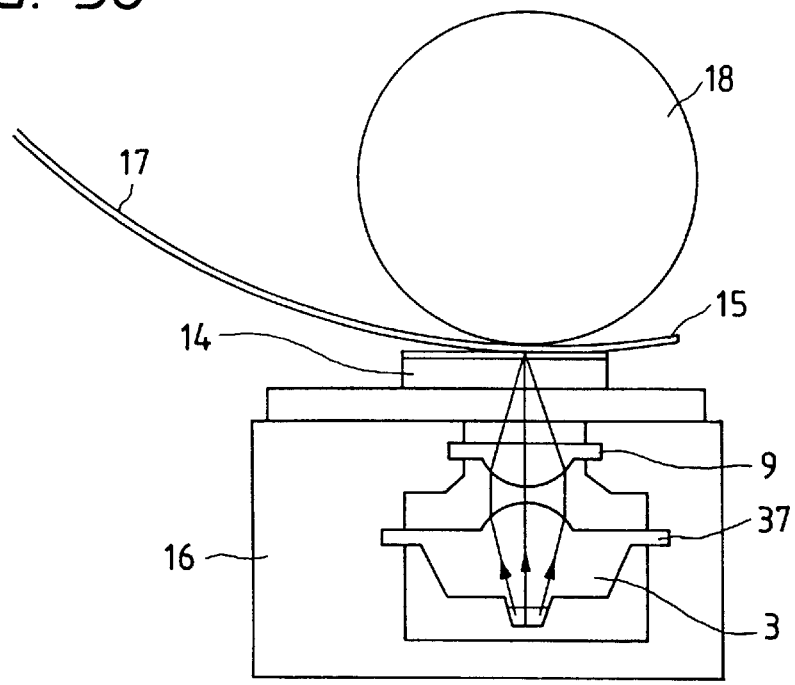
FIGS. 56 to 58 are schematic partial cross-sectional views showing information processing apparatus employing the illumination device of the present invention.
Figure 57:
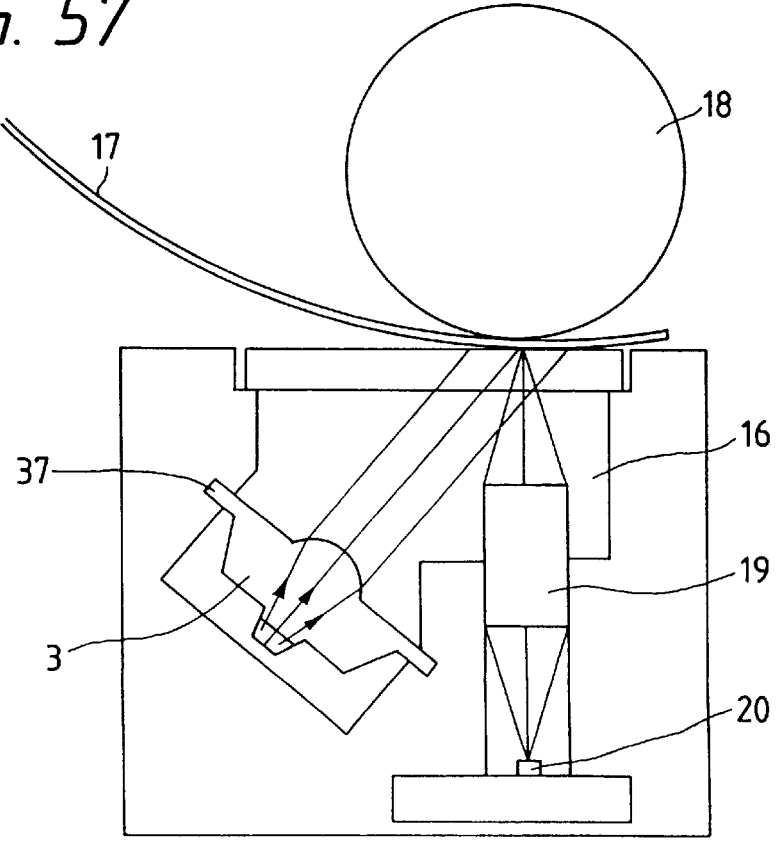

FIGS. 56 and 57 are schematic magnified views of the photoelectric converting device, employable in the information processing apparatus shown in FIG. 55. FIG. 56 shows the case of a contact sensor, utilizing the photoelectric converting device (image reading device) shown in FIG. 54. FIG. 57 shows the case of a system employing an imaging optical system 19, wherein the original 17 is illuminated by the light emitted by illumination means of the embodiment 14 shown in FIGS. 46A to 46C, and the reflected light, corresponding to the image information, is focused on the photoelectric converting device 20 through the imaging optical system 19.

Figure 58:
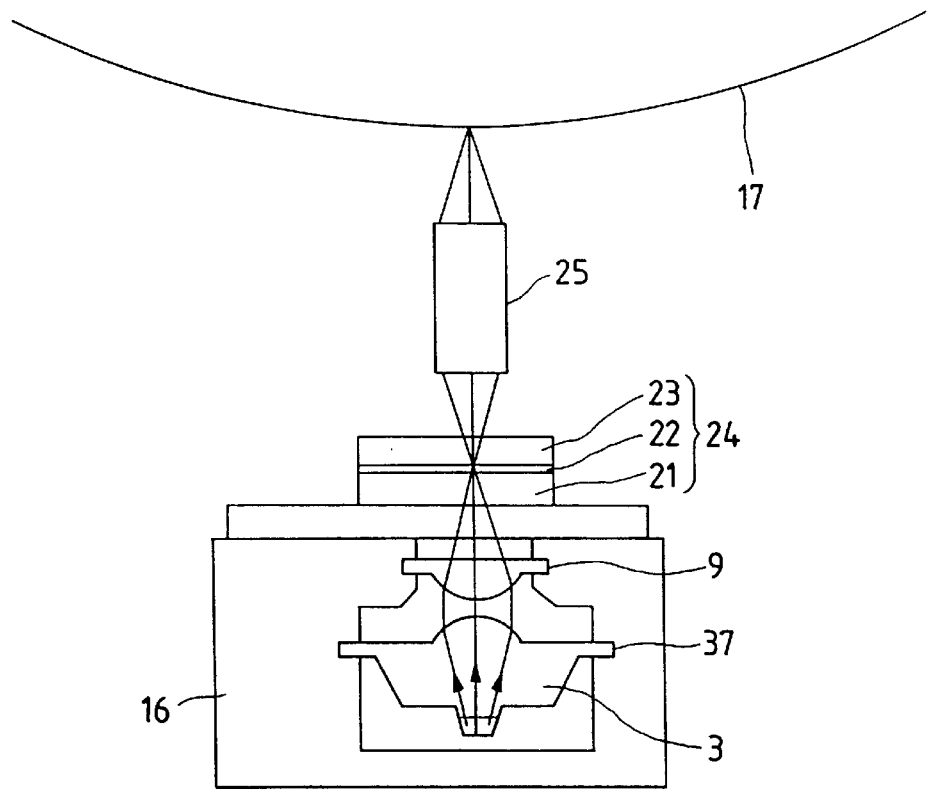

It is also possible, as shown in FIG. 58, to form an imaging optical system 25 at the original side, and to read the image by focusing, through a protective layer (protective glass) 23, on a photoelectric converting device 22 formed on a sensor substrate 21, utilizing a thin semiconductor layer.

In both cases, the original surface was illuminated with extremely uniform distribution of illumination intensity, so that the image could be read in an extremely excellent state.

Also, other illumination devices explained in the foregoing embodiments 1 to 13 enables much superior image reading, in comparison with the case employing the conventional illumination devices.

The illumination device of the present invention, being capable of providing a sufficiently high light amount, is also suitable for color image reading. Also, for modifying the color temperature or the hue of the illuminating light, a filter may be provided between the LED light source and the end face of the translucent member 3, or the translucent member itself may be dyed. In the case of such a dyeing, the entrance end face is preferably dyed, but, if surficial dyeing is enough for the purpose, the light exit face of the translucent member is preferably dyed. This is because, if the entire translucent member is dyed or colored, the light is attenuated significantly in the course of internal reflections, whereby the light intensity becomes lower in the central portion or in a position distant from the LED light source.

For image output applicable to the information processing apparatus shown in FIG. 55, there can be considered, as explained above, the thermal transfer recording method or thermal recording method utilizing the thermal head, and the ink jet recording method utilizing the ink jet recording head.

In the following, there will be explained an embodiment of the information processing apparatus, employing such a recording head as the output means. The following explanation will be limited to the output part only.

Among various ink jet recording methods, the present invention brings about a particular effect when applied to a recording head of a system utilizing thermal energy for ink discharge, because the entire information processing apparatus can fully enjoy the effect of compactization of the illumination device, as the recording head itself can be made compact.

The principle and representative configuration of the system are disclosed, for example, in U.S. Pat. Nos. 4,723,129 and 4,740,796. This system is applicable to so-called on-demand recording or continuous recording, but is particularly effective in the on-demand recording because the entire apparatus can be compactized.

In brief, in this system, an electrothermal converting member positioned corresponding to a liquid channel or a sheet containing therein is given at least a drive signal, corresponding to the recording information and capable of causing a rapid temperature increase exceeding nucleate boiling, to generate thermal energy in the electrothermal converting member, thereby inducing film boiling on a heat action surface of the recording head and forming a bubble in the ink in one-to-one correspondence to the recording signal. The ink is discharged from a discharge opening by the growth and contraction of the bubble, thereby forming at least an ink droplet. The signal is preferably formed as a pulse, as it realizes instantaneous growth and contraction of the bubble, thereby attaining highly responsive discharge of the ink.

Such a pulse-shaped drive signal is preferably as disclosed in U.S. Pat. Nos. 4,463,359 and 4,345,262. Also, the conditions described in U.S. Pat. No. 4,313,124 relative to the temperature increase rate of the heat action surface allows one to obtain a further improved recording.

The configuration of the recording head is given by the combinations of the ink discharge openings, liquid channels and electrothermal converter elements with linear or rectangular liquid channels, as disclosed in the above-mentioned patents, but a configuration disclosed in U.S. Pat. No. 4,558,333 in which the heat action part is positioned in a flexed area, and a configuration disclosed in U.S. Pat. No. 4,459,600 also belong to the present invention.

Furthermore, the present invention is effective in a structure disclosed in Japanese Patent Laid-open Application No. 59-123670, having a slit common to plural electrothermal converter elements as a discharge opening therefor, or in a structure disclosed in Japanese Patent Laid-open Application No. 59-138461, having an aperture for absorbing the pressure wave of thermal energy, in correspondence with each discharge opening.

A fill-line type recording head, capable of simultaneously recording over the entire width of the recording sheet, may be obtained by plural recording heads combined so as to provide the required length as disclosed in the above-mentioned patents, or may be constructed as a single integrated recording head.

Furthermore, there may be employed a recording head of an interchangeable chip type, which can receive an ink supply from the main apparatus and can be electrically connected therewith upon mounting on the main apparatus, or a recording head of cartridge type in which an ink cartridge is integrally constructed with the recording head.

Also, the information processing apparatus of the present invention is preferably provided with the discharge recovery means and other auxiliary means for the recording head, in order to realize a further advanced maintenance-free system.

Examples of such means for the recording head include capping means, cleaning means, pressurizing or suction means, heating means composed for example of an electrothermal converter element for heating the recording head, and means for effecting an idle ink discharge independent from the recording operation, all of which are effective for achieving stable recording operation.

Furthermore, the recording mode is not limited to recording of a single main color, such as black, but also covers recording of plural colors or a full-color image, by means either of an integrally constructed recording head or of a combination of plural recording heads.

In the foregoing explanation, the ink is assumed to be liquid, but there may also be employed ink which is solid below room temperature but softens at room temperature. In the above-explained ink jet recording system, the ink itself is usually temperature controlled within a range of 30° C.–70° C. for maintaining the ink viscosity within a stable discharge range, so that the ink needs to be liquid only when the recording signal is given. In addition, there may also be employed ink which is intentionally changed from solid to liquid by heating with thermal energy.

In the following, there will be given a brief explanation on an ink jet recording head, utilized in such an ink discharge recording system utilizing thermal energy.

Figure 59:
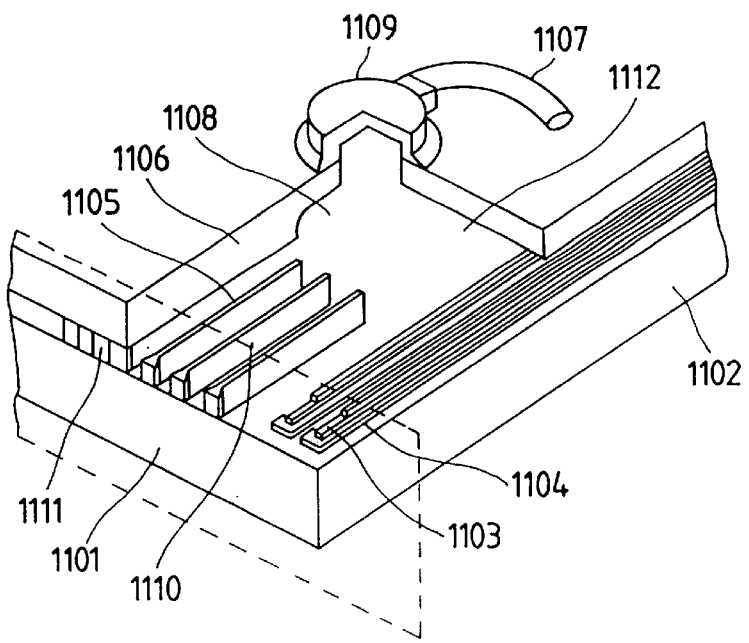
FIG. 59 is a schematic perspective view of an ink jet recording head applicable to the information processing apparatus of the present invention.

FIG. 59 is a schematic view of such an ink jet recording head, composed of electrothermal converter elements 1103, electrodes 1104, liquid channels 1105 and a ceiling plate 1106, formed on a substrate 1102 through a semiconductor process involving the steps of etching, evaporation, sputtering, etc. The recording ink 1112 is supplied from an unrepresented ink reservoir to a common ink chamber 1108 of the recording head 1101 through a supply pipe 1107, provided with a connector 1109 therefor.

The ink 1112 in the common ink chamber 1108 is supplied into the liquid channel 1110 by capillary action, and is stably held therein, by forming a meniscus at the discharge opening (orifice) at the end thereof. Electric power supply to the electrothermal converter element 1103 rapidly heats the liquid thereon, thus forming a bubble in the liquid chamber, and the liquid is discharged from the opening 1111 by the expansion and contraction of the bubble, thereby forming a liquid droplet.

The above-explained configuration allows to arrange the discharge openings with a high density such as 16 nozzle/ mm or even higher, thereby obtaining an ink jet head with 128 or 256 discharge openings, or even a full-line ink jet recording head having an array of the discharge openings over the entire recording width.

Figure 60:
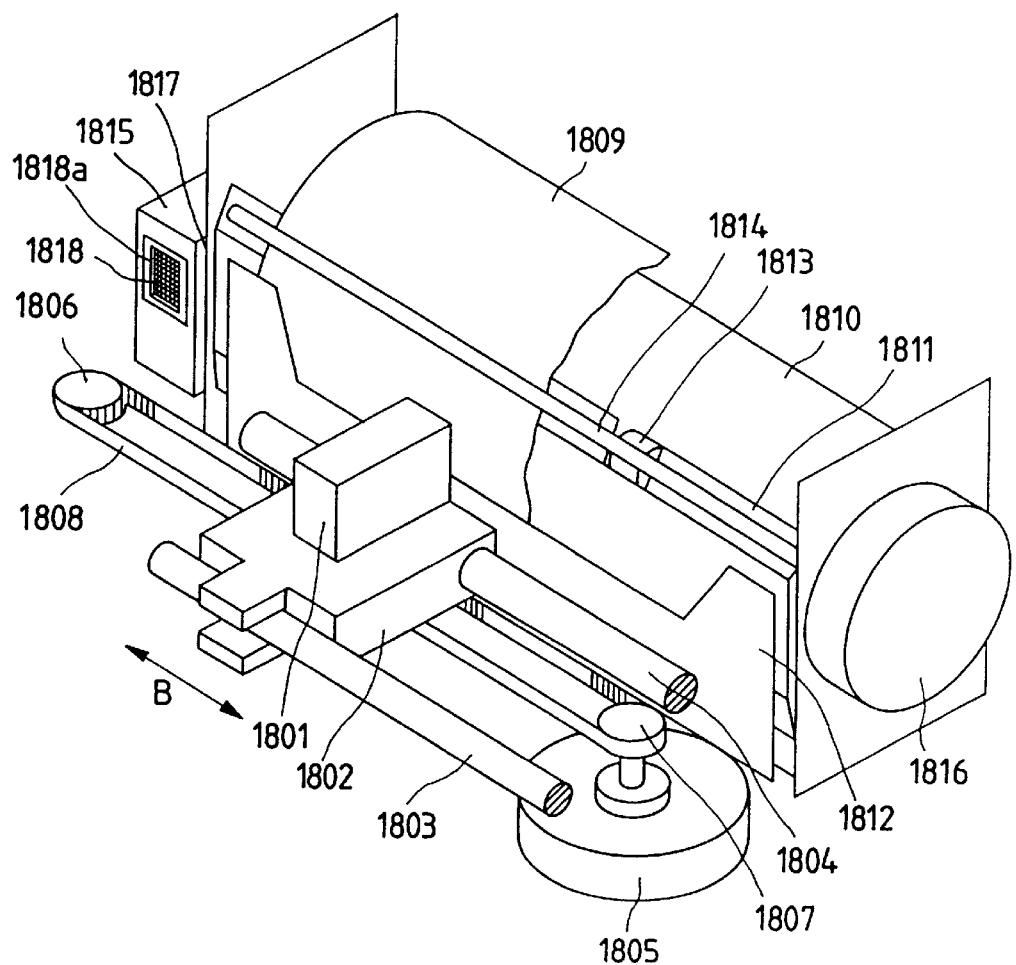
FIGS. 60 and 62 are schematic perspective views showing examples of the ink jet recording unit applicable to the information processing apparatus of the present invention.

FIG. 60 is a schematic perspective view of the external structure of an output unit utilizing the ink jet recording method.

In FIG. 60 there are shown an ink jet recording head 1801 for discharging ink according to the recording signals, thereby recording a desired image; and a carriage 1802 for moving the recording head 1801 in the recording (main scanning) direction. The carriage 1802 is slidably supported by guide shafts 1803, 1804, and reciprocates in the main scanning direction by means of a timing belt 1808, which is supported by pulleys 1806, 1807 and driven by a carriage motor 1805 through the pulley 1807.

A recording sheet 1809 is guided by a paper pan 1810, and is pressed, by pinch rollers, to an unrepresented transport roller for transporting the sheet.

The sheet transportation is achieved by a feeding motor 1816. The transported recording sheet 1809 is given a tension by a discharge roller 1813 and a grooved roller 1814, and is transported in close contact with a heater 1811, by means of an elastic pressure plate 1812. Thus the recording sheet 1809, bearing thereon the ink, discharged from the recording head 1801 and deposited on the sheet, is heated by the heater 1811, whereby the deposited ink is dried and fixed to the recording sheet 1809.

A recovery unit 1815 is provided for maintaining the proper ink discharge state of the recording head 1801, by removing the dusts and highly viscous ink, deposited on the discharge openings (not illustrated) of the recording head 1801.

A cap member 1818a, constituting a part of the recovery unit 1815, is provided to cap the discharge openings of the recording head 1801, thereby preventing the clogging of the openings. Inside the cap 1818a, there is preferably provided an ink absorbent member 1818.

At a side of the recovery unit 1815, closer to the recording area, there is provided a blade 1817 for coming into contact with a face, having the discharge openings, of the recording head 1801, thereby eliminating the dust and ink sticking to the face.

Figure 61:
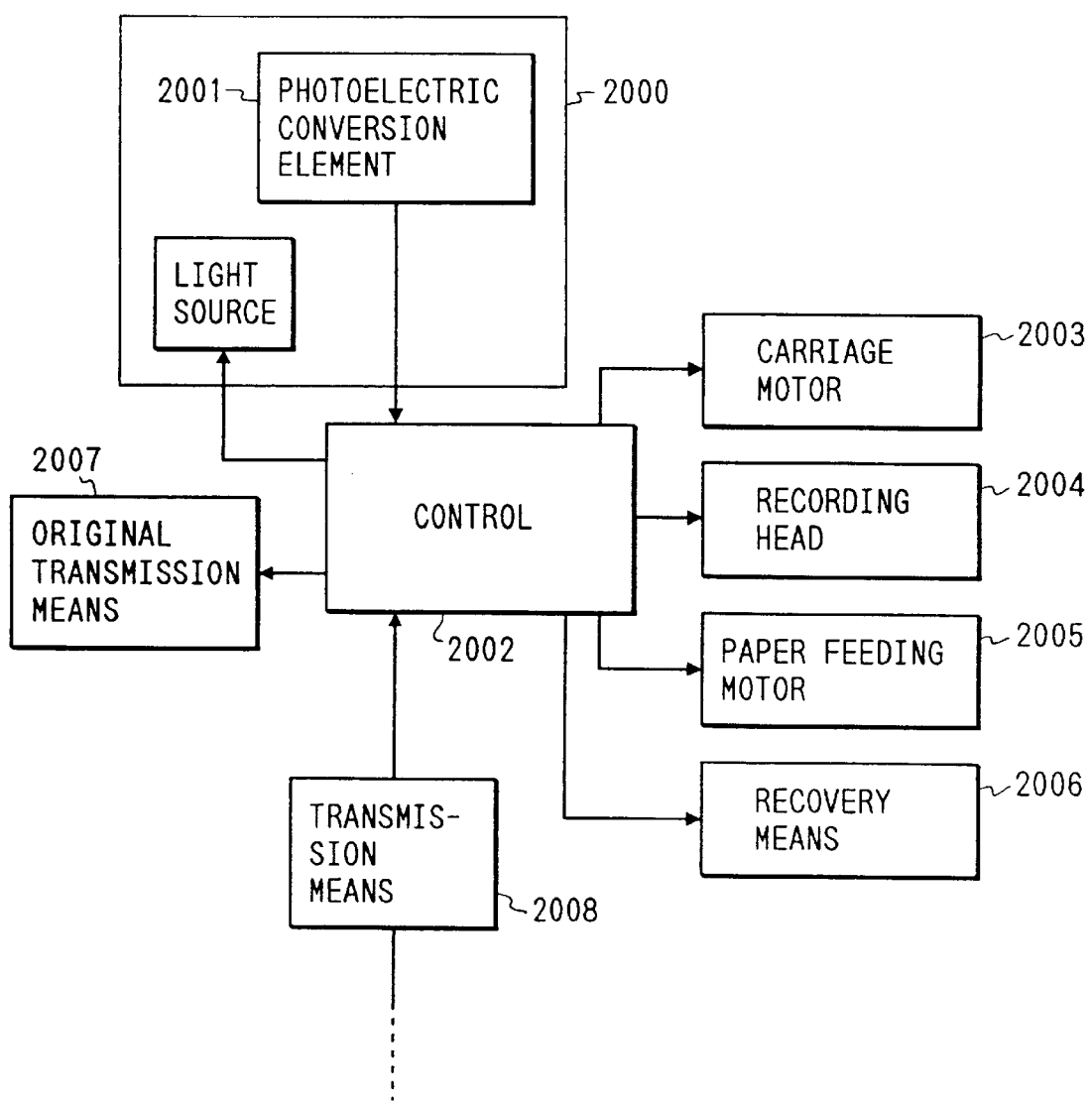
FIG. 61 is a block diagram showing an example of the configuration of the information processing apparatus of the present invention.

In the present invention, as shown in a block diagram in FIG. 61, the original transported by original transmission means 2007 to the image reading part of an image reading device 2000 is read by photoelectric converter elements 2001 thereof, then thus obtained electrical signals bearing image information are converted by image processing means (not shown) into electrical signals for recording, and the recording operation is conducted by a controller such as a CPU 2000 controlling the carriage motor 2003, recording head 2004, sheet feeding motor 2005, recovery unit 2006, etc.

The electrical signals bearing image information may be transmitted through communication means 2008 to another image processing apparatus for image output therein, or may be received from another information processing apparatus through the communication means 2008 and recorded by the above-mentioned recording head 2004.

Figure 62:
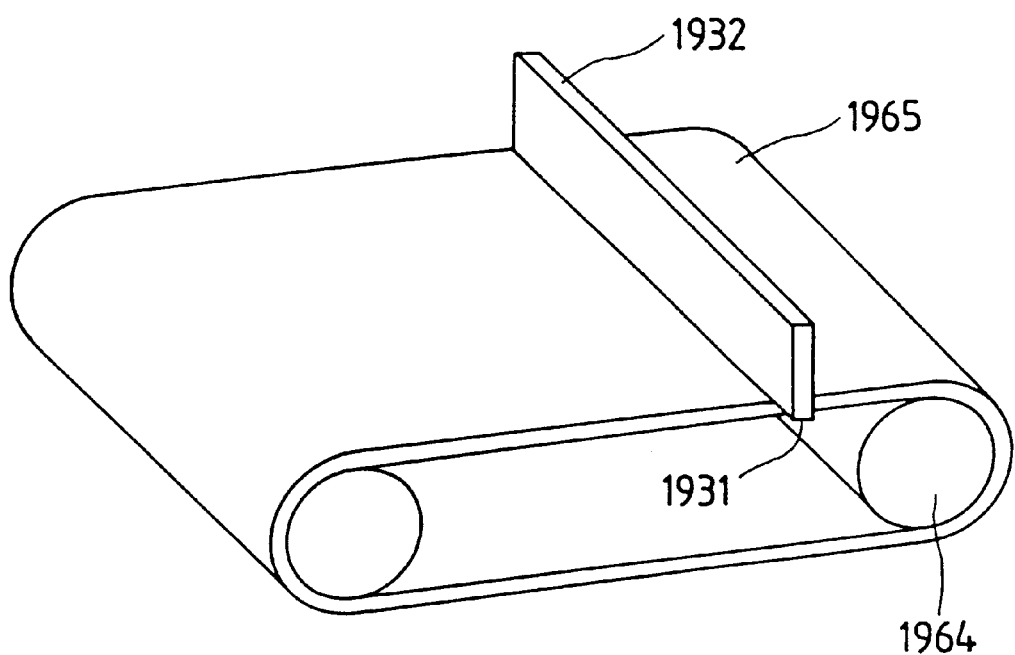

FIG. 62 schematically shows the output unit provided with a recording head 1932 of full-line type.

A conveyor belt 1965 transports an unrepresented recording medium, by the rotation of a transport roller 1932. The bottom face 1931 of the recording head 1932 is provided with a plurality of discharge openings, corresponding to the recording area of the recording medium.

Also, in this case the recording operation can be conducted in a similar manner as in the recording head of serial type explained above.

Naturally, the output units explained above are given as examples, and there can be conceived various modifications.

However, the above-explained ink discharge system utilizing thermal energy, being capable not only of compactization but also of more highly precise recording, can exhibit the effect of the present invention more conspicuously, and can therefore provide an information processing apparatus excellent in overall performance.

As explained in detail in the foregoing, the present invention can provide a compact illumination device capable of uniform illumination with a high intensity.

Also, the present invention can provide an illumination device which is simple in structure and can simplify also the manufacturing process.

Furthermore, the present invention can provide a photoelectric converting device and an information processing apparatus capable of stable image reading.

Furthermore, the present invention can provide a secure mounting method for the light source, which is simplified in the mounting steps.

Furthermore, the present invention can realize a linear light source with reduced unevenness in the amount of illuminating light on the illuminated surface, thereby achieving improved tonal rendition without increasing the burden of image processing.

The present invention is subject to various modifications within the scope and spirit of the appended claims. Also, the embodiments explained before may naturally be combined in suitable manner.

What is claimed is:

1. A longitudinal light guide that guides light from a light source, along a longitudinal direction of said light guide to radiate the light, comprising a longitudinal reflection member, arranged along the longitudinal direction of said light guide, that reflects the light from said light source, wherein at least in a neighborhood of said light source, a thickness of said light guide in a direction parallel to a normal line of said reflection member is different at the position of said reflection member than at the position of said light source, when viewed in the longitudinal direction of said light guide.

2. A light guide according to claim 1, wherein said reflection member includes a light-reflecting paint.

3. A light guide according to claim 1, wherein said reflection member includes a rough surface.

4. A light guide according to claim 1, wherein said reflection member includes a sawtooth-shaped surface.

5. A light guide according to claim 1, wherein said reflection member is arranged at a convex portion of said light guide.

6. A light guide according to claim 1, further comprising light gathering means for gathering the light to be radiated.

7. A light guide according to claim 1, wherein at least a part of said reflection member near the light source has a normal line, passing through a center of a width of said reflection member, that is shifted from a center of the light source, when viewed in the longitudinal direction of said light guide.

8. A light guide according to claim 1, further comprising a light gathering unit that is configured to gather the light to be radiated.

9. An illuminating apparatus comprising:
a light source that illuminates an object; and
a longitudinal light guide that guides light from said light source along a longitudinal direction of said light guide to radiate the light,
wherein said light guide includes a longitudinal reflection member, arranged along the longitudinal direction of said light guide, that reflects the light from said light source, and wherein at least in a neighborhood of said light source, a thickness of said light guide in a direction parallel to a normal line of said reflection member is different at the position of said reflection member than at the position of said light source, when viewed in the longitudinal direction of said light guide.

10. An apparatus according to claim 9, wherein said reflection member includes a light-reflecting paint.

11. An apparatus according to claim 9, wherein said reflection member includes a rough surface.

12. An apparatus according to claim 9, wherein said reflection member includes a sawtooth-shaped surface.

13. An apparatus according to claim 9, wherein said reflection member is arranged at a convex portion of said light guide.

14. An apparatus according to claim 9, further comprising light gathering means for gathering the light to be radiated.

15. An apparatus according to claim 9, wherein at least a part of said reflection member near the light source has a normal line, passing through a center of a width of said reflection member, that is shifted from a center of the light source, when viewed in the longitudinal direction of said light guide.

16. An apparatus according to claim 9, further comprising a light gathering unit that is configured to gather the light to be radiated.

17. A reading device comprising:
an illuminating apparatus including therein a longitudinal light guide that guides light from a light source along a longitudinal direction of said light guide to radiate the light; and
a photoelectric converting device that reads an image illuminated by said illuminating apparatus and outputs an image signal,
wherein said light guide includes a longitudinal reflection member, arranged along the longitudinal direction of said light guide, that reflects the light from said light source, and wherein at least in a neighborhood of said light source, a thickness of said light guide in a direction parallel to a normal line of said reflection member is different at the position of said reflection member than at the position of said light source, when viewed in the longitudinal direction of said light guide.

18. A device according to claim 17, wherein said reflection member includes a light-reflecting paint.

19. A device according to claim 17, wherein said reflection member includes a rough surface.

20. A device according to claim 17, wherein said reflection member includes a sawtooth-shaped surface.

21. A device according to claim 17, wherein said reflection member is arranged at a convex portion of said light guide.

22. A device according to claim 17, further comprising light gathering means for gathering the light to be radiated.

23. A device according to claim 17, wherein at least a part of said reflection member near the light source has a normal line, passing through a center of a width of said reflection member, that is shifted from a center of the light source, when viewed in the longitudinal direction of said light guide.

24. A device according to claim 17, further comprising a light gathering unit that is configured to gather the light to be radiated.

25. An image processing system comprising:
an illuminating apparatus including therein a longitudinal light guide that guides light from a light source along a longitudinal direction of said light guide to radiate the light;
photoelectric conversion means for reading an image illuminated by said illuminating apparatus and for outputting an image signal; and
control means for controlling said illuminating apparatus and said photoelectric conversion means,
wherein said light guide includes a longitudinal reflection member, arranged along the longitudinal direction of said light guide, that reflects the light from said light source, and at least in a neighborhood of said light source, a thickness of said light guide in a direction parallel to a normal line of said reflection member is different at the position of said reflection member than at the position of said light source, when viewed in the longitudinal direction of said light guide.

26. A system according to claim 25, wherein said reflection member includes a light-reflecting paint.

27. A system according to claim 25, wherein said reflection member includes a rough surface.

28. A system according to claim 25, wherein said reflection member includes a sawtooth-shaped surface.

29. A system according to claim 25, wherein said reflection member is arranged at a convex portion of said light guide.

30. A system according to claim 25, further comprising light gathering means for gathering the light to be radiated.

31. A system according to claim 25, wherein at least a part of said reflection member near the light source has a normal line, passing through a center of a width of said reflection member, that is shifted from a center of the light source, when viewed in the longitudinal direction of said light guide.

32. An image processing system comprising:
an illuminating apparatus including therein a longitudinal light guide that guides light from a light source along a longitudinal direction of said light guide to radiate the light;
photoelectric conversion means for reading an image illuminated by said illuminating apparatus and for outputting an image signal; and
processing means for performing a predetermined processing on said image signal,
wherein said light guide includes a longitudinal reflection member, arranged along the longitudinal direction of said light guide, that reflects the light from said light source, and at least in a neighborhood of said light source, a thickness of said light guide in a direction parallel to a normal line of said reflection member is different at the position of said reflection member than at the position of said light source, when viewed in the longitudinal direction of said light guide.

33. A system according to claim 32, further comprising control means for controlling said illuminating apparatus, said photoelectric conversion means and said processing means.

34. A system according to claim 33, wherein said reflection member includes a light-reflecting paint.

35. A system according to claim 33, wherein said reflection member includes a rough surface.

36. A system according to claim 33, wherein said reflection member includes a sawtooth-shaped surface.

37. A system according to claim 33, wherein said reflection member is arranged at a convex portion of said light guide.

38. A system according to claim 33, further comprising light gathering means for gathering the light to be radiated.

39. A system according to claim 32, wherein said reflection member includes a light-reflecting paint.

40. A system according to claim 32, wherein said reflection member includes a rough surface.

41. A system according to claim 32, wherein said reflection member includes a sawtooth-shaped surface.

42. A system according to claim 32, wherein said reflection member is arranged at a convex portion of said light guide.

43. A system according to claim 32, further comprising light gathering means for gathering the light to be radiated.

44. A system according to claim 32, wherein at least a part of said reflection member near the light source has a normal line, passing through a center of a width of said reflection member, that is shifted from a center of the light source, when viewed in the longitudinal direction of said light guide.

45. An image processing system comprising:
an illuminating apparatus including therein a longitudinal light guide that guides light from a light source along a longitudinal direction of said light guide to radiate the light;
photoelectric conversion means for reading an image illuminated by said illuminating apparatus and for outputting an image signal,
moving means for relatively moving the image and said photoelectric conversion means; and
control means for controlling said illuminating apparatus, said photoelectric conversion means and said moving means,
wherein said light guide includes a longitudinal reflection member, arranged along the longitudinal direction of said light guide, that reflects the light from said light source, and at least in a neighborhood of said light source, a thickness of said light guide in a direction parallel to a normal line of said reflection member is different at the position of said reflection member than at the position of said light source, when viewed in the longitudinal direction of said light guide.

46. An apparatus according to claim 45, further comprising transmission means for transmitting the image signal to an external recording medium.

47. A system according to claim 46, wherein said reflection member includes a light-reflecting paint.

48. A system according to claim 46, wherein said reflection member includes a rough surface.

49. A system according to claim 46, wherein said reflection member includes a sawtooth-shaped surface.

50. A system according to claim 46, wherein said reflection member is arranged at a convex portion of said light guide.

51. A system according to claim 46, further comprising light gathering means for gathering the light to be radiated.

52. A system according to claim 45, wherein said reflection member includes a light-reflecting paint.

53. A system according to claim 45, wherein said reflection member includes a rough surface.

54. A system according to claim 45, wherein said reflection member includes a sawtooth-shaped surface.

55. A system according to claim 45, wherein said reflection member is arranged at a convex portion of said light guide.

56. A system according to claim 45, further comprising light gathering means for gathering the light to be radiated.

57. A system according to claim 45, wherein at least a part of said reflection member near the light source has a normal line, passing through a center of a width of said reflection member, that is shifted from a center of the light source, when viewed in the longitudinal direction of said light guide.

58. An image processing system comprising:
an illuminating apparatus including therein a longitudinal light guide that guides light from a light source along a longitudinal direction of said light guide to radiate the light;
photoelectric conversion means for reading an image illuminated by said illuminating apparatus and for outputting an image signal;
transmission means for transmitting the image signal to an external recording medium; and
control means connected to said transmission means, for controlling said illuminating apparatus and said photoelectric conversion means,
wherein said light guide includes a longitudinal reflection member, arranged along the longitudinal direction of said light guide, that reflects the light from said light source, and at least in a neighborhood of said light source, a thickness of said light guide in a direction parallel to a normal line of said reflection member is different at the position of said reflection member than at the position of said light source, when viewed in the longitudinal direction of said light guide.

59. A system according to claim 58, wherein said reflection member includes a light-reflecting paint.

60. A system according to claim 58, wherein said reflection member includes a rough surface.

61. A system according to claim 58, wherein said reflection member includes a sawtooth-shaped surface.

62. A system according to claim 58, wherein said reflection member arranged at a convex portion of said light guide.

63. A system according to claim 58, further comprising light gathering means for gathering the light to be radiated.

64. A system according to claim 58, wherein at least a part of said reflection member near the light source has a normal line, passing through a center of a width of said reflection member, that is shifted from a center of the light source, when viewed in the longitudinal direction of said light guide.

65. A longitudinal guide that guides light from a plurality of light sources along a longitudinal direction of said light guide to radiate the light, comprising a longitudinal reflection member, arranged along the longitudinal direction of said light guide, that reflects the light from said plurality of light sources, wherein at least in a neighborhood of said plurality of light sources, a thickness of said light guide in a direction parallel to a normal line of said reflection member is different at the position of said reflection member than at the position of at least one of said plurality of light sources, when viewed in the longitudinal direction of said light guide.

66. A light guide according to claim 65, wherein said reflection member has an uneven reflection diffusion characteristic along the longitudinal direction of said light guide.

67. A light guide according to claim 66, wherein said reflection member includes light-reflecting paint.

68. A light guide according to claim 66, wherein said reflection member includes a rough surface.

69. A light guide according to claim 66, wherein said reflection member includes a sawtooth-shaped surface.

70. A light guide according to claim 66, wherein said reflection member guide is arranged at a convex portion of said light guide.

71. A light guide according to claim 65, wherein said reflection member includes light-reflecting paint.

72. A light guide according to claim 65, wherein said reflection member includes a rough surface.

73. A light guide according to claim 65, wherein said reflection member includes a sawtooth-shaped surface.

74. A light guide according to claim 65, wherein said reflection member is arranged at a convex portion of said light guide.

75. A light guide according to claim 65, further comprising light gathering means for gathering the light to be radiated.

76. A longitudinal light guide according to claim 65, wherein at least a part of said reflection member near the plurality of light sources has a normal line, passing through a center of a width of said reflection member, that is shifted from a center of at least one of the plurality of light sources, when viewed in the longitudinal direction of said light guide.

77. A light guide according to claim 65, further comprising a light gathering unit that gathers the light to be radiated.

78. An illuminating apparatus comprising:
a plurality of light sources for illuminating an object;
a longitudinal light guide that guides light from said plurality of light sources along a longitudinal direction of said light guide to radiate the light; and
a longitudinal reflection member, arranged along the longitudinal direction of said light guide, that reflects the light from said plurality of light sources,
wherein at least in a neighborhood of said plurality of light sources, a thickness of said light guide in a direction parallel to a normal line of said reflection member is different at the position of said reflection member than at the position of at least one of said plurality of light sources, when viewed in a longitudinal direction of said light guide.

79. An apparatus according to claim 78, wherein said reflection member includes light-reflecting paint.

80. An apparatus according to claim 78, wherein said reflection member includes a rough surface.

81. An apparatus according to claim 78, wherein said reflection member includes a sawtooth-shaped surface.

82. An apparatus according to claim 78, wherein said reflection member is arranged at a convex portion of said light guide.

83. An apparatus according to claim 78, further comprising light gathering means for gathering the light to be radiated.

84. An apparatus according to claim 78, wherein at least a part of said reflection member near the plurality of light sources has a normal line, passing through a center of a width of said reflection member, that is shifted from a center of one of the plurality of light sources, when viewed in the longitudinal direction of said light guide.

85. An apparatus according to claim 78, further comprising a light gathering unit that gathers the light to be radiated.

86. A reading apparatus comprising:
an illuminating device including therein a longitudinal light guide that guides light from a plurality of light sources along a longitudinal direction of said light guide to radiate the light; and
a photoelectric converting device that reads an image illuminated by said illuminating device and outputs an image signal;
wherein said light guide includes a reflection member, arranged along the longitudinal direction of said light guide, that reflects the light from said plurality of light sources, and
wherein at least in a neighborhood of said plurality of light sources, a thickness of said light guide in a direction parallel to a normal line of said reflection member is different at the position of said reflection member than at the position of at least one of said plurality of light sources, when viewed in a longitudinal direction of said light guide.

87. An apparatus according to claim 86, wherein said reflection member includes light-reflecting paint.

88. An apparatus according to claim 86, wherein said reflection member includes a rough surface.

89. An apparatus according to claim 86, wherein said reflection member includes a sawtooth-shaped surface.

90. An apparatus according to claim 86, wherein said reflection member is arranged at a convex portion of said light guide.

91. An apparatus according to claim 86, further comprising light gathering means for gathering the light to be radiated.

92. An apparatus according to claim 86, wherein at least a part of said reflection member near the plurality of light sources has a normal line, passing through a center of a width of said reflection member, that is shifted from a center of at least one of the plurality of light sources, when viewed in the longitudinal direction of said light guide.

93. An apparatus according to claim 86, further comprising a light gathering unit that gathers the light to be radiated.

94. An image processing system comprising:
an illuminating apparatus including therein a longitudinal light guide that guides light from a plurality of light sources along a longitudinal direction of said light guide to radiate the light;
photoelectric conversion means for reading an image illuminated by said illuminating apparatus and for outputting an image signal; and
control means for controlling said illuminating apparatus and said photoelectric conversion means,
wherein said light guide includes a reflection member, arranged along the longitudinal direction of said light guide, that reflects the light from said plurality of light sources, and
wherein at least in a neighborhood of said plurality of light sources, a thickness of said light guide in a direction parallel to a normal line of said reflection member is different at the position of said reflection member than at the position of at least one of said plurality of light sources, when viewed in the longitudinal direction of said light guide.

95. A system according to claim 94, wherein said reflection member includes light-reflecting paint.

96. A system according to claim 94, wherein said reflection member includes a rough surface.

97. A system according to claim 94, wherein said reflection member includes a sawtooth-shaped surface.

98. A system according to claim 94, wherein said reflection member is arranged at a convex portion of said light guide.

99. A system according to claim 94, further comprising light gathering means for gathering the light to be radiated.

100. A system according to claim 94, wherein at least a part of said reflection member near the plurality of light sources has a normal line, passing through a center of a width of said reflection member, that is shifted from a center of at least one of the plurality of light sources, when viewed in the longitudinal direction of said light guide.

101. An image processing system comprising:
an illuminating apparatus including therein a longitudinal light guide that guides light from a plurality of light sources along a longitudinal direction of said light guide to radiate the light;
photoelectric conversion means for reading an image illuminated by said illuminating apparatus and for outputting an image signal; and
processing means for performing a predetermined processing on said image signal,
wherein said light guide includes a reflection member, arranged along the longitudinal direction of said light guide, that reflects the light from said plurality of light sources, and
wherein at least in a neighborhood of said plurality of light sources, a thickness of said light guide in a direction parallel to a normal line of said reflection member is different at the position of said reflection member than at the position of at least one of said plurality of light sources, when viewed in the longitudinal direction of said light guide.

102. A system according to claim 101, further comprising control means for controlling said illuminating apparatus, said photoelectric conversion means and said processing means.

103. A system according to claim 102, wherein said reflection member includes a light-reflecting paint.

104. A system according to claim 102, wherein said reflection member includes a rough surface.

105. A system according to claim 102, wherein said reflection member includes a sawtooth-shaped surface.

106. A system according to claim 102, wherein said reflection member is arranged at a convex portion of said light guide.

107. A system according to claim 102, further comprising light gathering means for gathering the light to be radiated.

108. A system according to claim 101, wherein said reflection member includes light-reflecting paint.

109. A system according to claim 101, wherein said reflection member includes a rough surface.

110. A system according to claim 101, wherein said reflection member includes a sawtooth-shaped surface.

111. A system according to claim 101, wherein said reflection member is arranged at a convex portion of said light guide.

112. A system according to claim 101, further comprising light gathering means for gathering the light to be radiated.

113. A system according to claim 101, wherein at least a part of said reflection member near the plurality of light sources has a normal line, passing through a center of a width of said reflection member, that is shifted from a center of at least one of the plurality of light sources, when viewed in the longitudinal direction of said light guide.

114. An image processing system comprising:
an illuminating apparatus including therein a longitudinal light guide that guides light from a plurality of light sources along a longitudinal direction of said light guide to radiate the light;
photoelectric conversion means for reading an image illuminated by said illuminating apparatus and for outputting an image signal;
moving means for relatively moving the image and said photoelectric conversion means; and
control means for controlling said illuminating apparatus, said photoelectric conversion means and said moving means,
wherein said light guide includes a reflection member, arranged along the longitudinal direction of said light guide, that reflects the light from said plurality of light sources, and
wherein at least in a neighborhood of said plurality of light sources, a thickness of said light guide in a direction parallel to a normal line of said reflection member is different at the position of said reflection member than at the position of at least one of said plurality of light sources, when viewed in the longitudinal direction of said light guide.

115. A system according to claim 114, further comprising transmission means for transmitting the image signal to an external recording medium.

116. A system according to claim 115, wherein said reflection member includes a light-reflecting paint.

117. A system according to claim 115, wherein said reflection member includes a rough surface.

118. A system according to claim 115, wherein said reflection member includes a sawtooth-shaped surface.

119. A system according to claim 115, wherein said reflection member is arranged at a convex portion of said light guide.

120. A system according to claim 15, further comprising light gathering means for gathering the light to be radiated.

121. A system according to claim 114, wherein said reflection member includes a light-reflecting paint.

122. A system according to claim 114, wherein said reflection member includes a rough surface.

123. A system according to claim 114, wherein said reflection member includes a sawtooth-shaped surface.

124. A system according to claim 114, wherein said reflection member is arranged at a convex portion of said light guide.

125. A system according to claim 114, further comprising light gathering means for gathering the light to be radiated.

126. A system according to claim 114, wherein at least a part of said reflection member near the plurality of light sources has a normal line, passing through a center of a width of said reflection member, that is shifted from a center of at least one of the plurality of light sources, when viewed in the longitudinal direction of said light guide.

127. An image processing system comprising:
an illuminating apparatus including therein a longitudinal light guide that guides light from a plurality of light sources along a longitudinal direction of said light guide to radiate the light;
photoelectric conversion means for reading an image illuminated by said illuminating apparatus and for outputting an image signal;
transmission means for transmitting the image signal to an external recording medium; and
control means connected to said transmission means, for controlling said illuminating apparatus and said photoelectric conversion means,
wherein said light guide includes a reflection member, arranged along the longitudinal direction of said light guide, that reflects the light from said plurality of light sources, and
wherein at least in a neighborhood of said plurality of light sources, a thickness of said light guide in a direction parallel to a normal line of said reflection member is different at the position of said reflection member than at the position of at least one of said plurality of light sources, when viewed in the longitudinal direction of said light guide.

128. A system according to claim 127, wherein said reflection member includes a light-reflecting paint.

129. A system according to claim 127, wherein said reflection member includes a rough surface.

130. A system according to claim 127, wherein said reflection member includes a sawtooth-shaped surface.

131. A system according to claim 127, wherein said reflection member is arranged at a convex portion of said light guide.

132. A system according to claim 127, further comprising light gathering means for gathering the light to be radiated.

133. A system according to claim 127, wherein at least a part of said reflection member near the plurality of light sources has a normal line, passing through a center of a width of said reflection member, that is shifted from a center of at least one of the plurality of light sources, when viewed in the longitudinal direction of said light guide.

134. A longitudinal light guide that guides light introduced from a light source and emits the light along a longitudinal side of said light guide, said light guide having a longitudinal reflection member, arranged along said light guide, that reflects light introduced from the light source, wherein, at least at a part of said reflection member near the light source, a normal line passing through a center of a width of said reflection member is shifted from a center of the light source, when viewed in a longitudinal direction of said light guide.

135. A light guide according to claim 134, wherein said reflection member includes light-reflecting paint.

136. A light guide according to claim 134, wherein said reflection member includes a coarse surface.

137. A light guide according to claim 134, wherein said reflection member includes a sawtooth-shaped reflecting surface.

138. A longitudinal light guide that guides light introduced from a plurality of light sources and emits the light along a longitudinal side thereof, having a longitudinal reflection member, arranged along said light guide, that reflects the light from said plurality of light sources, wherein, at least at a part of said reflection member near said plurality of light sources, a normal line passing through a center of a width of said reflection member is shifted from a center of at least one of said plurality of light sources, when viewed in a longitudinal direction of said light guide.

139. A light guide according to claim 134, wherein said reflection member includes light-reflecting paint.

140. A light guide according to claim 134, wherein said reflection member includes a coarse surface.

141. A light guide according to claim 138, wherein said reflection member includes a sawtooth-shaped reflecting surface.

142. An image reading device comprising:
(a) an illuminating device provided with a longitudinal light guide that guides light introduced from a light source and emits the light along a longitudinal side thereof, having a longitudinal reflection member, arranged along said light guide, that reflects the light from said light source, wherein, at least at a part of said reflection member near said light source, a normal line passing through a center of a width of said reflection member is shifted from a center of said light source, when viewed in a longitudinal direction of said light guide; and
(b) a photoelectric converting device having a plurality of photoelectric conversion elements that read an image illuminated by said illuminating device and output an image signal.

143. A device according to claim 142, wherein said reflection member includes light-reflecting paint.

144. A device according to claim 142, wherein said reflection member includes a coarse surface.

145. A device according to claim 142, wherein said reflection member includes a sawtooth-shaped reflecting surface.

146. An information processing apparatus comprising:
(a) an illumination device provided with a longitudinal light guide that guides light introduced from a light source and emits the light along a longitudinal side thereof, having a longitudinal reflection member, arranged along said light guide, that reflects the light from said light source; wherein, at least at a part of said reflection member near said light source, a normal line passing through a center of a width of said reflection member is shifted from a center of said light source, when viewed in a longitudinal direction of said light guide;
(b) a photoelectric conversion device that reads an image illuminated by said illumination device and outputs an image signal; and
(c) control circuits that control said illumination device and said photoelectric conversion device.

147. An apparatus according to claim 146, wherein said reflection member includes light-reflecting paint.

148. An apparatus according to claim 146, wherein said reflection member includes a coarse surface.

149. An apparatus according to claim 146, wherein said reflection member includes a sawtooth-shaped reflecting surface.

150. An apparatus according to claim 146, wherein said light source includes a light-emitting diode.

151. An apparatus according to claim 146, further comprising communication means controlled by said control circuits.

152. An apparatus according to claim 146, further comprising a processor for converting the image signal output by said photoelectric conversion device into a different electrical signal.

153. An apparatus according to claim 152, wherein the different electrical signal is adapted for recording.

154. An apparatus according to claim 146, further comprising drive means for shifting a positional relationship between the image illuminated by said illumination device and said photoelectric conversion device.

155. An apparatus according to claim 146, further comprising a communication unit, and wherein said control circuits controls said communication unit.

156. An apparatus according to claim 146, further comprising a drive unit that shifts a positional relationship between the image illuminated by said illumination device and said photoelectric conversion device.

157. An information transmitting apparatus comprising:
(a) an illumination device provided with a longitudinal light guide that guides light introduced from a light source and emits the light along a longitudinal side thereof, having a longitudinal reflection member, arranged along said light guide, that reflects the light from said light source, wherein, at least at a part of said reflection member near said light source, a normal line passing through a center of a width of said reflection member is shifted from a center of said light source, when viewed in a longitudinal direction of said light guide;
(b) a photoelectric converting device having a plurality of photoelectric conversion elements that read an image illuminated by said illumination device and form an image signal; and (c) transmission means for transmitting the image signal to an external processing apparatus for processing the image signal.

158. An apparatus according to claim 157, wherein said reflection member includes light-reflecting paint.

159. An apparatus according to claim 157, wherein said reflection member includes a coarse surface.

160. An apparatus according to claim 157, wherein said reflection member includes a sawtooth-shaped reflecting surface.

161. An apparatus according to claim 157, wherein said light source includes a light-emitting diode.

162. An apparatus according to claim 157, further comprising a processor for converting the image signal formed by said photoelectric converting device into a different electrical signal.

163. An apparatus according to claim 162, wherein the different electrical signal is adapted for recording.

164. An apparatus according to claim 157, further comprising drive means for shifting a positional relationship between the image illuminated by said illumination device and said photoelectric converting device.

165. An information reading apparatus comprising:

(a) an illumination device provided with a longitudinal light guide for guiding light introduced from a light source and for emitting the light along a longitudinal side thereof, having a longitudinal reflection member arranged along said light guide for reflecting the light from said light source, wherein, at least at a part of said reflection member near said light source, a normal line passing through a center of a width of said reflection member is shifted from a center of said light source, when viewed in a longitudinal direction of said light guide;

(b) a photoelectric converting device having a plurality of photoelectric conversion elements for reading an image illuminated by said illumination device and for forming an image signal; and (c) drive means for shifting a positional relationship between the image illuminated by said illumination device and said photoelectric converting device.

166. An apparatus according to claim 165, wherein said reflection member includes light-reflecting paint.

167. An apparatus according to claim 165, wherein said reflection member includes a coarse surface.

168. An apparatus according to claim 165, wherein said reflection member includes a sawtooth-shaped reflecting surface.

169. An apparatus according to claim 165, wherein said light source includes a light-emitting diode.

170. An apparatus according to claim 165, further comprising a processor for converting the image signal formed by said photoelectric converting device into a different electrical signal.

171. An apparatus according to claim 170, wherein the different electrical signal is adapted for recording.

172. An apparatus according to claim 165, wherein said drive means includes a motor.

173. An apparatus according to claim 172, wherein said motor moves an image bearing sheet.

174. An apparatus according to claim 165, further comprising transmitting means for transmitting the image signal to an external processing apparatus for processing the image signal.

175. An image reading device comprising:

(a) an illumination device provided with a longitudinal light guide for guiding light introduced from a plurality of light sources and for emitting the light along a longitudinal side thereof, having a longitudinal reflection member arranged along said light guide for reflecting the light from said plurality of light sources, wherein, at least at a part of said reflection member near said plurality of light sources, a normal line passing through a center of a width of said reflection member is shifted from a center of at least one of said plurality of light sources, when viewed in a longitudinal direction of said light guide; and (b) a photoelectric converting device having a plurality of photoelectric conversion elements for reading an image illuminated by said illumination device and for outputting an image signal.

176. A device according to claim 175, wherein said reflection member includes light-reflecting paint.

177. A device according to claim 175, wherein said reflection member includes a coarse surface.

178. A device according to claim 175, wherein said reflection member includes a sawtooth-shaped reflecting surface.

179. An information processing apparatus comprising:

(a) an illumination device provided with a longitudinal light guide that guides light introduced from a plurality of light sources and emits the light along a longitudinal side thereof, having a longitudinal reflection member, arranged along said light guide, that reflects the light from said plurality of light sources, wherein, at least at a part of said reflection member near said plurality of light sources, a normal line passing through a center of a width of said reflection member is shifted from a center of at least one of said plurality of light sources, when viewed in a longitudinal direction of said light guide;

(b) a photoelectric converting device having a plurality of photoelectric conversion elements that read an image illuminated by said illumination device and output an image signal;

(c) a processor that processes the image signal output by said photoelectric converting device; and (d) control circuits that control said illumination device, said photoelectric conversion device and said processor.

180. An apparatus according to claim 179, wherein said reflection member includes light-reflecting paint.

181. An apparatus according to claim 179, wherein said reflection member includes a coarse surface.

182. An apparatus according to claim 179, wherein said reflection member includes a sawtooth-shaped reflecting surface.

183. An apparatus according to claim 179, wherein said plurality of light sources includes a light-emitting diode.

184. An apparatus according to claim 179, further comprising communication means controlled by said control circuits.

185. An apparatus according to claim 179, wherein said processor converts the image signal into a different electrical signal.

186. An apparatus according to claim 185, wherein the different electrical signal is adapted for recording.

187. An apparatus according to claim 179, further comprising drive means for shifting a positional relationship between the image illuminated by said illumination device and said photoelectric converting device.

188. An apparatus according to claim 179, further comprising a communication unit, wherein said control circuit controls said communication unit.

189. An apparatus according to claim 179, further comprising a drive unit that shifts a positional relationship between the image illuminated by said illumination device and said photoelectric converting device.

190. An information transmitting apparatus comprising:
  (a) an illumination device provided with a longitudinal light guide that guides light introduced from a plurality of light sources and emits the light along a longitudinal side thereof, having a longitudinal reflection member, arranged along said light guide, that reflects the light from said plurality of light sources, wherein, at least at a part of said reflection member near said plurality of light sources, a normal line passing through a center of a width of said reflection member is shifted from a center of at least one of said plurality of light sources, when viewed in a longitudinal direction of said light guide;
  (b) a photoelectric converting device having a plurality of photoelectric conversion elements that read an image illuminated by said illumination device and form an image signal; and
  (c) transmission means for transmitting the image signal to-an external processing apparatus for processing the image signal.

191. An apparatus according to claim 190, wherein said reflection member includes light-reflecting paint.

192. An apparatus according to claim 190, wherein said reflection member includes a coarse surface.

193. An apparatus according to claim 190, wherein said reflection member includes a sawtooth-shaped reflecting surface.

194. An apparatus according to claim 190, wherein said plurality of light sources includes a light-emitting diode.

195. An apparatus according to claim 190, further comprising a processor for converting the image signal formed by said photoelectric converting device into a different electrical signal.

196. An apparatus according to claim 195, wherein the different electrical signal is adapted for recording.

197. An apparatus according to claim 190, further comprising drive means for shifting a positional relationship between the image illuminated by said illumination device and said photoelectric converting device.

198. An information reading apparatus comprising:
  (a) an illumination device provided with a longitudinal light guide that guides light introduced from a plurality of light sources and emits the light along a longitudinal side thereof, having a longitudinal reflection member, arranged along said light guide, that reflects the light from said plurality of light sources, wherein, at least at a part of said reflection member near said plurality of light sources, a normal line passing through a center of a width of said reflection member is shifted from a center of at least one of said plurality of light sources, when viewed in a longitudinal direction of said light guide;
  (b) a photoelectric converting device having a plurality of photoelectric conversion elements that read an image illuminated by said illumination device and form an image signal; and
  (c) drive means for shifting a positional relationship between the image illuminated by said illumination device and said photoelectric converting device.

199. An apparatus according to claim 198, wherein said reflection member includes light-reflecting paint.

200. An apparatus according to claim 198, wherein said reflection member includes a coarse surface.

201. An apparatus according to claim 198, wherein said reflection member includes a sawtooth-shaped reflecting surface.

202. An apparatus according to claim 198, wherein said plurality of light sources includes a light-emitting diode.

203. An apparatus according to claim 198, further comprising a processor for converting the image signal formed by said photoelectric converting device into a different electrical signal.

204. An apparatus according to claim 203, wherein the different electrical signal is adapted for recording.

205. An apparatus according to claim 198, wherein said drive means includes a motor.

206. An apparatus according to claim 205, wherein said motor moves an image bearing sheet.

207. An apparatus according to claim 205, further comprising transmission means for transmitting the image signal to an external processing apparatus for processing the image signal.

208. A light guide comprising:
  a longitudinal surface that extends in a longitudinal direction of said light guide;
  an end surface disposed at one longitudinal end of said longitudinal surface;
  a plurality of light sources disposed on said end surface; and
  a longitudinal reflection member arranged along said longitudinal surface,
  wherein a reflection member normal line that passes through a center of a width of said longitudinal reflection member is shifted, at least at a part of said longitudinal reflection member near said end surface, from a center of at least one of said plurality of light sources, when viewed in the longitudinal direction of said light guide.

209. A light guide according to claim 208, wherein said reflection member includes light-reflecting paint.

210. A light guide according to claim 208, wherein said reflection member includes a coarse surface.

211. A light guide according to claim 208, wherein said reflection member includes a sawtooth-shaped reflecting surface.

212. An image reading device comprising:
  (a) an illumination device provided with a longitudinal light guide that guides light introduced from a plurality of light sources and emits the light along a longitudinal side thereof, having a longitudinal surface that extends in a longitudinal direction of said light guide; an end surface disposed at one longitudinal end of said longitudinal surface; a plurality of light sources disposed on said end surface; and a longitudinal reflection member arranged along said longitudinal surface, wherein a reflection member normal line that passes through a center of a width of said longitudinal reflection member is shifted, at least at a part of said longitudinal reflection member near said end surface, from a center of at least one of said plurality of light sources, when viewed in the longitudinal direction of said light guide; and
  (b) a photoelectric converting device having a plurality of photoelectric conversion elements that read an image illuminated by said illumination device and output an image signal.

213. A device according to claim 212, wherein said reflection member includes light-reflecting paint.

214. A device according to claim 212, wherein said reflection member includes a coarse surface.

215. A device according to claim 212, wherein said reflection member includes a sawtooth-shaped reflecting surface.

216. An information processing apparatus comprising:
(a) an illumination device provided with a longitudinal light guide that guides light introduced from a plurality of light sources and emits the light along a longitudinal side thereof, having a longitudinal surface that extends in a longitudinal direction of said light guide; an end surface disposed at one longitudinal end of said longitudinal surface; a plurality of light sources disposed on said end surface; and a longitudinal reflection member arranged along said longitudinal surface, wherein a reflection member normal line that passes through a center of a width of said longitudinal reflection member is shifted, at least at a part of said longitudinal reflection member near said end surface, from a center of at least one of said plurality of light sources, when viewed in the longitudinal direction of said light guide;
(b) a photoelectric converting device having a plurality of photoelectric conversion elements that read an image illuminated by said illumination device and output an image signal; and
(c) control circuits that control said illumination device and said photoelectric converting device.

217. An apparatus according to claim 216, wherein said reflection member includes light-reflecting paint.

218. An apparatus according to claim 216, wherein said reflection member includes a coarse surface.

219. An apparatus according to claim 216, wherein said reflection member includes a sawtooth-shaped reflecting surface.

220. An apparatus according to claim 216, wherein said plurality of light sources includes a light-emitting diode.

221. An apparatus according to claim 216, further comprising communication means controlled by said control circuits.

222. An apparatus according to claim 216, further comprising a processor for converting the image signal output by said photoelectric converting device into a different electrical signal.

223. An apparatus according to claim 222, wherein the different electrical signal is adapted for recording.

224. An apparatus according to claim 216, further comprising drive means for shifting a positional relationship between the image illuminated by said illumination device and said photoelectric converting device.

225. An apparatus according to claim 216, further comprising a communication unit, wherein said control circuits controls said communication unit.

226. An apparatus according to claim 216, further comprising a drive unit that shifts a positional relationship between the image illuminated by said illumination device and said photoelectric converting device.

227. An information transmitting apparatus comprising:
(a) an illumination device provided with a longitudinal light guide that guides light introduced from a plurality of light sources and emits the light along a longitudinal side thereof, having a longitudinal surface that extends in a longitudinal direction of said light guide; an end surface disposed at one longitudinal end of said longitudinal surface; a plurality of light sources disposed on said end surface; and a longitudinal reflection member arranged along said longitudinal surface, wherein a reflection member normal line that passes through a center of a width of said longitudinal reflection member is shifted, at least at a part of said longitudinal reflection member near said end surface, from a center of at least one of said plurality of light sources, when viewed in the longitudinal direction of said light guide;
(b) a photoelectric converting device having a plurality of photoelectric conversion elements that read an image illuminated by said illumination device and form an image signal; and
(c) transmission means for transmitting the image signal to an external processing apparatus for processing the image signal.

228. An apparatus according to claim 227, wherein said reflection member includes light-reflecting paint.

229. An apparatus according to claim 227, wherein said reflection member includes a coarse surface.

230. An apparatus according to claim 227, wherein said reflection member includes a sawtooth-shaped reflecting surface.

231. An apparatus according to claim 227, wherein said plurality of light sources includes a light-emitting diode.

232. An apparatus according to claim 227, further comprising a processor for converting the image signal formed by said photoelectric converting device into a different electrical signal.

233. An apparatus according to claim 232, wherein the different electrical signal is adapted for recording.

234. An apparatus according to claim 227, further comprising drive means for shifting a positional relationship between the image illuminated by said illumination device and said photoelectric converting device.

235. An information reading apparatus comprising:
(a) an illumination device provided with a longitudinal light guide that guides light introduced from a plurality of light sources and emits the light along a longitudinal side thereof, having a longitudinal surface that extends in a longitudinal direction of said light guide; an end surface disposed at one longitudinal end of said longitudinal surface; a plurality of light sources disposed on said end surface; and a longitudinal reflection member arranged along said longitudinal surface, wherein a reflection member normal line that passes through a center of a width of said longitudinal reflection member is shifted, at least at a part of said longitudinal reflection member near said end surface, from a center of at least one of said plurality of light sources, when viewed in the longitudinal direction of said light guide;
(b) a photoelectric converting device having a plurality of photoelectric conversion elements that read an image illuminated by said illumination device and form an image signal; and
(c) drive means for shifting a positional relationship between the image illuminated by said illumination device and said photoelectric converting device.

236. An apparatus according to claim 235, wherein said reflection member includes light-reflecting paint.

237. An apparatus according to claim 235, wherein said reflection member includes a coarse surface.

238. An apparatus according to claim 235, wherein said reflection member includes a sawtooth-shaped reflecting surface.

239. An apparatus according to claim 235, wherein said plurality of light sources includes a light-emitting diode.

240. An apparatus according to claim 235, further comprising a processor that converts the image signal formed by said photoelectric converting device into a different electrical signal.

241. An apparatus according to claim 240, wherein the different electrical signal is adapted for recording.

242. An apparatus according to claim 235, wherein said drive means includes a motor.

243. An apparatus according to claim 242, wherein said motor moves an image bearing sheet.

244. An apparatus according to claim 235, further comprising transmission means for transmitting the image signal to an external processing apparatus for processing the image signal.

245. An illumination device comprising:
   a longitudinal surface that extends in a longitudinal direction of a light guide;
   an end surface disposed at one longitudinal end of said longitudinal surface;
   a plurality of light sources disposed on the end surface; and
   a longitudinal reflection member arranged along the longitudinal surface, a reflection member normal line that passes through a center of a width of said longitudinal reflection member being shifted, at least at a part of said longitudinal reflection member near the end surface, from a center of at least one of said plurality of light sources when viewed from a longitudinal direction of said light guide.

246. A device according to claim 245, wherein said reflection member includes light-reflecting paint.

247. A device according to claim 245, wherein said reflection member includes a coarse surface.

248. A device according to claim 245, wherein said reflection member includes a sawtooth-shaped reflecting surface.

249. An elongated light guide for use with a plurality of light sources to illuminate an original with a light beam having a line-shape cross-section extending along a main scanning direction of a photoelectric conversion element array of a reading apparatus, said light guide being elongated in the main scanning direction and comprising:
   a longitudinal end surface that receives light from the plurality of light sources;
   a light emitting surface; and
   a reflection part formed on a surface different from said light emitting surface and elongated in the main scanning direction, said reflection part being arranged so that, when said longitudinal end surface is positioned to receive light from the plurality of light sources, in at least a region near the plurality of light sources a normal line passing through a center of a width of said reflection part deviates from at least one of the plurality of light sources, when viewed from said longitudinal end surface, and light introduced from the plurality of light sources is guided through said light guide in the main scanning direction, dispersed and/or reflected by said reflection part, and guided out of said light emitting surface so as to illuminate the original with a light beam having a line-shape cross-section extending along the main scanning direction of the photoelectric conversion element array.

250. A light guide according to claim 249, wherein said reflection part includes light-reflecting paint.

251. A light guide according to claim 249, wherein said reflection part includes a coarse surface.

252. A light guide according to claim 249, wherein said reflection part includes a sawtooth-shaped reflecting surface.

253. An illumination device for use with a reading apparatus, to illuminate an original with a light beam having a line-shape cross-section extending along a main scanning direction of a line sensor of the reading apparatus, said illumination device comprising:
   a plurality of light sources; and
   an elongated light guide elongated in the main scanning direction, said elongated light guide comprising:
      a longitudinal end surface that receives light from said plurality of light sources;
      a light emitting surface; and
      a reflection part formed on a surface different from said light emitting surface and elongated in the main scanning direction, said reflection part being arranged so that, when said longitudinal end surface is positioned to receive light from said plurality of light sources, in at least a region near said plurality of light sources a normal line passing through a center of a width of said reflection part deviates from at least one of said plurality of light sources, when viewed from said longitudinal end surface, and light introduced from said plurality of light sources is guided through said light guide in the main scanning direction, dispersed and/or reflected by said reflection part, and guided out of said light emitting surface so as to illuminate the original with a light beam having a line-shape cross-section extending along the main scanning direction of the line sensor.

254. An illumination device according to claim 253, wherein said reflection part includes light-reflecting paint.

255. An illumination device according to claim 253, wherein said reflection part includes a coarse surface.

256. An illumination device according to claim 253, wherein said reflection part includes a sawtooth-shaped reflecting surface.

257. An image reading apparatus comprising:
   a line sensor, having a main scanning direction, that receives a light image of an original and outputs an image signal; and
   an illumination device that illuminates an original with a light beam having a line-shape cross-section extending along the main scanning direction of said line sensor, said illumination device comprising:
      a plurality of light sources; and
      an elongated light guide elongated in the main scanning direction, said elongated light guide comprising:
         a longitudinal end surface that receives light from said plurality of light sources;
         a light emitting surface; and
         a reflection part formed on a surface different from said light emitting surface and elongated in the main scanning direction, said reflection part being arranged so that, when said longitudinal end surface is positioned to receive light from said plurality of light sources, in at least a region near said plurality of light sources a normal line passing through a center of a width of said reflection part deviates from at least one of said plurality of light sources, when viewed from said longitudinal end surface, and light introduced from said plurality of light sources is guided through said light guide in the main scanning direction, dispersed and/or reflected by said reflection part, and guided out of said light emitting surface so as to illuminate the original with a light beam having a line-shape cross-section extending along the main scanning direction of said line sensor.

258. An image reading apparatus according to claim 257, wherein said reflection part includes light-reflecting paint.

259. An image reading apparatus according to claim 257, wherein said reflection part includes a coarse surface.

260. An image reading apparatus according to claim 257, wherein said reflection member includes a sawtooth-shaped reflecting surface.

261. An image processing system comprising:

a line sensor, having a main scanning direction, that receives a light image of an original and outputs an image signal;

an illumination device that illuminates an original with a light beam having a line-shape cross-section extending along the main scanning direction of said line sensor, said illumination device comprising:

a plurality of light sources; and an elongated light guide elongated in the main scanning direction, said elongated light guide comprising:

a longitudinal end surface that receives light from said plurality of light sources;

a light emitting surface; and a reflection part formed on a surface different from said light emitting surface and elongated in the main scanning direction, said reflection part being arranged so that, when said longitudinal end surface is positioned to receive light from said plurality of light sources, in at least a region near said plurality of light sources a normal line passing through a center of a width of said reflection part deviates from at least one of said plurality of light sources, when viewed from said longitudinal end surface, and light introduced from said plurality of light sources is guided through said light guide in the main scanning direction, dispersed and/or reflected by said reflection part, and guided out of said light emitting surface so as to illuminate the original with a light beam having a line-shape cross-section extending along the main scanning direction of said line sensor; and a control circuit that controls said line sensor and said illumination device.

262. An image processing system according to claim 261, wherein said reflection part includes light-reflecting paint.

263. An image processing system according to claim 261, wherein said reflection part includes a coarse surface.

264. An image processing system according to claim 261, wherein said reflection member includes a sawtooth-shaped reflecting surface.

265. An image processing system according to claim 261, wherein said plurality of light sources includes a light-emitting diode.

266. An image processing system according to claim 261, further comprising:

communication means for communicating with exterior apparatus, wherein said communication means is controlled by said control circuit.

267. An image processing system according to claim 261, further comprising a processor that converts an image signal output by said line sensor into a different electrical signal.

268. An image processing system according to claim 267, wherein the different electrical signal is adapted for recording.

269. An image processing system according to claim 261, further comprising:

drive means for shifting a positional relationship between an original illuminated by said illumination device and said line sensor.

270. An image processing system according to claim 261, further comprising:

a communication unit that communicates with an exterior apparatus, wherein said control circuit controls said communication unit.

271. An image processing system according to claim 261, further comprising:

a drive unit that shifts a positional relationship between an original illuminated by said illumination device and said line sensor.

272. An information communication apparatus comprising:

a line sensor, having a main scanning direction, that receives a light image of an original and outputs an image signal;

an illumination device that illuminates an original with a light beam having a line-shape cross-section extending along the main scanning direction of said line sensor, said illumination device comprising:

a plurality of light sources; and an elongated light guide elongated in the main scanning direction, said elongated light guide comprising:

a longitudinal end surface that receives light from said plurality of light sources;

a light emitting surface; and a reflection part formed on a surface different from said light emitting surface and elongated in the main scanning direction, said reflection part being arranged so that, when said longitudinal end surface is positioned to receive light from said plurality of light sources, in at least a region near said plurality of light sources a normal line passing through a center of a width of said reflection part deviates from at least one of said plurality of light sources, when viewed from said longitudinal end surface, and light introduced from said plurality of light sources is guided through said light guide in the main scanning direction, dispersed and/or reflected by said reflection part, and guided out of said light emitting surface so as to illuminate the original with a light beam having a line-shape cross-section extending along the main scanning direction of said line sensor; and communication means for communicating the image signal to an external processing apparatus for processing the image signal.

273. An information communication apparatus according to claim 272, wherein said reflection part includes light-reflecting paint.

274. An information communication apparatus according to claim 272, wherein said reflection part includes a coarse surface.

275. An information communication apparatus according to claim 272, wherein said reflection part includes a sawtooth-shaped reflecting surface.

276. An information communication apparatus according to claim 272, wherein said plurality of light sources includes a light-emitting diode.

277. An information communication apparatus according to claim 272, further comprising:

a processor that converts an image signal formed by said line sensor into a different electrical signal.

278. An information communication apparatus according to claim 277, wherein the different electrical signal is adapted for recording.

279. An information communication apparatus according to claim 272, further comprising:

drive means for shifting a positional relationship between an original illuminated by said illumination device and said line sensor.

280. An information reading apparatus comprising:
- a line sensor, having a main scanning direction, that receives a light image of an original and outputs an image signal;
- an illumination device that illuminates an original with a light beam having a line-shape cross-section extending along the main scanning direction of said line sensor, said illumination device comprising:
    - a plurality of light sources; and
    - an elongated light guide elongated in the main scanning direction, said elongated light guide comprising:
        - a longitudinal end surface that receives light from said plurality of light sources;
        - a light emitting surface; and
        - a reflection part formed on a surface different from said light emitting surface and elongated in the main scanning direction, said reflection part being arranged so that, when said longitudinal end surface is positioned to receive light from said plurality of light sources, in at least a region near said plurality of light sources a normal line passing through a center of a width of said reflection part deviates from at least one of said plurality of light sources, when viewed from said longitudinal end surface, and light introduced from said plurality of light sources is guided through said light guide in the main scanning direction, dispersed and/or reflected by said reflection part, and guided out of said light emitting surface so as to illuminate the original with a light beam having a line-shape cross-section extending along the main scanning direction of said line sensor; and
- driving means for shifting a positional relationship between an original illuminated by said illumination device and said line sensor.

281. An information reading apparatus according to claim 280, wherein said reflection part includes light-reflecting paint.

282. An information reading apparatus according to claim 280, wherein said reflection part includes a coarse surface.

283. An information reading apparatus according to claim 280, wherein said reflection part includes a sawtooth-shaped reflecting surface.

284. An information reading apparatus according to claim 280, wherein said plurality of light sources includes a light-emitting diode.

285. An information reading apparatus according to claim 280, further comprising:
- a processor that converts an image signal formed by said line sensor into a different electrical signal.

286. An information reading apparatus according to claim 285, wherein the different electrical signal is adapted for recording.

287. An information reading apparatus according to claim 280, wherein said drive means includes a motor.

288. An information reading apparatus according to claim 287, wherein said motor moves an image bearing sheet.

289. An information reading apparatus according to claim 280, further comprising:
- transmitting means for transmitting an image signal to an external processing apparatus.

290. An information processing apparatus comprising:
- a line sensor, having a main scanning direction, that receives a light image of an original and outputs an image signal;
- an illumination device that illuminates an original with a light beam having a line-shape cross-section extending along the main scanning direction of said line sensor, said illumination device comprising:
    - a plurality of light sources; and
    - an elongated light guide elongated in the main scanning direction, said elongated light guide comprising:
        - a longitudinal end surface that receives light from said plurality of light sources;
        - a light emitting surface; and
        - a reflection part formed on a surface different from said light emitting surface and elongated in the main scanning direction, said reflection part being arranged so that, when said longitudinal end surface is positioned to receive light from said plurality of light sources, in at least a region near said plurality of light sources a normal line passing through a center of a width of said reflection part deviates from at least one of said plurality of light sources, when viewed from said longitudinal end surface, and light introduced from said plurality of light sources is guided through said light guide in the main scanning direction, dispersed and/or reflected by said reflection part, and guided out of said light emitting surface so as to illuminate the original with a light beam having a line-shape cross-section extending along the main scanning direction of said line sensor; and
- a processor that processes the image signal output from said line sensor; and
- a control circuit that controls said illumination device, said line sensor and said processor.

291. An information reading apparatus according to claim 290, wherein said reflection part includes light-reflecting paint.

292. An information reading apparatus according to claim 290, wherein said reflection part includes a coarse surface.

293. An information reading apparatus according to claim 290, wherein said reflection part includes a sawtooth-shaped reflecting surface.

294. An information reading apparatus according to claim 290, wherein said plurality of light sources includes a light-emitting diode.

295. An information reading apparatus according to claim 290, further comprising:
- communication means for communicating with external apparatus, wherein said communication means is controlled by said control circuit.

296. An information reading apparatus according to claim 290, wherein said processor converts the image signal into a different electrical signal.

297. An information reading apparatus according to claim 296, wherein the different electrical signal is adapted for recording.

298. An information reading apparatus according to claim 290, further comprising:
- drive means for shifting a positional relationship between an original illuminated by said illumination device and said line sensor.

299. An information reading apparatus according to claim 290, further comprising:
- a communication unit that communicates with an external apparatus, wherein said control circuit controls said communication unit.

300. An information reading apparatus according to claim 290, further comprising:
- a drive unit that shifts a positional relationship between an original illuminated by said illumination device and said line sensor.

301. An image processing system comprising:
an illuminating apparatus including therein a longitudinal light guide that guides light from a light source along a longitudinal direction of said light guide to radiate the light;
a photoelectric converting device that reads an image illuminated by said illuminating apparatus and outputs an image signal; and
a controller that controls said illuminating apparatus and said photoelectric converting device,
wherein said light guide includes a longitudinal reflection member, arranged along the longitudinal direction of said light guide, that reflects light from said light source, and at least in a neighborhood of said light source, a thickness of said light guide in a direction parallel to a normal line of said reflection member is different at the position of said reflection member than at the position of said light source, when viewed in the longitudinal direction of said light guide.

302. A system according to claim 301, wherein said reflection member includes a light-reflecting paint.

303. A system according to claim 301, wherein said reflection member includes a rough surface.

304. A system according to claim 302, wherein said reflection member includes a sawtooth-shaped surface.

305. A system according to claim 302, wherein said reflection member is arranged at a convex portion of said light guide.

306. A system according to claim 302, further comprising a light gathering unit that is configured to gather the light to be radiated.

307. An image processing system comprising:
an illuminating apparatus including therein a longitudinal light guide that guides light from a light source along a longitudinal direction of said light guide to radiate the light;
a photoelectric converting device that reads an image illuminated by said illuminating apparatus and outputs an image signal; and
a processing unit that processes said image signal in a predetermined manner,
wherein said light guide includes a longitudinal reflection member, arranged along the longitudinal direction of said light guide, that reflects light from said light source, and at least in a neighborhood of said light source, a thickness of said light guide in a direction parallel to a normal line of said reflection member is different at the position of said reflection member than at the position of said light source, when viewed in the longitudinal direction of said light guide.

308. A system according to claim 307, further comprising a controller that controls said illuminating apparatus, said photoelectric converting device and said processing unit.

309. A system according to claim 308, wherein said reflection member includes a light-reflecting paint.

310. A system according to claim 308, wherein said reflection member includes a rough surface.

311. A system according to claim 308, wherein said reflection member includes a sawtooth-shaped surface.

312. A system according to claim 308, wherein said reflection member is arranged at a convex portion of said light guide.

313. A system according to claim 308, further comprising a light gathering unit that gathers the light to be radiated.

314. A system according to claim 307, wherein said reflection member includes a light-reflecting paint.

315. A system according to claim 307, wherein said reflection member includes a rough surface.

316. A system according to claim 307, wherein said reflection member includes a sawtooth-shaped surface.

317. A system according to claim 307, wherein said reflection member is arranged at a convex portion of said light guide.

318. A system according to claim 307, further comprising a light gathering unit that gathers the light to be radiated.

319. An image processing system comprising:
an illuminating apparatus including therein a longitudinal light guide that guides light from a light source along a longitudinal direction of said light guide to radiate the light;
a photoelectric converting device that reads an image illuminated by said illuminating apparatus and outputs an image signal;
a moving unit that relatively moves the image and said photoelectric converting device; and
a controller that controls said illuminating apparatus, said photoelectric converting device and said moving unit,
wherein said light guide includes a longitudinal reflection member, arranged along the longitudinal direction of said light guide, that reflects light from said light source, and at least in a neighborhood of said light source, a thickness of said light guide in a direction parallel to a normal line of said reflection member is different at the position of said reflection member than at the position of said light source, when viewed in the longitudinal direction of said light guide.

320. An apparatus according to claim 319, further comprising a transmitter that transmits the image signal to an external recording medium.

321. A system according to claim 320, wherein said reflection member includes a light-reflecting paint.

322. A system according to claim 320, wherein said reflection member includes a rough surface.

323. A system according to claim 320, wherein said reflection member includes a sawtooth-shaped surface.

324. A system according to claim 320, wherein said reflection member is arranged at a convex portion of said light guide.

325. A system according to claim 319, wherein said reflection member includes a light-reflecting paint.

326. A system according to claim 319, wherein said reflection member includes a rough surface.

327. A system according to claim 319, wherein said reflection member includes a sawtooth-shaped surface.

328. A system according to claim 319, wherein said reflection member is arranged at a convex portion of said light guide.

329. A system according to claim 319, further comprising a light gathering unit that gathers the light to be radiated.

330. A system according to claim 319, further comprising a light gathering unit that gathers the light to be radiated.

331. An image processing system comprising:
an illuminating apparatus including therein a longitudinal light guide that guides light from a light source along a longitudinal direction of said light guide to radiate the light:
a photoelectric converting device that reads an image illuminated by said illuminating apparatus and outputs an image signal;
a transmitter that transmits the image signal to an external recording medium; and
a controller, connected to said transmitter, that controls said illuminating apparatus and said photoelectric converting device, wherein said light guide includes a longitudinal reflection member, arranged along the longitudinal direction of said light guide, that reflects light from said light source, and at least in a neighborhood of said light source, a thickness of said light guide in a direction parallel to a normal line of said reflection member is different at the position of said reflection member than at the position of said light source, when viewed in the longitudinal direction of said light guide.

332. A system according to claim 331, wherein said reflection member includes a light-reflecting paint.

333. A system according to claim 331, wherein said reflection member includes a rough surface.

334. A system according to claim 331, wherein said reflection member includes a sawtooth-shaped surface.

335. A system according to claim 331, wherein said reflection member is arranged at a convex portion of said light guide.

336. A system according to claim 331, further comprising a light gathering unit that gathers the light to be radiated.

337. An image processing system comprising:
an illuminating apparatus including therein a longitudinal light guide that guides light from a plurality of light sources along a longitudinal direction of said light guide to radiate the light;
a photoelectric converting device that reads an image illuminated by said illuminating apparatus and outputs an image signal; and
a controller that controls said illuminating apparatus and said photoelectric converting device,
wherein said light guide includes a reflection member, arranged along the longitudinal direction of said light guide, that reflects light from said plurality of light sources, and
wherein at least in a neighborhood of said plurality of light sources, a thickness of said light guide in a direction parallel to a normal line of said reflection member is different at the position of said reflection member than at the position of at least one of said plurality of light sources, when viewed in the longitudinal direction of said light guide.

338. A system according to claim 337, wherein said reflection member includes light-reflecting paint.

339. A system according to claim 337, wherein said reflection member includes a rough surface.

340. A system according to claim 337, wherein said reflection member includes a sawtooth-shaped surface.

341. A system according to claim 337, wherein said reflection member is arranged at a convex portion of said light guide.

342. A system according to claim 337, further comprising a light gathering unit that gathers the light to be radiated.

343. An image processing system comprising:
an illuminating apparatus including therein a longitudinal light guide that guides light from a plurality of light sources along a longitudinal direction of said light guide to radiate the light;
a photoelectric converting device that reads an image illuminated by said illuminating apparatus and outputs an image signal; and
a processing unit that processes said image signal in a predetermined manner,
wherein said light guide includes a reflection member, arranged along the longitudinal direction of said light guide, that reflects light from said plurality of light sources, and
wherein at least in a neighborhood of said plurality of light sources, a thickness of said light guide in a direction parallel to a normal line of said reflection member is different at the position of said reflection member than at the position of at least one of said plurality of light sources, when viewed in the longitudinal direction of said light guide.

344. A system according to claim 343, further comprising a controller that controls said illuminating apparatus, said photoelectric converting device and said processing unit.

345. A system according to claim 344, wherein said reflection member includes a light-reflecting paint.

346. A system according to claim 344, wherein said reflection member includes a rough surface.

347. A system according to claim 344, wherein said reflection member includes a sawtooth-shaped surface.

348. A system according to claim 344, wherein said reflection member is arranged at a convex portion of said light guide.

349. A system according to claim 344, further comprising a light gathering unit that gathers the light to be radiated.

350. A system according to claim 343, wherein said reflection member includes light-reflecting paint.

351. A system according to claim 343, wherein said reflection member includes a rough surface.

352. A system according to claim 343, wherein said reflection member includes a sawtooth-shaped surface.

353. A system according to claim 343, wherein said reflection member is arranged at a convex portion of said light guide.

354. A system according to claim 343, further comprising a light gathering unit that gathers the light to be radiated.

355. An image processing system comprising:
an illuminating apparatus including therein a longitudinal light guide that guides light from a plurality of light sources along a longitudinal direction of said light guide to radiate the light;
a photoelectric converting device that reads an image illuminated by said illuminating apparatus and outputs an image signal;
a moving unit that relatively moves the image and said photoelectric converting device; and
a controller that controls said illuminating apparatus, said photoelectric converting device and said moving unit,
wherein said light guide includes a reflection member, arranged along the longitudinal direction of said light guide, that reflects light from said plurality of light sources, and
wherein at least in a neighborhood of said plurality of light sources, a thickness of said light guide in a direction parallel to a normal line of said reflection member is different at the position of said reflection member than at the position of at least one of said plurality of light sources, when viewed in the longitudinal direction of said light guide.

356. A system according to claim 355, further comprising a transmitter that transmits the image signal to an external recording medium.

357. A system according to claim 356, wherein said reflection member includes a light-reflecting paint.

358. A system according to claim 356, wherein said reflection member includes a rough surface.

359. A system according to claim 356, wherein said reflection member includes a sawtooth-shaped surface.

360. A system according to claim 356, wherein said reflection member is arranged at a convex portion of said light guide.

361. A system according to claim 356, further comprising a light gathering unit that gathers the light to be radiated.

362. A system according to claim 355, wherein said reflection member includes a light-reflecting paint.

363. A system according to claim 355, wherein said reflection member includes a rough surface.

364. A system according to claim 355, wherein said reflection member includes a sawtooth-shaped surface.

365. A system according to claim 355, wherein said reflection member is arranged at a convex portion of said light guide.

366. A system according to claim 355, further comprising a light gathering unit that gathers the light to be radiated.

367. An image processing system comprising:
- an illuminating apparatus including therein a longitudinal light guide that guides light from a plurality of light sources along a longitudinal direction of said light guide to radiate the light;
- a photoelectric converting device that reads an image illuminated by said illuminating apparatus and outputs an image signal;
- a transmitter that transmits the image signal to an external recording medium; and
- a controller, connected to said transmitter, that controls said illuminating apparatus and said photoelectric converting device,
- wherein said light guide includes a reflection member, arranged along the longitudinal direction of said light guide, that reflects light from said plurality of light sources, and
- wherein at least in a neighborhood of said plurality of light sources, a thickness of said light guide in a direction parallel to a normal line of said reflection member is different at the position of said reflection member than at the position of at least one of said plurality of light sources, when viewed in the longitudinal direction of said light guide.

368. A system according to claim 367, wherein said reflection member includes a light-reflecting paint.

369. A system according to claim 367, wherein said reflection member includes a rough surface.

370. A system according to claim 367, wherein said reflection member includes a sawtooth-shaped surface.

371. A system according to claim 367, wherein said reflection member is arranged at a convex portion of said light guide.

372. A system according to claim 367, further comprising a light gathering unit that gathers the light to be radiated.

373. An information transmitting apparatus comprising:
- an illumination device provided with a longitudinal light guide that guides light introduced from a light source and emits the light along a longitudinal side thereof, having a longitudinal reflection member, arranged along said light guide, that reflects light from said light source, wherein, at least at a part of said reflection member near said light source, a normal line passing through a center of a width of said reflection member is shifted from a center of said light source, when viewed in a longitudinal direction of said light guide;
- a photoelectric converting device having a plurality of photoelectric conversion elements that read an image illuminated by said illumination device and form an image signal; and
- a transmitter that transmits the image signal to an external processing apparatus for processing the image signal.

374. An apparatus according to claim 373, wherein said reflection member includes light-reflecting paint.

375. An apparatus according to claim 373, wherein said reflection member includes a coarse surface.

376. An apparatus according to claim 373, wherein said reflection member includes a sawtooth-shaped reflecting surface.

377. An apparatus according to claim 373, wherein said light source includes a light-emitting diode.

378. An apparatus according to claim 373, further comprising a processor that converts the image signal formed by said photoelectric converting device into a different electrical signal.

379. An apparatus according to claim 378, wherein the different electrical signal is adapted for recording.

380. An apparatus according to claim 373, further comprising a drive unit that shifts a positional relationship between the image illuminated by said illumination device and said photoelectric converting device.

381. An information reading apparatus comprising:
- an illumination device provided with a longitudinal light guide that guides light introduced from a light source and emits the light along a longitudinal side thereof, having a longitudinal reflection member, arranged along said light guide, that reflects the light from said light source, wherein, at least at a part of said reflection member near said light source, a normal line passing through a center of a width of said reflection member is shifted from a center of said light source, when viewed in a longitudinal direction of said light guide;
- a photoelectric converting device having a plurality of photoelectric conversion elements that read an image illuminated by said illumination device and form an image signal; and
- a drive unit that shifts a positional relationship between the image illuminated by said illumination device and said photoelectric converting device.

382. An apparatus according to claim 381, wherein said reflection member includes light-reflecting paint.

383. An apparatus according to claim 381, wherein said reflection member includes a coarse surface.

384. An apparatus according to claim 381, wherein said reflection member includes a sawtooth-shaped reflecting surface.

385. An apparatus according to claim 381, wherein said light source includes a light-emitting diode.

386. An apparatus according to claim 381, further comprising a processor that converts the image signal formed by said photoelectric converting device into a different electrical signal.

387. An apparatus according to claim 386, wherein the different electrical signal is adapted for recording.

388. An apparatus according to claim 381, wherein said drive unit includes a motor.

389. An apparatus according to claim 388, wherein said motor moves an image bearing sheet.

390. An apparatus according to claim 381, further comprising a transmitter that transmits the image signal to an external processing apparatus for processing the image signal.

391. An information transmitting apparatus comprising:
- an illumination device provided with a longitudinal light guide that guides light introduced from a plurality of light sources and emits the light along a longitudinal side thereof, having a longitudinal reflection member, arranged along said light guide, that reflects the light from said plurality of light sources, wherein, at least at a part of said reflection member near said plurality of light sources, a normal line passing through a center of a width of said reflection member is shifted from a center of at least one of said plurality of light sources, when viewed in a longitudinal direction of said light guide;

a photoelectric converting device having a plurality of photoelectric conversion elements that read an image illuminated by said illumination device and form an image signal; and transmitter that transmits the image signal to an external processing apparatus for processing the image signal.

392. An apparatus according to claim 391, wherein said reflection member includes light-reflecting paint.

393. An apparatus according to claim 391, wherein said reflection member includes a coarse surface.

394. An apparatus according to claim 391, wherein said reflection member includes a sawtooth-shaped reflecting surface.

395. An apparatus according to claim 391, wherein said plurality of light sources includes a light-emitting diode.

396. An apparatus according to claim 391, further comprising a processor that converts the image signal formed by said photoelectric converting device into a different electrical signal.

397. An apparatus according to claim 396, wherein the different electrical signal is adapted for recording.

398. An apparatus according to claim 391, further comprising a drive unit that shifts a positional relationship between the image illuminated by said illumination device and said photoelectric converting device.

399. An information reading apparatus comprising:

an illumination device provided with a longitudinal light guide that guides light introduced from a plurality of light sources and emits the light along a longitudinal side thereof, having a longitudinal reflection member, arranged along said light guide, that reflects the light from said plurality of light sources, wherein, at least at a part of said reflection member near said plurality of light sources, a normal line passing through a center of a width of said reflection member is shifted from a center of at least one of said plurality of light sources, when viewed in a longitudinal direction of said light guide;

a photoelectric converting device having a plurality of photoelectric conversion elements that read an image illuminated by said illumination device and form an image signal; and a drive unit that shifts a positional relationship between the image illuminated by said illumination device and said photoelectric converting device.

400. An apparatus according to claim 399, wherein said reflection member includes light-reflecting paint.

401. An apparatus according to claim 399, wherein said reflection member includes a coarse surface.

402. An apparatus according to claim 399, wherein said reflection member includes a sawtooth-shaped reflecting surface.

403. An apparatus according to claim 399, wherein said plurality of light sources includes a light-emitting diode.

404. An apparatus according to claim 399, further comprising a processor that converts the image signal formed by said photoelectric converting device into a different electrical signal.

405. An apparatus according to claim 404, wherein the different electrical signal is adapted for recording.

406. An apparatus according to claim 399, wherein said drive unit includes a motor.

407. An apparatus according to claim 406, wherein said motor moves an image bearing sheet.

408. An apparatus according to claim 399, further comprising a transmitter that transmits the image signal to an external processing apparatus for processing the image signal.

409. An information transmitting apparatus comprising:

an illumination device provided with a longitudinal light guide that guides light introduced from a plurality of light sources and emits the light along a longitudinal side thereof, having a longitudinal surface that extends in a longitudinal direction of said light guide; an end surface disposed at one longitudinal end of said longitudinal surface; a plurality of light sources disposed on said end surface; and a longitudinal reflection member arranged along said longitudinal surface, wherein a reflection member normal line that passes through a center of a width of said longitudinal reflection member is shifted, at least at a part of said longitudinal reflection member near said end surface, from a center of at least one of said plurality of light sources, when viewed in the longitudinal direction of said light guide;

a photoelectric converting device having a plurality of photoelectric conversion elements that read an image illuminated by said illumination device and form an image signal; and a transmitter that transmits the image signal to an external processing apparatus for processing the image signal.

410. An apparatus according to claim 409, wherein said reflection member includes light-reflecting paint.

411. An apparatus according to claim 409, wherein said reflection member includes a coarse surface.

412. An apparatus according to claim 409, wherein said reflection member includes a sawtooth-shaped reflecting surface.

413. An apparatus according to claim 409, wherein said plurality of light sources includes a light-emitting diode.

414. An apparatus according to claim 409, further comprising a processor that converts the image signal formed by said photoelectric converting device into a different electrical signal.

415. An apparatus according to claim 414, wherein the different electrical signal is adapted for recording.

416. An apparatus according to claim 409, further comprising a drive unit that shifts a positional relationship between the image illuminated by said illumination device and said photoelectric converting device.

417. An information reading apparatus comprising:

an illumination device provided with a longitudinal light guide that guides light introduced from a plurality of light sources and emits the light along a longitudinal side thereof, having a longitudinal surface that extends in a longitudinal direction of said light guide; an end surface disposed at one longitudinal end of said longitudinal surface; a plurality of light sources disposed on said end surface; and a longitudinal reflection member arranged along said longitudinal surface, wherein a reflection member normal line that passes through a center of a width of said longitudinal reflection member is shifted, at least at a part of said longitudinal reflection member near said end surface, from a center of at least one of said plurality of light sources, when viewed in the longitudinal direction of said light guide;

a photoelectric converting device having a plurality of photoelectric conversion elements that read an image illuminated by said illumination device and form an image signal; and a drive unit that shifts a positional relationship between the image illuminated by said illumination device and said photoelectric converting device.

418. An apparatus according to claim 417, wherein said reflection member includes light-reflecting paint.

419. An apparatus according to claim 417, wherein said reflection member includes a coarse surface.

420. An apparatus according to claim 417, wherein said reflection member includes a sawtooth-shaped reflecting surface.

421. An apparatus according to claim 417, wherein said plurality of light sources includes a light-emitting diode.

422. An apparatus according to claim 417, further comprising a processor that converts the image signal formed by said photoelectric converting device into a different electrical signal.

423. An apparatus according to claim 422, wherein the different electrical signal is adapted for recording.

424. An apparatus according to claim 417, wherein said drive unit includes a motor.

425. An apparatus according to claim 424, wherein said motor moves an image bearing sheet.

426. An apparatus according to claim 417, further comprising a transmitter that transmits the image signal to an external processing apparatus for processing the image signal.

427. An information communication apparatus comprising:
   a line sensor, having a main scanning direction, that receives a light image of an original and outputs an image signal;
   an illumination device that illuminates an original with a light beam having a line-shape cross-section extending along the main scanning direction of said line sensor, said illumination device comprising:
      a plurality of light sources; and
      an elongated light guide elongated in the main scanning direction, said elongated light guide comprising:
         a longitudinal end surface that receives light from said plurality of light sources;
         a light emitting surface; and
         a reflection part formed on a surface different from said light emitting surface and elongated in the main scanning direction, said reflection part being arranged so that, when said longitudinal end surface is positioned to receive light from said plurality of light sources, in at least a region near said plurality of light sources, a normal line passing through a center of a width of said reflection part deviates from at least one of said plurality of light sources, when viewed from said longitudinal end surface, and light introduced from said plurality of light sources is guided through said light guide in the main scanning direction, dispersed and/or reflected by said reflection part, and guided out of said light emitting surface so as to illuminate the original with a light beam having a line-shape cross-section extending along the main scanning direction of said line sensor; and
   communication unit that is configured to communicate the image signal to an external processing apparatus for processing the image signal.

428. An information communication apparatus according to claim 427, wherein said reflection part includes light-reflecting paint.

429. An information communication apparatus according to claim 427, wherein said reflection part includes a coarse surface.

430. An information communication apparatus according to claim 427, wherein said reflection part includes a sawtooth-shaped reflecting surface.

431. An information communication apparatus according to claim 427, wherein said plurality of light sources includes a light-emitting diode.

432. An information communication apparatus according to claim 427, further comprising:
   a processor that converts an image signal formed by said line sensor into a different electrical signal.

433. An information communication apparatus according to claim 432, wherein the different electrical signal is adapted for recording.

434. An information communication apparatus according to claim 427, further comprising:
   drive unit that shifts a positional relationship between an original illuminated by said illumination device and said line sensor.

435. An information reading apparatus comprising:
   a line sensor, having a main scanning direction, that receives a light image of an original and outputs an image signal;
   an illumination device that illuminates an original with a light beam having a line-shape cross-section extending along the main scanning direction of said line sensor, said illumination device comprising:
      a plurality of light sources; and
      an elongated light guide elongated in the main scanning direction, said elongated light guide comprising:
         a longitudinal end surface that receives light from said plurality of light sources;
         a light emitting surface; and
         a reflection part formed on a surface different from said light emitting surface and elongated in the main scanning direction, said reflection part being arranged so that, when said longitudinal end surface is positioned to receive light from said plurality of light sources, in at least a region near said plurality of light sources, a normal line passing through a center of a width of said reflection part deviates from at least one of said plurality of light sources, when viewed from said longitudinal end surface, and light introduced from said plurality of light sources is guided through said light guide in the main scanning direction, dispersed and/or reflected by said reflection part, and guided out of said light emitting surface so as to illuminate the original with a light beam having a line-shape cross-section extending along the main scanning direction of said line sensor; and
   driving unit that shifts a positional relationship between an original illuminated by said illumination device and said line sensor.

436. An information reading apparatus according to claim 435, wherein said reflection part includes light-reflecting paint.

437. An information reading apparatus according to claim 435, wherein said reflection part includes a coarse surface.

438. An information reading apparatus according to claim 435, wherein said reflection part includes a sawtooth-shaped reflecting surface.

439. An information reading apparatus according to claim 435, wherein said plurality of light sources includes a light-emitting diode.

440. An information reading apparatus according to claim 435, further comprising:

a processor that converts an image signal formed by said line sensor into a different electrical signal.

441. An information reading apparatus according to claim 440, wherein the different electrical signal is adapted for recording.

442. An information reading apparatus according to claim 435, wherein said drive unit includes a motor.

443. An information reading apparatus according to claim 442, wherein said motor moves an image bearing sheet.

444. An information reading apparatus according to claim 435, further comprising:

a transmitter that transmits an image signal to an external processing apparatus.

* * * * *

UNITED STATES PATENT AND TRADEMARK OFFICE
CERTIFICATE OF CORRECTION

PATENT NO. : 6,512,600 B1
DATED : January 28, 2003
INVENTOR(S) : Tatsundo Kawai et al.

It is certified that error appears in the above-identified patent and that said Letters Patent is hereby corrected as shown below:

Column 11,
Line 40, "devices," should read -- devices. --.

Column 12,
Line 61, "at. the" should read -- at the --.

Column 15,
Line 33, "diff-using" should read -- diffusing --.

Column 16,
Line 23, "cc" should read -- $\alpha$ --.
Line 40, "angle a" should read -- angle $\alpha$ --.

Column 19,
Line 23, "portion. 35," should read -- portion 35, --.
Line 30, "thereof" should read -- thereof. --.
Line 62, "cross sectional" should read -- cross-sectional --.

Column 20,
Line 19, "FIGS. 46A." should read -- FIGS. 46A --.

Column 21,
Line 11, "structure." should read -- structure --.

Column 22,
Line 19, "14" should read -- 14. --.

Column 30,
Line 14, "light:" should read -- light; --.

Column 35,
Lines 45 and 47, "claim 134," should read -- claim 138, --.

Column 37,
Line 27, "for guiding" should read -- that guides --.
Line 28, "for emitting" should read -- emits --.
Line 29, "member" should read -- member, --.
Line 30, "guide for reflecting" should read -- guide, that reflects --.
Line 38, "for reading" should read -- that read --.
Line 39, "for forming" should read -- form --.

UNITED STATES PATENT AND TRADEMARK OFFICE
CERTIFICATE OF CORRECTION

PATENT NO. : 6,512,600 B1
DATED : January 28, 2003
INVENTOR(S) : Tatsundo Kawai et al.

It is certified that error appears in the above-identified patent and that said Letters Patent is hereby corrected as shown below:

Column 38,
Line 3, "for guiding" should read -- that guides --.
Line 4, "for emitting" should read -- emits --.
Line 6, "member" should read -- member, --, "guide for reflect-" should read -- guide, that reflects --.
Lines 7 and 16, "ing" should be deleted.
Line 14, "for reading" should read -- that read --.
Line 15, "for output-" should read -- output --.

Column 39,
Line 26, "to-an" should read -- to an --.

Column 40,
Line 20, "claim 205," should read -- claim 198, --.

Column 49,
Lines 24, 26 and 29, "claim 302," should read -- claim 301, --.

Column 55,
Line 9, "transmitter" should read -- a transmitter --.

Column 57,
Line 62, "communication unit" should read -- a communication unit --.

Column 58,
Line 54, "driving unit" should read -- a driving unit --.

Signed and Sealed this

Twenty-second Day of June, 2004

JON W. DUDAS
*Acting Director of the United States Patent and Trademark Office*